United States Patent [19]
Fujisaki et al.

[11] Patent Number: 5,850,130
[45] Date of Patent: Dec. 15, 1998

[54] DRIVING APPARATUS FOR A BRUSHLESS MOTOR AND ROTOR POSITION DETECTING APPARATUS FOR THE MOTOR

[75] Inventors: Yoshihiro Fujisaki, Matsubara; Kazuyuki Takada, Hirakata, both of Japan

[73] Assignee: Matsushita Electric Industrial Co., Ltd., Osaka, Japan

[21] Appl. No.: 837,476

[22] Filed: Apr. 18, 1997

[30] Foreign Application Priority Data

| Apr. 19, 1996 | [JP] | Japan | 8-098257 |
| Dec. 6, 1996 | [JP] | Japan | 8-326374 |
| Jan. 13, 1997 | [JP] | Japan | 9-003457 |

[51] Int. Cl.$^6$ .................................................. H02P 6/16
[52] U.S. Cl. ........................... 318/439; 318/138; 318/721
[58] Field of Search ................................... 318/600–605, 318/138, 254, 439, 700, 701, 720, 721, 724

[56] References Cited

U.S. PATENT DOCUMENTS

| 5,122,719 | 6/1992 | Bessenyei et al. | 318/629 |
| 5,194,794 | 3/1993 | Shamoto | 318/603 |
| 5,451,945 | 9/1995 | Alhorn et al. | 318/661 X |
| 5,642,461 | 6/1997 | Lewis | 388/812 |

FOREIGN PATENT DOCUMENTS

| 0 443 612 | 8/1991 | European Pat. Off. . |
| 0 534 761 | 3/1993 | European Pat. Off. . |
| 0 800 263 | 10/1997 | European Pat. Off. . |
| 41 09 083 | 9/1992 | Germany . |

*Primary Examiner*—Bentsu Ro
*Attorney, Agent, or Firm*—Wenderoth, Lind & Ponack, L.L.P.

[57] ABSTRACT

To use a sinusoidal wave as a driving waveform, and reduce noise and vibration, in an inexpensive constitution, a driving apparatus for the brushless motor includes a first data latch 16 for holding the value of address Au at an output signal timing of a first edge detecting means 10, and issuing as address value Aus, and third frequency adjusting means 20, including it, for issuing the result of adding rotating frequency Fsen to the product of address error Aerr obtained by subtracting the address value Aus held by the first data latch 16 from the reference address value Aref, rotating frequency Fsen, and control gain Ka, to an address counter 9 as frequency command Fref.

33 Claims, 29 Drawing Sheets

Fig.10
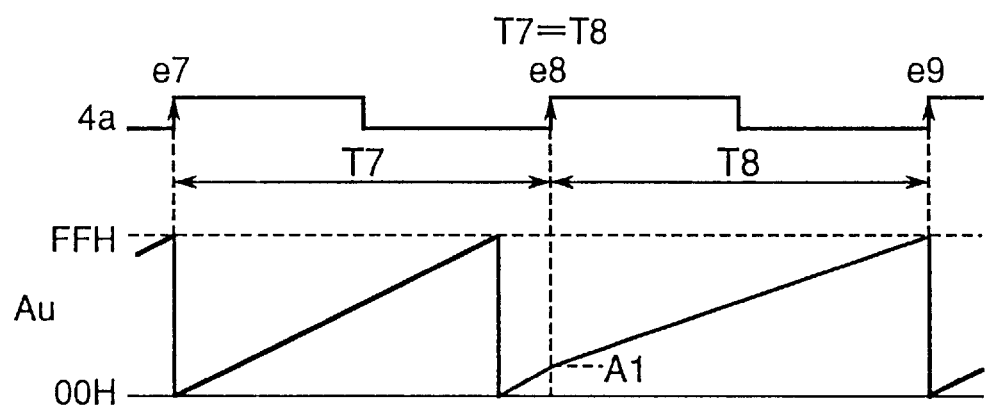
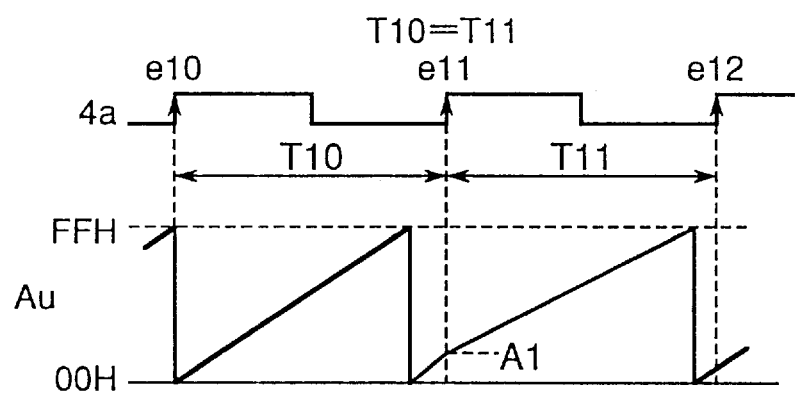

DRIVING APPARATUS FOR A BRUSHLESS MOTOR AND ROTOR POSITION DETECTING APPARATUS FOR THE MOTOR

BACKGROUND OF THE INVENTION

1. Field of the Present Invention

The present invention relates to a driving apparatus for a brushless motor using a magnet in the rotor. The present invention also relates to a rotor position detecting apparatus for the motor, which is applicable not only to the brushless motor but also in a wide range of motors.

2. Description of the Prior Art

Recently, in the motor used in driving the air-conditioner blower fan or the like, in the background of strong demand for higher efficiency and smaller size, the conventionally dominant induction motor is widely converted to the brushless motor. As the driving apparatus for the brushless motor of this kind used hitherto, for example, such a structure as shown in FIG. 34 is known.

Referring to FIG. 34, an inverter circuit 1 having six power transistors receives supply of electric power from a DC power source 2, and is connected to a three-phase motor 3 through output wires U, V and W. Reference numerals 4A, 4B and 4C represent respective pulse generators for detecting, and generating respective pulse signals 4a, 4b and 4c indicative of, the magnetic pole positions of the rotor of the motor 3, and they are generally designed to shape the waveforms and issue the output signals of Hall elements disposed, for example, at a mutual interval of an electric angle of 120 degrees. The output pulse signals 4a, 4b and 4c of these pulse generators 4A, 4B and 4C are fed into a rectangular wave driving logic circuit 5 for creating a feeding phase changeover signal. The output signal of this rectangular wave driving logic circuit 5 and a voltage command value 7 for commanding the voltage amount to be applied to the motor 3 are fed into a PWM (pulse width modulation) circuit 6 for processing PWM, and its output signals uh, vh, wh, ul, vl and wl are fed into the inverter circuit 1 as feeding signals for power transistors.

In this constitution, according to the pulse signals 4a, 4b and 4c indicating the rotor magnetic pole position of the motor 3 generated by the pulse generators 4A, 4B and 4C, the rectangular wave driving logic circuit 5 and the PWM circuit 6 create feeding signals for the power transistors, and by using the feeding signals, the inverter circuit 1 performs a switching operation. The operating waveform at this time is shown in FIG. 35. The driving system of this constitution is generally called the rectangular wave PWM drive, and in this prior art, depending on the voltage command value 7, the power transistor of the upper arm of the inverter circuit 1 is controlled by PWM so that the rotating speed of the motor 3 can be controlled.

In such conventional driving apparatus for the brushless motor such as shown in FIG. 35, since the phase current flowing in the motor 3 is a rectangular waveform, there was a problem of large noise and vibration. This is mainly caused by the pulsation occurring in the generated torque due to steep change of the current at the time of changeover of the feeding phases, and it was a particularly serious problem when the output capacity of the motor 3 was larger or in the case of a steel plate frame structure likely to cause resonance. Since the air-conditioner is used also in the nighttime, a quiet operation is strongly demanded, but, lately, the blower fan driving motor used therein tends to be gradually greater in the output capacity for enhancing the heat exchange characteristic, and this problem is more serious than ever.

This problem can be solved by using sinusoidal waveform for the driving waveform, but sinusoidal driving requires high resolution for detection of rotor position of the motor 3, and the detector required for it is generally complicated in structure, expensive, and poor in reliability, and it was not used widely in consumer electric appliances.

SUMMARY OF THE INVENTION

The present invention is intended to solve this problem and has for its object to provide an inexpensive driving apparatus for the brushless motor capable of reducing noise and vibration, using a sinusoidal waveform as driving a waveform, in spite of a detector of low resolution used for detection of the rotor position.

To achieve the object, the driving apparatus for the brushless motor of the present invention comprises rotor position detecting means for detecting, and generating a position signal indicative of, the rotor position, an address counter for counting the address corresponding to the rotor position at a higher resolution than the output signal of the rotor position detecting means, a waveform data memory for storing waveform data and generating data on an address issued by the address counter, phase output command creating means for creating an AC command value of each phase of the motor on the basis of the data issued by the waveform data memory, and an inverter circuit for issuing and controlling a motor driving electric power by using the AC command value issued by the phase output command creating means as phase voltage command value or phase current command value, wherein adjustment of count speed of the address counter, presetting of the address, or combined operation of adjustment of count speed and presetting of the address is conducted depending on the output signal of the rotor position detecting means, so that the address issued by the address counter may follow up the rotor position.

According to this constitution, if the output signal of the rotor position detecting means is of a low resolution, since the output address of the address counter follows up the rotor position, substantially, the information of the output signal of the rotor position detecting means is interpolated by the address counter having a high count resolution. Hence, the rotor position can be detected finely, and the motor can be driven by an arbitrary waveform written in the waveform data memory.

It also comprises at least one pulse generator for issuing a signal showing the magnetic pole position of a rotor, rotating frequency detecting means for detecting the frequency of an output signal of the pulse generator, an address counter for counting an address corresponding to the rotor magnetic pole position at a speed proportional to the value of rotating frequency issued by the rotating frequency detecting means, address correcting means for presetting, when detecting the edge of the output signal of the pulse generator, a reference address value corresponding to the rotor magnetic pole position indicated by this edge in the address counter, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It also comprises at least one pulse generator for issuing a signal showing the magnetic pole position of a rotor, rotating frequency detecting means for detecting the frequency of an output signal of the pulse generator, first frequency adjusting means for issuing, when detecting an edge of an output signal of the pulse generator, the result of adding the rotating frequency issued by the rotating frequency detecting means, to the product of the difference of subtracting the present address value from the reference address value corresponding to the rotor magnetic pole position indicated by this edge and a control gain, as a frequency command, an address counter for counting an address corresponding to the rotor magnetic pole position at a speed proportional to the frequency command value issued by the first frequency adjusting means, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It also comprises at least one pulse generator for issuing a signal showing the magnetic pole position of a rotor, second frequency adjusting means for issuing, when detecting an edge of an output signal of the pulse generator, the result of adding the present frequency command, to the product of the difference of subtracting the present address value from the reference address value corresponding to the rotor magnetic pole position indicated by this edge and a control gain, as a new frequency command, an address counter for counting an address corresponding to the rotor magnetic pole position at a speed proportional to the frequency command value issued by the second frequency adjusting means, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It also comprises at least one pulse generator for issuing a signal showing the magnetic pole position of a rotor, rotating frequency detecting means for detecting the frequency of an output signal of the pulse generator, third frequency adjusting means for issuing, when detecting an edge of an output signal of the pulse generator, the result of adding the rotating frequency, to the product of the difference of subtracting the present address value from the reference address value corresponding to the rotor magnetic pole position indicated by this edge, the rotating frequency issued by the rotating frequency detecting means and a control gain, as a frequency command, an address counter for counting an address corresponding to the rotor magnetic pole position at a speed proportional to the frequency command value issued by the third frequency adjusting means, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It also comprises at least one pulse generator for issuing a signal showing the magnetic pole position of a rotor, fourth frequency adjusting means for issuing, when detecting an edge of an output signal of the pulse generator, the result of adding the present frequency command, to the product of the difference of subtracting the present address value from the reference address value corresponding to the rotor magnetic pole position indicated by this edge, the present frequency command and a control gain, as a new frequency command, an address counter for counting an address corresponding to the rotor magnetic pole position at a speed proportional to the frequency command value issued by the fourth frequency adjusting means, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It also comprises at least one pulse generator for issuing a signal showing the magnetic pole position of a rotor, fifth frequency adjusting means for issuing, when detecting an edge of an output signal of the pulse generator, the value of multiplying a fractional value consisting of a numerator which is the sum of an address error, being the difference of subtracting the present address value from the reference address value corresponding to the rotor magnetic pole position indicated by this edge and the unit address length corresponding to the unit period of waveform, and a denominator which is the sum of the value subtracting the address error from the unit address length and the address error at the previous time of detecting the edge, a control gain, and the present frequency command, as a new frequency command, an address counter for counting an address corresponding to the rotor magnetic pole position at a speed proportional to the frequency command value issued by the fifth frequency adjusting means, a waveform data memory for storing waveform data and issuing data on an address issued by the address counter, phase output command creating means for multiplying the data issued by the waveform data memory and a DC command value, and creating an AC command value of each phase of the motor, and an inverter circuit for issuing and controlling a motor driving electric power by using the AC command value issued by the phase output command creating means as phase voltage command value or phase current command value.

It further comprises frequency command correcting means for correcting a frequency command value by adding a value on the basis of the motor acceleration to the frequency command value.

In this constitution, the frequency value gradually rising along with the passing of the time is commanded to the address counter when starting up the motor.

In this constitution, the frequency value gradually rising along with the passing of the time is commanded to the address counter, after DC current is applied to the inverter circuit for a specific time, when starting up the motor.

In this constitution, the number of pulse generators is same as the number of phases of the motor, and further first rectangular wave driving means is provided for driving by feeding rectangular wave on the basis of the output signal of the pulse generator, and the inverter circuit processes rectangular wave feeding by the first rectangular wave driving means.

It further comprises phase error excess detecting means for issuing, when detecting an edge of an output signal of the pulse generator, a phase error excess signal by detecting that the absolute value of the difference of subtracting the present address value from the reference address value corresponding to the rotor magnetic pole position indicated by this edge has exceeded a preset value, wherein the inverter circuit temporarily processes rectangular wave feeding at the time of output of the phase error excess signal.

It further comprises phase error excess detecting means for issuing, when detecting an edge of an output signal of the pulse generator, a phase error excess signal by detecting that the absolute value of the difference of subtracting the present address value from the reference address value corresponding to the rotor magnetic pole position indicated by this edge has exceeded a preset value, a rotor magnetic pole position detecting circuit for detecting the magnetic pole position of rotor from induced voltage of motor, and second rectangular wave driving means for driving by feeding a rectangular wave on the basis of the output signal of the rotor magnetic pole position detecting circuit, wherein the inverter circuit temporarily processes rectangular wave feeding at the time of output of the phase error excess signal.

It further comprises phase error excess detecting means for issuing a phase error excess signal by detecting that the absolute value of the difference of subtracting the reference address value corresponding to the rotor magnetic pole position indicated by the latest edge of the output signal of the pulse generator from the present output address value of the address counter has exceeded a preset value, wherein the inverter circuit temporarily processes rectangular wave feeding at the time of output of the phase error excess signal.

It further comprises a period counter for measuring the edge detection period of output signal of the pulse generator, allowable period range setting means for setting an allowable range of periodic data to be measured next on the basis of the periodic data measured by the period counter, and period sudden change detecting means for issuing a period sudden change signal when the present counting value of the period counter has exceeded the allowable range set by the allowable period range setting means, or when the edge of the output signal of the pulse generator is detected before reaching the allowable range, wherein the inverter circuit temporarily processes rectangular wave feeding at the time of output of the period sudden change signal.

In this constitution, changeover from rectangular wave feeding process to feeding process according to the content of the waveform data memory is effected at the edge detection timing of output signal of the pulse generator, and simultaneously with this changeover, moreover, the reference address value corresponding to the rotor magnetic pole position indicated by the edge or its vicinity value is preset in the address counter.

In this constitution, the reference address value is a value that can be freely changed and set.

In this constitution, the reference address value is the sum of a value that can be freely changed and set, and a dynamically changing value during driving on the basis of the rotating speed of the motor or the current.

It further comprises a period counter for measuring the edge detection period of output signal of the pulse generator, plural period data memories for storing the past period data measured by the period counter, and a one-rotation period data operating means for reading out the period data memories, and adding and issuing the period data in the quantity corresponding to one rotation of the motor in the chronological sequence, wherein the rotating frequency detecting means creates the rotating frequency on the basis of the one-rotation period data obtained from the one-rotation period data operating means.

The rotor position detecting apparatus of motor constituted by applying the driving apparatus for the brushless motor of the present invention comprises rotor position detecting means for detecting the rotor position and issuing its position signal, and an address counter for counting the address corresponding to the rotor position at a higher resolution than the output signal of the rotor position detecting means, wherein adjustment of count speed of the address counter, presetting of the address, or combined operation of adjustment of count speed and presetting of the address is conducted depending on the output signal of the rotor position detecting means, so that the address issued by the address counter may follow up the rotor position, and the rotor position is identified on the basis of the output address value of the address counter.

It also comprises at least one pulse generator for issuing a signal indicating the rotor position, rotating frequency detecting means for detecting the frequency of an output signal of the pulse generator, an address counter for counting the address corresponding to the rotor position at a speed proportional to the rotating frequency value issued by the rotating frequency detecting means, and address correcting means for presetting, when detecting an edge of an output signal of the pulse generator, the reference address value corresponding to the rotor position indicated by this edge in the address counter, wherein the rotor position is identified on the basis of the output address value of the address counter.

It also comprises at least one pulse generator for issuing a signal indicating the rotor position, rotating frequency detecting means for detecting the frequency of an output signal of the pulse generator, first frequency adjusting means for issuing, when detecting an edge of an output signal of the pulse generator, the result of adding the rotating frequency issued by the rotating frequency detecting means, to the product of the difference of subtracting the present address value from the reference address value corresponding to the rotor position indicated by this edge and a control gain, as a frequency command, and an address counter for counting the address corresponding to the rotor magnetic pole position at a speed proportional to the frequency command value issued by the first frequency adjusting means, wherein the rotor position is identified on the basis of the output address value of the address counter.

It also comprises at least one pulse generator for issuing a signal indicating the rotor position, second frequency adjusting means for issuing, when detecting an edge of an output signal of the pulse generator, the result of adding the present frequency command, to the product of the difference of subtracting the present address value from the reference address value corresponding to the rotor position indicated by this edge and a control gain, as a new frequency command, and an address counter for counting the address corresponding to the rotor position at a speed proportional to the frequency command value issued by the second frequency adjusting means, wherein the rotor position is identified on the basis of the output address value of the address counter.

It also comprises at least one pulse generator for issuing a signal indicating the rotor position, rotating frequency detecting means for detecting the frequency of an output signal of the pulse generator, third frequency adjusting means for issuing, when detecting an edge of an output signal of the pulse generator, the result of adding the rotating frequency, to the product of the difference of subtracting the present address value from the reference address value corresponding to the rotor position indicated by this edge, the rotating frequency issued by the rotating frequency detecting means, and a control gain, as a frequency command, and an address counter for counting the address corresponding to the rotor position at a speed proportional to the frequency command value issued by the third frequency adjusting means, wherein the rotor position is identified on the basis of the output address value of the address counter.

It also comprises at least one pulse generator for issuing a signal indicating the rotor position, fourth frequency adjusting means for issuing, when detecting an edge of an output signal of the pulse generator, the result of adding the present frequency command, to the product of the difference of subtracting the present address value from the reference address value corresponding to the rotor position indicated by this edge, the present frequency command, and a control gain, as a new frequency command, and an address counter for counting the address corresponding to the rotor position at a speed proportional to the frequency command value issued by the fourth frequency adjusting means, wherein the rotor position is identified on the basis of the output address value of the address counter.

It also comprises at least one pulse generator for issuing a signal indicating the rotor position, fifth frequency adjusting means for issuing, when detecting an edge of an output signal of the pulse generator, the value of multiplying a fractional value consisting of a numerator which is the sum of an address error, being the difference of subtracting the present address value from the reference address value corresponding to the rotor magnetic pole position indicated by this edge and the unit address length corresponding to the unit period of waveform, and a denominator which is the sum of the value subtracting the address error from the unit address length and the address error at the previous time of detecting the edge, a control gain, and the present frequency command, as a new frequency command, and an address counter for counting the address corresponding to the rotor position at a speed proportional to the frequency command value issued by the fifth frequency adjusting means, wherein the rotor position is identified on the basis of the output address value of the address counter.

It further comprises frequency command correcting means for correcting a frequency command value by adding a value on the basis of the motor acceleration to the frequency command value.

It further comprises phase error excess detecting means for issuing, when detecting an edge of an output signal of the pulse generator, a phase error excess signal by detecting that the absolute value of the difference of subtracting the present address value from the reference address value corresponding to the rotor magnetic pole position indicated by this edge has exceeded a preset value.

It further comprises phase error excess detecting means for issuing a phase error excess signal by detecting that the absolute value of the difference of subtracting the reference address value corresponding to the rotor position indicated by the latest edge of the output signal of the pulse generator from the present output address value of the address counter has exceeded a preset value.

It further comprises a period counter for measuring the edge detection period of output signal of the pulse generator, allowable period range setting means for setting an allowable range of periodic data to be measured next on the basis of the periodic data measured by the period counter, and period sudden change detecting means for issuing a period sudden change signal when the present counting value of the period counter has exceeded the allowable range set by the allowable period range setting means, or when the edge of the output signal of the pulse generator is detected before reaching the allowable range.

In this constitution, the reference address value is a value that can be freely changed and set.

In this constitution, the reference address value is the sum of a value that can be freely changed and set, and a dynamically changing value during driving on the basis of the rotating speed of the motor or the current.

It further comprises a period counter for measuring the edge detection period of output signal of the pulse generator, plural period data memories for storing the past period data measured by the period counter, and a one-rotation period data operating means for reading out the period data memories, and adding and issuing the period data in the quantity corresponding to one rotation of the motor in the chronological sequence, wherein the rotating frequency detecting means creates the rotating frequency on the basis of the one-rotation period data obtained from the one-rotation period data operating means.

According to this constitution, if the output signal of the rotor position detecting means is low resolution, since the output address of the address counter follows up the rotor position, substantially, the information of the output signal of the rotor position detecting means is interpolated by the address counter having a high count resolution. Hence, the rotor position can be detected finely, and the motor can be driven by an arbitrary waveform written in the waveform data memory.

Also according to the constitution in which every time the first frequency adjusting means detects the edge of output signal of the pulse generator, the result of adding the rotating frequency to the product of the address error and control gain is issued as the frequency command, and the address counter counts at the speed proportional to this frequency command value, the address error is corrected by varying the counting speed of the address counter, and therefore sudden change of address is eliminated and the output waveform may be smoother.

Also according to the constitution in which every time the second frequency adjusting means detects the edge of output signal of the pulse generator, the result of adding the present frequency command to the product of the address error and control gain is issued as a new frequency command, and the address counter counts at the speed proportional to this frequency command value, the constituent elements do not require rotating frequency detecting means.

Also according to the constitution in which every time the third frequency adjusting means detects the edge of output signal of the pulse generator, the result of adding the rotating frequency to the product of the address error, rotating frequency and control gain is issued as the frequency command, and the address counter counts at the speed proportional to this frequency command value, the frequency operating amount when correcting the address error varies depending on the rotating frequency, so that a stable address error correction is realized regardless of the magnitude of the rotating frequency.

Also according to the constitution in which every time the fifth frequency adjusting means detects the edge of output signal of the pulse generator, the value of multiplying a fractional value consisting of a numerator which is the sum of an address error and the unit address length corresponding to the unit period of waveform, and a denominator which is the sum of the value subtracting the address error from the unit address length and the address error at the previous time, a control gain, and the present frequency command is issued as a new frequency command, and the address counter counts at the speed proportional to this frequency command value, by considering also the previous address error when adjusting the frequency, the constituent elements do not require rotating frequency detecting means, and a stable address error correction is realized regardless of the magnitude of rotating frequency or previous address error amount.

Also according to the constitution further comprising frequency command correcting means for correcting the frequency command value by adding a value based on the motor acceleration to the frequency command value, if the motor speed changes, by correcting the frequency command value according to such change, a stable address error correction is realized.

Also according to the constitution designed to start by commanding the rotating frequency gradually elevating with the passing of the time to the address counter, it is possible to start without resort to external force, and moreover in the case of the inverter circuit feeding DC for a specific time before start or in the case of starting the motor by rectangular wave driving according to the output signal of the plural pulse generator for the number of phases of the motor, a high torque is generated when starting up, so that a stable starting characteristic may be obtained.

Also according to the constitution for temporary rectangular wave driving if the address error exceeds a preset value, even when an external torque is applied suddenly to the motor to increase the address error, the rotation can be maintained by holding the driving torque, and further if rectangular wave driving at this time is designed to be effected by detecting the magnetic pole position of the rotor from the induced voltage from the motor, it is possible to compose with a small number of pulse generators.

Also according to the constitution in which changeover from rectangular wave feeding process to feeding process according to the content of the waveform data memory is effected at the edge detection timing of output signal of the pulse generator, and simultaneously with this changeover, moreover, the reference address value or its vicinity value is preset in the address counter, the address error is eliminated at the time of changeover of driving waveform, the torque fluctuation is small, and therefore changeover can be done smoothly.

Also according to the constitution in which the reference address value corresponding to the edge of the output signal of the pulse generator can be set and changed arbitrarily, the correspondence error between the rotor magnetic pole position and reference address value caused by the problem of mechanical mounting precision of the pulse generator can be easily corrected, and moreover in the case the reference address value is changed dynamically during driving on the basis of the rotating speed of the motor or current, the phase advance processing for preventing delay of current phase due to increase in the rotating speed can be realized easily.

Also according to the constitution in which the periodic data between edges of the output signal of the pulse generator is stored sequentially in the periodic data memory, and the rotating frequency is created according to the one-rotation periodic data by reading out and adding sequentially from the latest data for the portion of one rotation of the motor, it is free from effects of error of periodic data between edges caused by fluctuation of rotor magnetization, characteristic of pulse generator, and mechanical mounting precision, and the rotating frequency is detected at high precision, so that stable driving is realized.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 10 is a time chart showing the operation of the fourth embodiment.

DETAILED DESCRIPTION OF THE EMBODIMENTS

Figure 1:
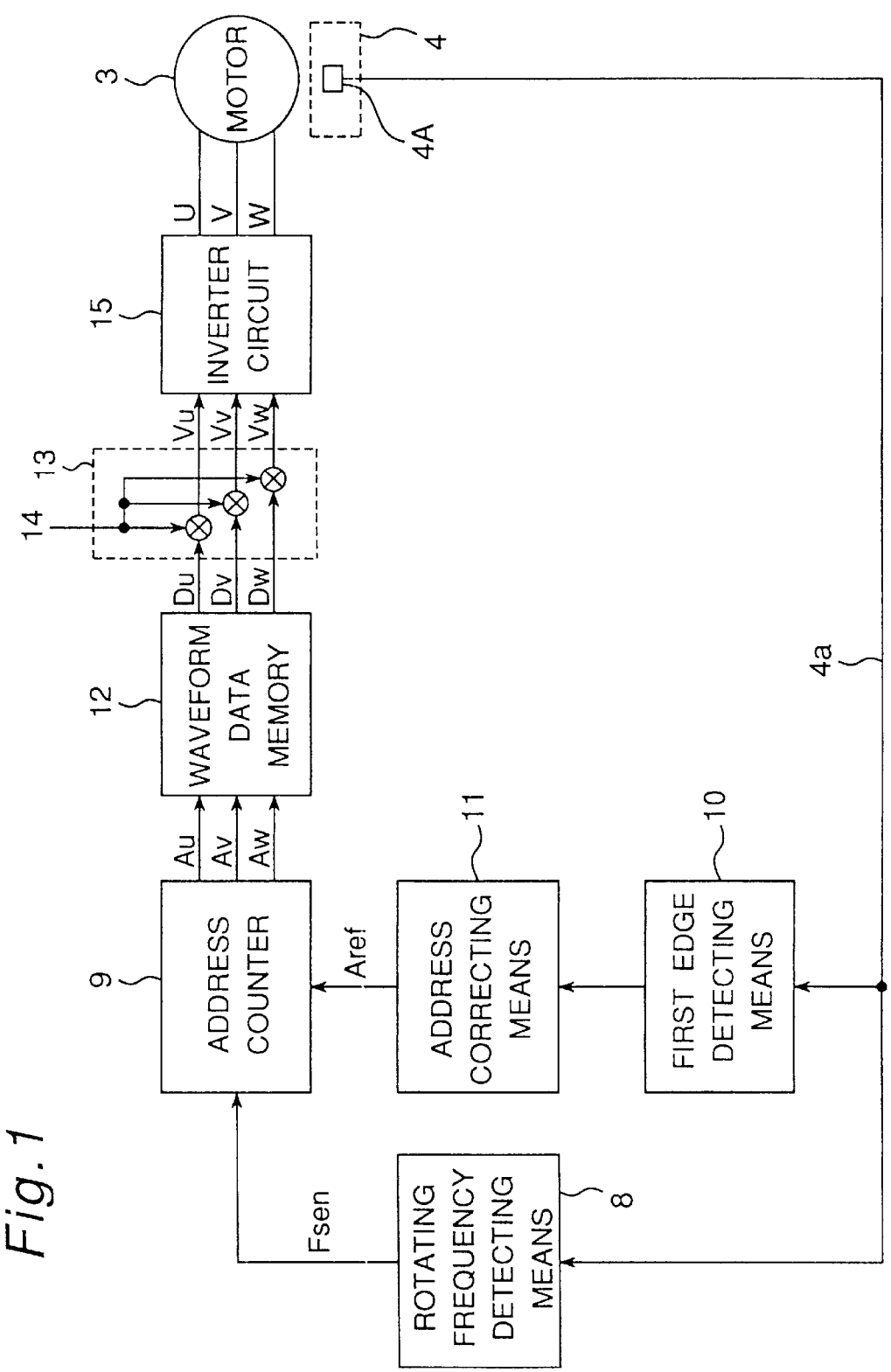
FIG. 1 is a block diagram showing a first embodiment of a driving apparatus for the brushless motor of the present invention.

Referring now to the drawings, embodiments of the present invention are sequentially described below.
(Embodiment 1)

FIG. 1 is a block diagram showing a first embodiment of a driving apparatus for the brushless motor of the present invention. In FIG. 1, rotor position detecting means 4 includes a pulse generator 4A which is the same as that in the prior art, and it detects the magnetic pole position of the rotor of the motor 3 and issues it as pulse signal 4a. Rotating frequency detecting means 8 detects the frequency of the pulse signal 4a and issues it as rotating frequency Fsen. An address counter 9 counts up and issues an address Au at a speed proportional to the signal Fsen so that the overflow period and the period of pulse signal 4a may coincide with each other, and this output address Au corresponds to the magnetic pole position of the rotor of the motor 3. This address counter 9 also issues, aside from Au, simultaneously Av and Aw created by reference to Au, and Au, Av and Aw individually have an address difference corresponding to an electric angle of 120 degrees each. First edge detecting means 10 detects a leading edge of the pulse signal 4a, and address correcting means 11 presets a reference address value Aref corresponding to the magnetic pole position of the rotor of the motor 3 indicated by the edge at the time of edge detection in the address counter 9, that is, the value of address Au is set to reference address value Aref by force. A waveform data memory 12, in which reference amplitude data of sinusoidal wave is written, reads out the data on the input addresses Au, Av and Aw, and issues respectively as phase output waveform data Du, Dv and Dw. Phase output command creating means 13 multiplies the phase output waveform data Du, Dv and Dw by a DC command value 14, and creates phase output command values Vu, Vv and Vw. An inverter circuit 15 processes by PWM according to the phase output command values Vu, Vv and Vw, and issues and controls the electric power for driving the motor 3.

Figure 2:
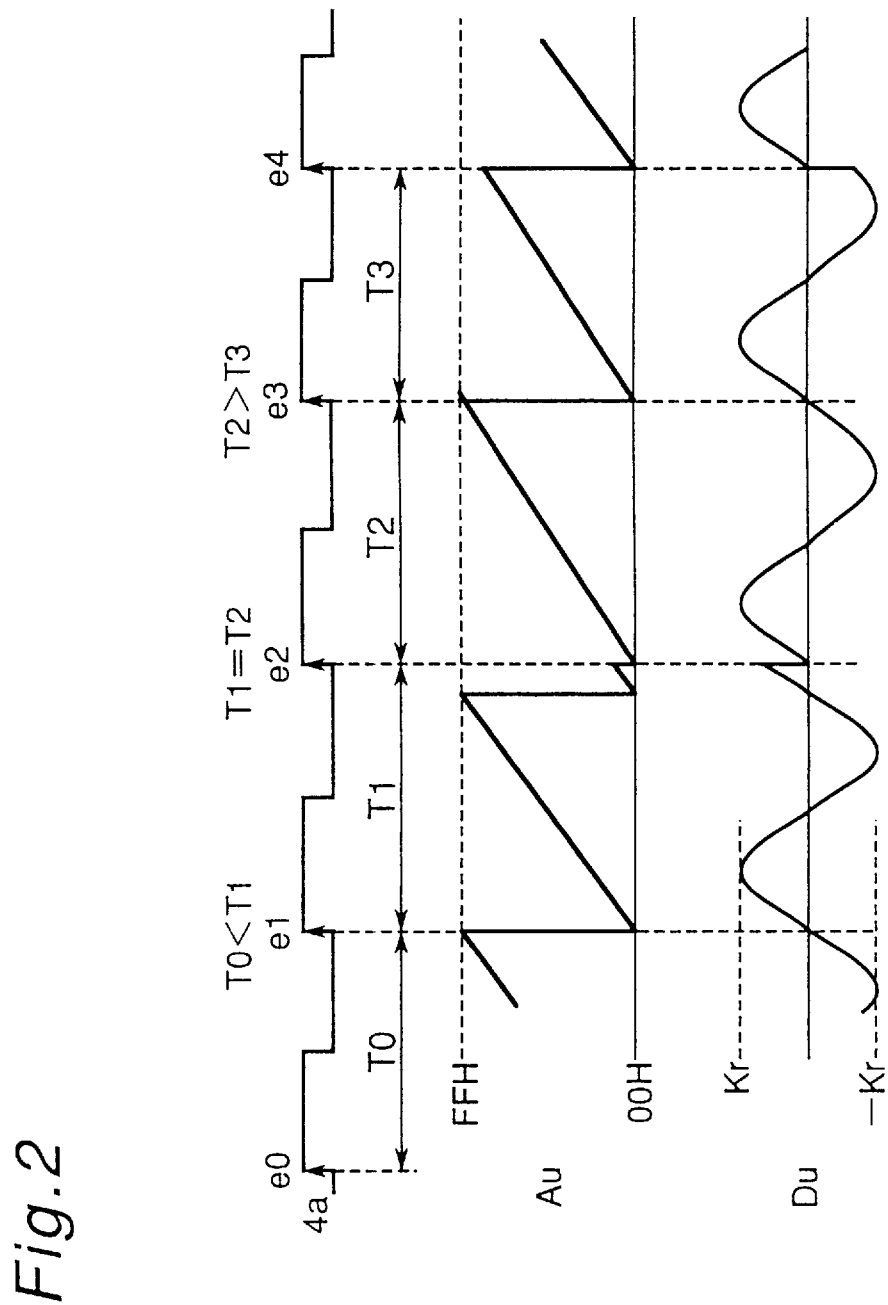
FIG. 2 is a time chart showing the operation of the first embodiment.
Figure 3:
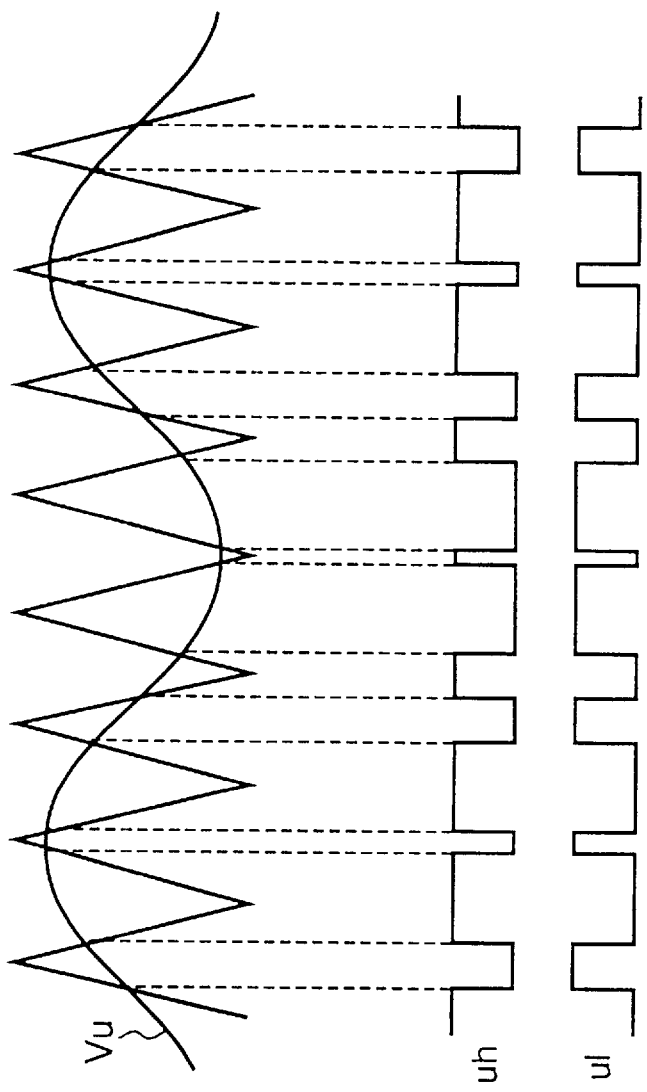
FIG. 3 is an operation explanatory diagram of the first embodiment.

In this constitution, the operation is described while referring also to FIG. 2 and FIG. 3. In the following description, the data length of the address counter 9 is 8 bits, the maximum value of the address is FFH, and the reference address value Aref is 00H.

While the motor 3 is rotating, the rotating frequency detecting means 8 detects the rotating frequency by period measurement, from the pulse signal 4a indicating the magnetic pole position of the rotor issued by the pulse generator 4A. For example, measuring the period T0 of the interval from edge e0 to edge e1, the value determined by inverse number calculation from the period T0 is transmitted to the address counter 9 as the rotating frequency Fsen until a next edge e2 newly arrives. That is, in the interval from edge e1 to edge e2, the rotating frequency Fsen is Fsen=Kf/T0 wherein Kf is a coefficient. The same operation is repeated, and therefore Fsen=Kf/T1 in the interval from edge e2 to edge e3, and Fsen=Kf/T2 in the interval from edge e3 to edge e4.

The address counter 9 counts the address Au at a speed proportional to the rotating frequency Fsen so that the overflow period may coincide with the period of the pulse signal 4a. At the leading edge of the pulse signal 4a, the address correcting means 11 presets the reference address value Aref in the address counter 9, and Au becomes 00H.

As a result of these operations, when the previous edge period T1 and present edge period T2 are equal such as the interval from edge e2 to edge e3, the timing of the final edge e3 of the period and the timing when the address counter 9 is not preset but spontaneously overflows until the address Au becomes 00H coincide with each other. That is, in the period from this edge e2 to edge e3, the address Au indicates the correct rotor magnetic pole position.

To the contrary, when the previous edge period and present edge period are different, such as the interval from edge e1 to edge e2 or the interval from edge e3 to edge e4, the timing of the final edge e3 of the period and the timing when the address counter 9 is not preset but spontaneously overflows until the address Au becomes 00H do not coincide with each other, that is, the address Au is not indicating the correct rotor magnetic pole position, and an error is caused. However, at the final edge timing of the period, by the preset operation of the address correcting means 11, the address Au becomes 00H, and the error of the address Au is corrected.

The address Au is issued as phase output waveform data Du having the reference amplitude value of the phase voltage entering phase U of the motor 3 as it is given to the waveform data memory 12 and waveform data corresponding to the value of the address Au is read out. At this time, in order that the motor 3 may issue the maximum torque, the phases are designed to correspond to each other between the input address Au and output data Du, and when the output data Du is expressed as Du=Kr·sinθ, FIG. 2 shows an example in which 00H of address Au and θ=0 correspond to each other. Herein, Kr is the reference amplitude value.

The address counter 9 subtracts, aside from Au, the address amount corresponding to an electric angle of 120 degrees from Au to create Av, and further subtracts the address amount corresponding to an electric angle of 120 degrees from Av to create and issue Aw, so that Au, Av and Aw mutually have an address difference corresponding to an electric angle of 120 degrees. The addresses Av and Aw, same as Au, are given to the waveform data memory 12, and the waveform data corresponding to these values are read out, and issued as phase output waveform data Dv and Dw to be entered in phase V and phase W of the motor 3. Consequently, the phase output waveform data Du, Dv and Dw are three-phase sinusoidal data having a mutual phase difference of 120 degrees.

The operation of reading out the content of the waveform data memory 12 corresponding to the values of the addresses Au, Av and Aw is, aside from the reading out of the content of the waveform data memory 12 indicated by the addresses Au, Av and Aw, directly by using the values of the addresses Au, Av and Aw, for example, to read out the content of the waveform data memory 12 indicated by the higher address by using only the higher side bits without using the lower side bits of the addresses Au, Av and Aw.

These phase output waveform data Du, Dv and Dw are multiplied by the DC command value 14 in the phase output command creating means 13 and become phase output command values Vu, Vv and Vw having an amplitude value proportional to the DC command value 14, and the inverter circuit 15 processes by PWM according to the phase output command values Vu, Vv and Vw, issues and controls the electric power, and drives the motor 3. FIG. 3 shows only phase U in PWM processing at this time by the inverter circuit 15, in which uh and ul are created by comparing the magnitude of the phase output command value Vu and triangular wave, and these signals provided with, if necessary, simultaneous conduction preventive period of upper and lower arms are used as the feeding signals of the power transistors. The DC command value 14 means the command value for DC-like operation as compared with the AC-like operation of the phase output waveform data Du, Dv and Dw, and it does not mean the DC not changing in time in its strict sense of meaning.

The motor 3 is driven in this way, but when correct rotor magnetic pole position is not indicated due to error in address Au, such as the interval from edge e1 to edge e2 or the interval from edge e3 to edge e4 in FIG. 2, the phases of the output phase command values Vu, Vv and Vw are deviated from the phase for obtaining the maximum output torque, and therefore the output torque is disturbed. However, the motor 3 has its inertia, and when driving a load of a large moment of inertia such as the fan, in particular, its inertial force acts largely, and therefore, unless the error of address Au is extremely large, it does not cause to vary significantly the rotating frequency of the motor 3 suddenly. Hence, if there is an error in the address Au, the edge period of the pulse signal 4a is constant, and if an error occurs in the address Au in transition, usually, by the above operation, the address Au is completely free from error, and a correct rotor magnetic pole position is indicated. The interval between two edges of the pulse signal 4a of unknown rotor magnetic pole position can be correctly complemented by the high resolution of the address counter 9, so that a stable sinusoidal driving is realized.

Thus, according to the embodiment, by counting up the address Au corresponding to the rotor magnetic pole position at a speed proportional to the rotating frequency of the motor 3, and presetting the reference address value Aref in the address Au at the time of edge detection of output signal by the pulse generator 4A, the address Au indicates the correct rotor magnetic pole position, and sinusoidal driving is effected according to this address Au, so that noise and vibration can be reduced. As the pulse generator 4A, a simple structure using Hall elements and others may be sufficient, and the majority of the constitution can be easily realized by the software, so that it can be presented at low cost.

Figure 4:
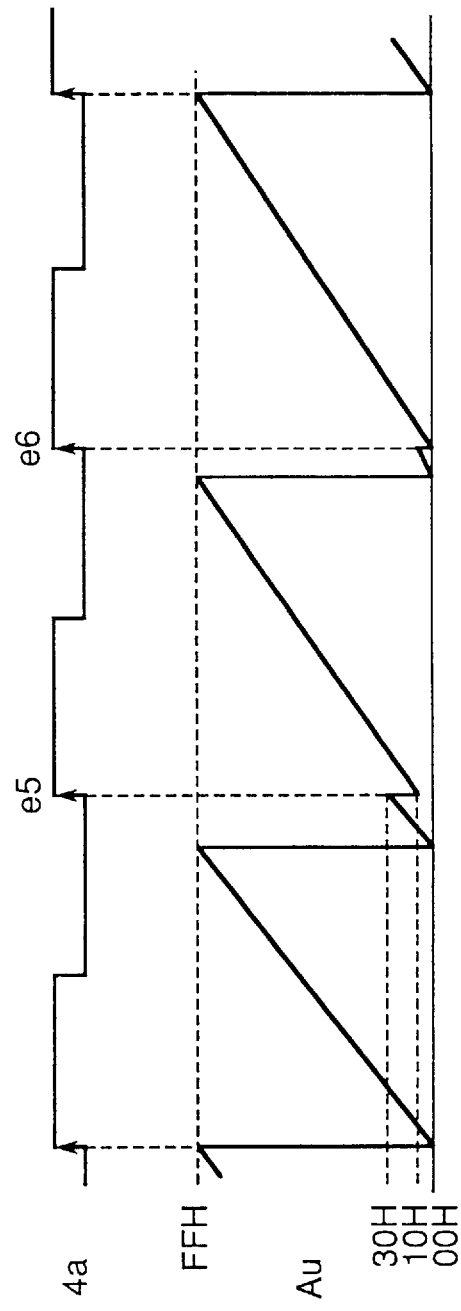
FIG. 4 is a time chart showing the operation of the first embodiment.

In this embodiment, at the leading edge of the pulse signal 4a, the address Au is unconditionally preset in the reference address value Aref, but if the error of address Au is large, instead of correcting that error at once, an upper limit may be provided in the absolute value of correction amount, and complete correction may be done at the subsequent edge. FIG. 4 shows such operation, in which the upper limit of the absolute value of correction amount is 20H. At edge e5 of pulse signal 4a, the error of address Au is 30H, and if the reference address value Aref of 00H is preset at once, the absolute value of correction amount is 30H, which exceeds the upper limit, and therefore the correction amount is limited at 20H at the upper limit, and 10H is preset. Subsequently, at next edge e6, 00H is preset to correct completely. By thus controlling the address correction amount in a specific range, changes of output torque become small, so that stable operation and low noise may be realized.

A plurality of pulse generators may be also provided, and in this case, at every edge for obtaining plural pulse signals, the corresponding reference address value Aref is preset, and every time an edge is detected, the reference address value Aref corresponding to the edge is preset in the address counter 9. In this way, the number of times of correction of error of address Au per rotation of motor 3 is increased, and the control may be more stable. As the pulse generator 4A, a Hall element is used, but, not limited to this, a coil for detecting magnetic pole of rotor may be provided in the stator of the motor 3, or it may be constituted to detect the induced voltage of the motor 3, among other examples.

The pulse generator 4A is not necessarily required to detect the magnetic pole position of the rotor directly, but, for example, by making use of the rule that the electrical angle is determined from the mechanical angle, the pulse generator 4A may be also designed to detect the mechanical rotor position. In this case, the result is the same when the signal is issued by transforming into a signal corresponding to the magnetic pole position of the rotor. Alternatively, while the output signal of the pulse generator 4A indicates a mechanical rotor position, the address counter 9 counts the address corresponding to the mechanical position of the rotor and the content of the waveform data memory 12 is issued as the output waveform data corresponding to the mechanical position of the rotor. That is, it may be designed to compose so as to control on the basis of the mechanical angle of the rotor. In such constitution, not limited to the brushless motor, it may be used as the driving apparatus for synchronous motors in general, including reluctance motor not having magnet, and it can be used in a very wide scope of applications.

Incidentally, the rotating frequency detecting means 8 is constituted to detect the frequency of the pulse signal 4a so that the address counter 9 counts at a speed proportional to this rotating frequency Fsen, but by detecting only the edge period without determining the frequency of the pulse signal 4a, it may be constituted so that the address counter 9 operates in the count period proportional to this period. This is only the difference in the process of operation, whether in frequency or in period, and there is no difference substantially.

The address counter 9 is explained as an up-counter, but, using two pulse generators, of which output signals are two phase signals with a phase difference of 90 degrees, when designed to change over the address counter 9 between up-counter and down-counter depending on the rotating direction of the motor 3 by detecting the rotating direction of the motor 3, it can be used in the application where the motor 3 rotates in both normal and reverse directions.

The data of the waveform data memory 12 is explained as sinusoidal wave, but it is not limited to sinusoidal wave alone. Generally, in a PWM inverter circuit, when the phase voltage command is formed in a waveform of sinusoidal wave on which a higher frequency wave of integer times of third order is superposed, the maximum value of line voltage may be allowed larger than in the case of sinusoidal wave, and the utility rate of voltage may be enhanced. Therefore, the data of the waveform data memory 12 may be such waveform. Furthermore, if the waveform of the induced voltage of the motor 3 is not sinusoidal wave, the current flowing in the motor 3 is not sinusoidal wave, but in this case by deforming the data of the waveform data memory 12 depending on the waveform of the induced voltage of the motor 3, the current flowing in the motor 3 may be formed in sinusoidal wave. The power element inside the inverter circuit 15 is basically designed to turn on either one of the upper arm and lower arm, and turn off the other one, but when constituted to turn off both upper arm and lower arm when the value of the waveform data memory 12 coincides with a preset value, that is, to form a state not to establish the potential of the phase, the motor driving waveform may be formed into an arbitrary waveform of a higher degree of freedom. This is particularly effective when forming the driving waveform into a rectangular waveform for emphasizing the enhancement of the efficiency rather than the reduction of noise and vibration, when setting the feeding angle arbitrarily, or when detecting the induced voltage by making use of the OFF period of both upper arm and lower arm while the motor is being driven. That is, in the constitution of the embodiment, since the motor 3 can be driven in an arbitrary waveform by changing the data of the waveform data memory 12 depending on the purpose, it can be applied in other purpose such as enhancement of efficiency, aside from reduction of noise and vibration, and the scope of application is wide. In addition, if the data of the waveform data memory 12 is less than one period, it may be designed to reproduce one period.

Although the inverter circuit 15 has been described performing PWM control, if there is no problem of loss of power transistor, the power transistor may be used in active region. Instead of voltage control, it may be also constituted to control the current, using the phase output command values Vu, Vv and Vw as phase current commands by installing current detecting means for detecting the phase current. Although the cost is increased, this is a preferred constitution because there is no effect of waveform distortion of the induced voltage of the motor 3 which causes control error and the output torque is stabilized.

(Embodiment 2)

Figure 5:
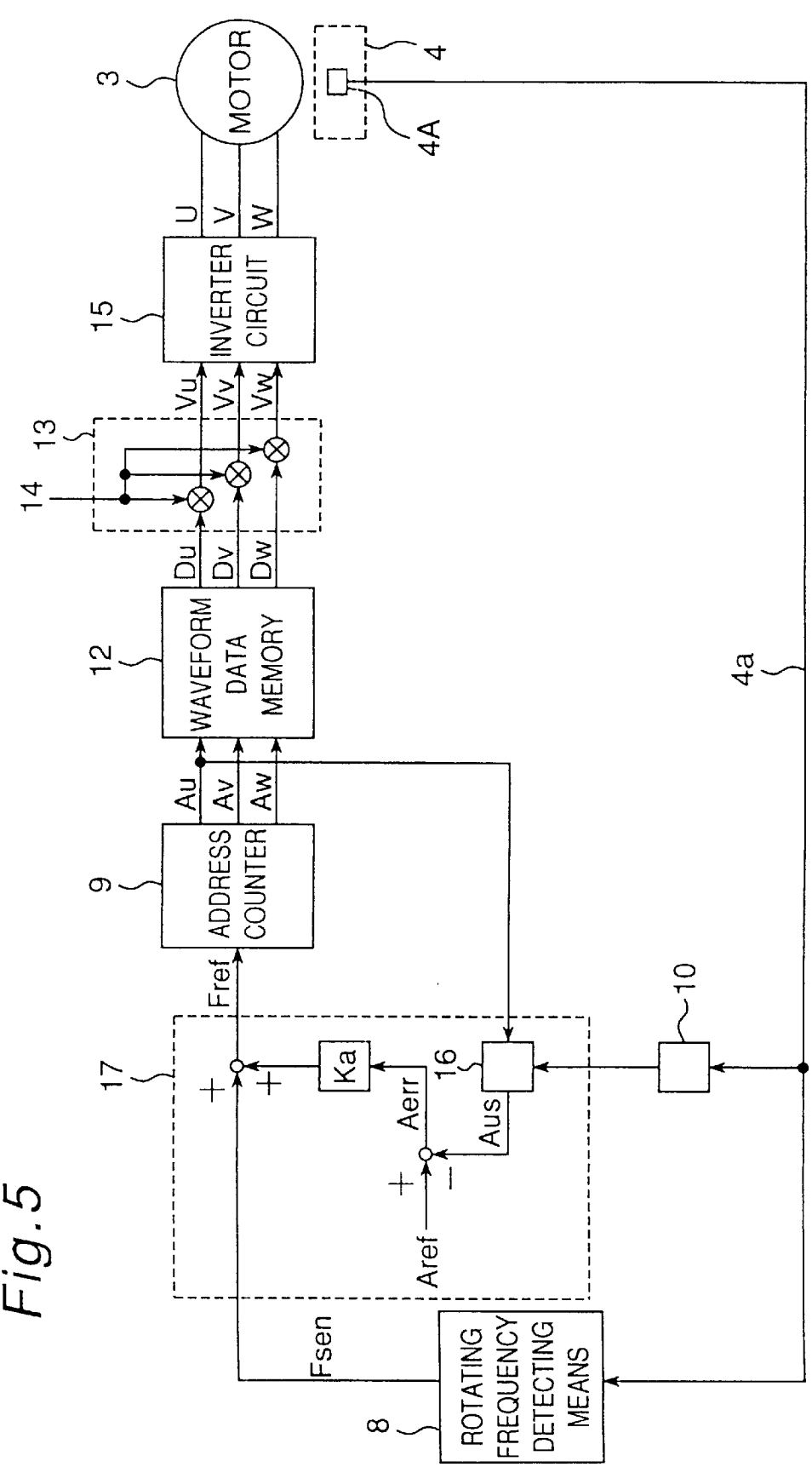
FIG. 5 is a block diagram of a second embodiment.

FIG. 5 is a block diagram showing a second embodiment of the present invention. In FIG. 5, the rotor position detecting means 4, rotating frequency detecting means 8, first edge detecting means 10, address counter 9, waveform data memory 12, phase output command creating means 13, DC command value 14, and inverter circuit 15 are same as in the constitution in FIG. 1 relating to the first embodiment. What differs from the constitution in FIG. 1 is to comprise a first data latch 16 for holding the value of address Au and issuing as address Aus at the output signal timing of the first edge detecting means 10, and first frequency adjusting means 17, including it, for issuing the result of adding the rotating frequency Fsen to the product of the address error Aerr obtained by subtracting the address value Aus held by the first data latch 16 from the reference address value Aref and control gain Ka, to the address counter 9 as frequency command Fref.

The operation of the second embodiment is described below by referring only to the points different from the first embodiment.

According to the first frequency adjusting means 17, when the first edge detecting means 10 detects the leading edge of the pulse signal 4a, the first data latch 16 holds the present output address Au at this timing, and the held data is issued as the address value Aus. The address value Aus is subtracted from the reference address value Aref corresponding to the rotor magnetic pole position of the motor 3 at the leading edge of the pulse signal 4a to obtain address error Aerr, and the product of this address error Aerr and control gain Ka is added to the rotating frequency Fsen, and the obtained frequency command Fref is issued to the address counter 9. Therefore, the frequency command Fref is Fref=Fsen+Ka·Aerr.

The operation of the address counter 9 is the same as that in the first embodiment, but the address Au is only counted up at a speed proportional to the entered frequency command Fref, but is not preset.

Figure 6:
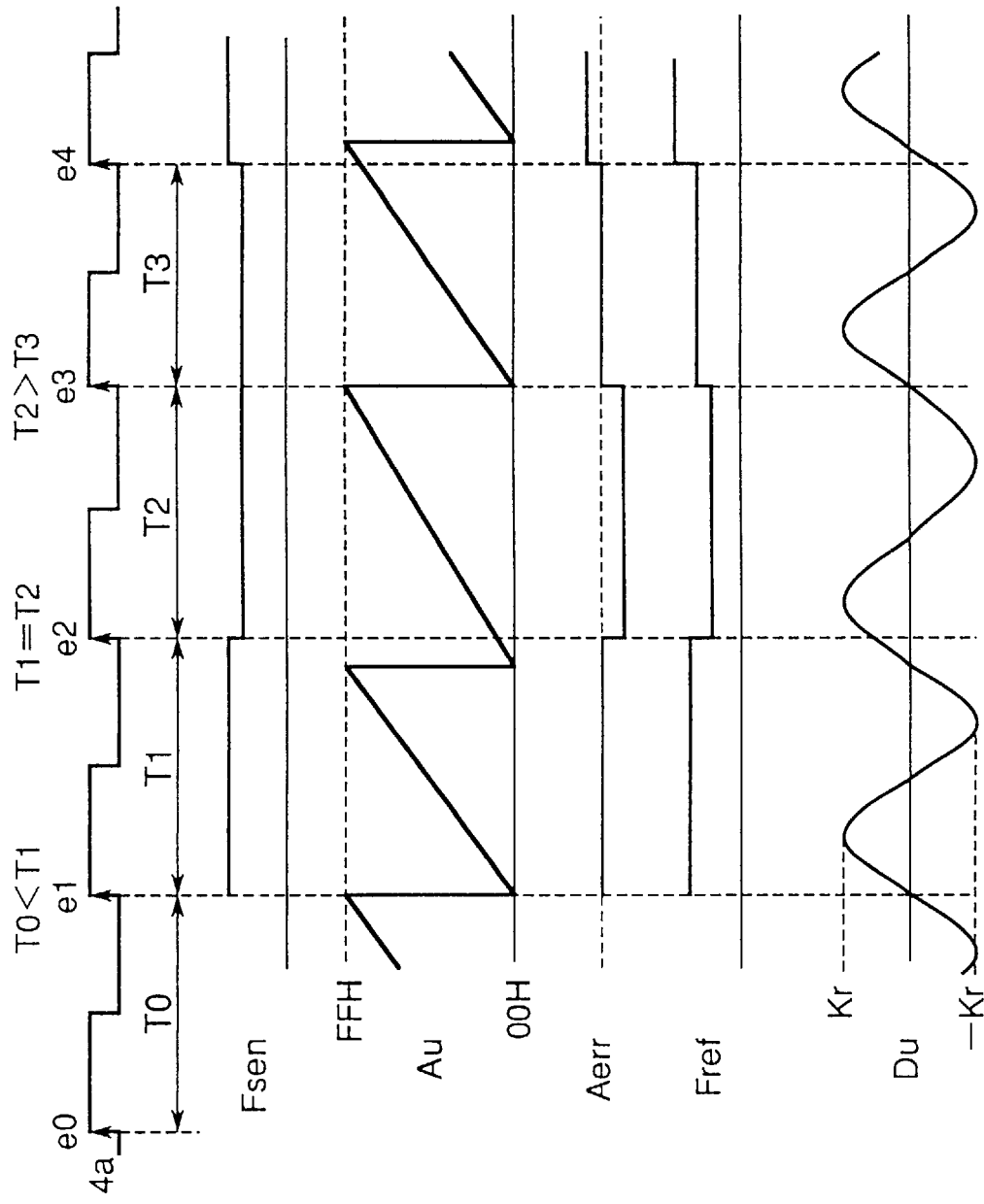
FIG. 6 is a time chart showing the operation of the second embodiment.

The operation of the parts in FIG. 5 is explained below by referring also to FIG. 6. As is the case with the first embodiment, the maximum value of address Au is FFH, the reference address Aref is 00H, and address Au at the timing of edge e1 is 00H. In the subtraction for creating the address error Aerr, if overflow or underflow occurs, carry or borrow at such time is ignored and the address error Aerr is calculated, and the address error Aerr obtained as a result is handled as a numerical value having positive and negative polarity expressed by a complement of 2. Therefore, at the edge, if the value of the address Au is in a range from 01H to 80H, the address error Aerr is a negative value, or when the value of the address Au is in a range from 81H to FFH, the address error Aerr is a positive value.

First, at the timing of edge e1, the address Au is 00H, being equal to the reference address value Aref, and the address error Aerr is zero. Hence, in the interval from edge e1 to edge e2, the frequency command Fref is same as the rotating frequency Fsen, and since the rotating frequency Fsen is Fsen=Kf/T0, the frequency command Fref is Fref=Kf/T0. Therefore, when the edge period T1 is equal to T0, as mentioned in the first embodiment, the address Au overflows spontaneously at edge e2 to be 00H same as the reference address value Aref, but since the edge period T1 is greater, at edge e2, the address Au exceeds the reference address value Aref, and a negative address error Aerr occurs. Hence, in the interval from edge e2 to edge e3, the frequency command Fref is a smaller value than the rotating frequency Fsen, and the rotating speed Fsen at this time is Fsen Kf/T1, and hence the frequency command Fref is Fref<Kf/T1. Supposing the address counter 9 is operated to count at the value of Kf/T1, although the edge period T1 is equal to T2, the address error Aerr at edge e2 is not zero, and different from the first embodiment, therefore, the timing of edge e3 and the timing of the address Au becoming 00H do not coincide with each other. However, since the frequency command Fref is Fref<Xf/T1 and the control gain Ka for determining this difference is set at a proper value, at edge e3, the address Au is 00H equal to the reference address value Aref, and the address error Aerr is zero. The address error Aerr is positive, as noted at edge e4, only when the polarity for increasing or decreasing the frequency command Fref is changed, and the operation is similar, and the frequency command Fref is set at a larger value than the rotating frequency Fsen, and the address error Aerr is eliminated.

In this way, if the address error Aerr is not zero, by increasing or decreasing the frequency command Fref to be issued to the address counter 9, the operation proceeds in the direction to eliminate the address error Aerr, and the error is corrected so that the address Au may indicate the correct rotor magnetic pole position. What differs from the first embodiment that there is no point of sudden change of address Au in a series of actions, and hence discontinuous point does not occur in the phase output waveform data Du. Hence, the phase output command values Vu, Vv and Vw are smooth and continuous, fluctuations of output torque are decreased, and the noise is further reduced.

Thus, according to this embodiment, since the first frequency adjusting means 17 issues the result of adding the rotating frequency Fsen to the product of the address error Aerr obtained by subtracting the address value Au held by the first data latch 16 from the reference address value Aref and control gain Ka as frequency command Fref, and the address counter 9 operates at a counting speed corresponding to this frequency command Fref, it is possible to correct to indicate the correct rotor magnetic pole position without sudden change of address Au. Accordingly, phase output command values Vu, Vv and Vw are smooth, and disturbance of output torque is less, so that the noise and vibration may be reduced. As the pulse generator 4A, a simple structure using Hall element or the like may be enough, and the majority of the constitution is easily realized by the software, so that it can be presented at low cost.

Moreover, due to the characteristic, mechanical mounting error or noise of the pulse generator 4A, if the motor 3 is rotating at constant speed uniformly, fluctuations may occur in the period of the output pulse signal 4a. In such a case, in the constitution in the foregoing embodiment 1, since the address counter 9 is preset when detecting the edge of the pulse signal 4a, the error is directly transmitted to the inverter circuit 15, and an output phase error is caused. In particular, when using a Hall element as the pulse generator 4A and using a plurality thereof, it is generally difficult to dispose the Hall elements mutually at uniform intervals, and this problem becomes more difficult. In the constitution of the embodiment, by contrast, instead of presetting the address counter 9 immediately when detecting the edge of the pulse signal 4a, it is controlled so as to eliminate gradually the address error Aerr occurring in this period, and it is hence effective to lessen the effect of the period error of the output pulse signal 4a on the output. By setting the control gain Ka at a small value so as to act less sensitively to the address error Aerr, this effect may be further enhanced.

In this embodiment, the operation is processed by the frequency, but it may be also done by the period, and in this case, therefore, the rotating frequency detecting means 8 detects only the edge period of the pulse signal 4a, while the first output frequency adjusting means 17 subtracts the product of the address error Aerr and control gain Ka from the detected edge period, and transmits to the address counter 9 as the period command, so that the address counter 9 counts in the count period proportional to this period command.

The pulse generator may be also provided in a plurality, and in this case, at every edge obtained from the plural pulse signals, the corresponding reference address value Aref is preset, and every time the edge is detected, the reference address value Aref corresponding to the edge is selected, and a series of actions can be done. In this way, the number of operations for error correction of address Au per rotation of the motor 3 is increased, and the control may be more stable.

Still more, by up/down operation of the address counter 9, it is applicable to both normal and reverse rotations of the motor 3, the data of the waveform data memory 12 is not limited to sinusoidal wave, and when a higher frequency wave of integer multiple of third order is superposed on the sinusoidal wave, the voltage utility can be enhanced, the inverter circuit 15 may be also constituted to use the power transistor in the active region, instead of PWM control, the current control may be applied instead of voltage control, others than Hall elements can be also used as the pulse generator 4A, and it is also possible to control on the basis of the mechanical angle of the rotor, which are same as explained in the first embodiment.

(Embodiment 3)

Figure 7:
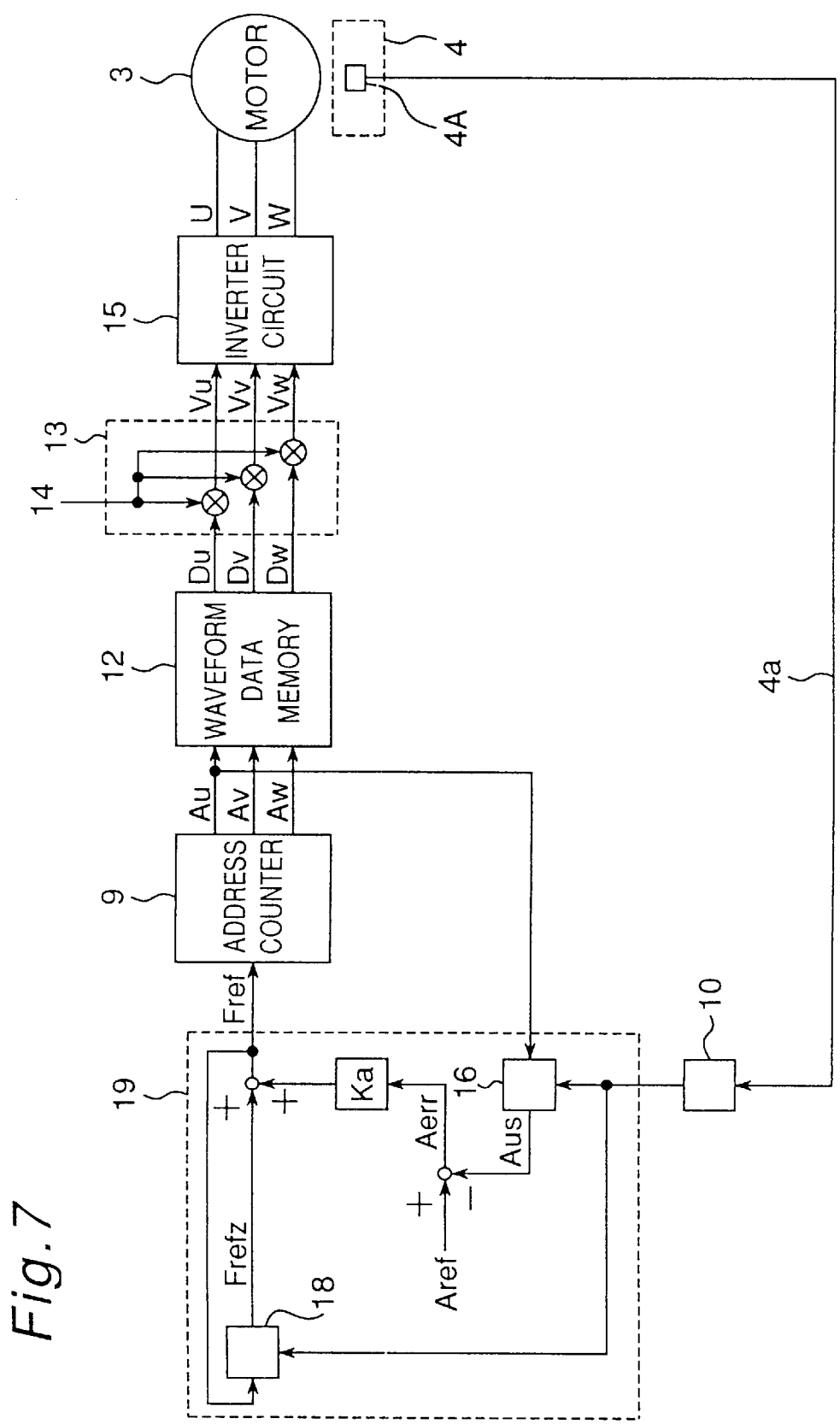
FIG. 7 is a block diagram of a third embodiment.

FIG. 7 is a block diagram showing a third embodiment of the present invention. The constitution shown in FIG. 7 is close to the constitution in FIG. 5 showing the second embodiment, and what differs from FIG. 5 is to comprise, without comprising the rotating frequency detecting means 8, in place of the first frequency adjusting means 17, a first data latch 16 for holding the value of address Au at the output signal timing of the first edge detecting means 10 and issuing as address value Aus, a second data latch 18 for holding the value of the present frequency command Fref at the same timing and issuing as frequency Frefz, and second frequency adjusting means 19, including them, for issuing the result of adding the frequency Frefz held by the second data latch 18 to the product of address error Aerr obtained by subtracting the address value Aus held by the first data latch 16 from the reference address value Aref and control gain Ka to the address counter 9 as the frequency command Fref.

The operation of the third embodiment is described below.

According to the second frequency adjusting means 19, when the first edge detecting means 10 detects the leading edge of the pulse signal 4a, the first data latch 16 holds the present output address Au at this timing, and the held data is issued as address value Aus. At the same timing, the second data latch 18 holds the present frequency command Fref, and the held data is issued as frequency Frefz. Consequently, the address value Aus is subtracted from the reference address value Aref corresponding to the rotor magnetic pole position of the motor 3 indicated by the leading edge of the pulse signal 4a to obtain address error Aerr, and the product of this address error Aerr and the control gain Ka is added to the frequency Frefz, and the obtained frequency command Fref is issued to the address counter 9. Therefore, the frequency command Fref is Fref= Frefz+Ka·Aerr.

What differs from the operation in the second embodiment is that the present frequency command of Frefz is added, instead of the rotating frequency Fsen, to the product of the address error Aerr and control gain Ka to create newly the frequency command Fref.

Figure 8:
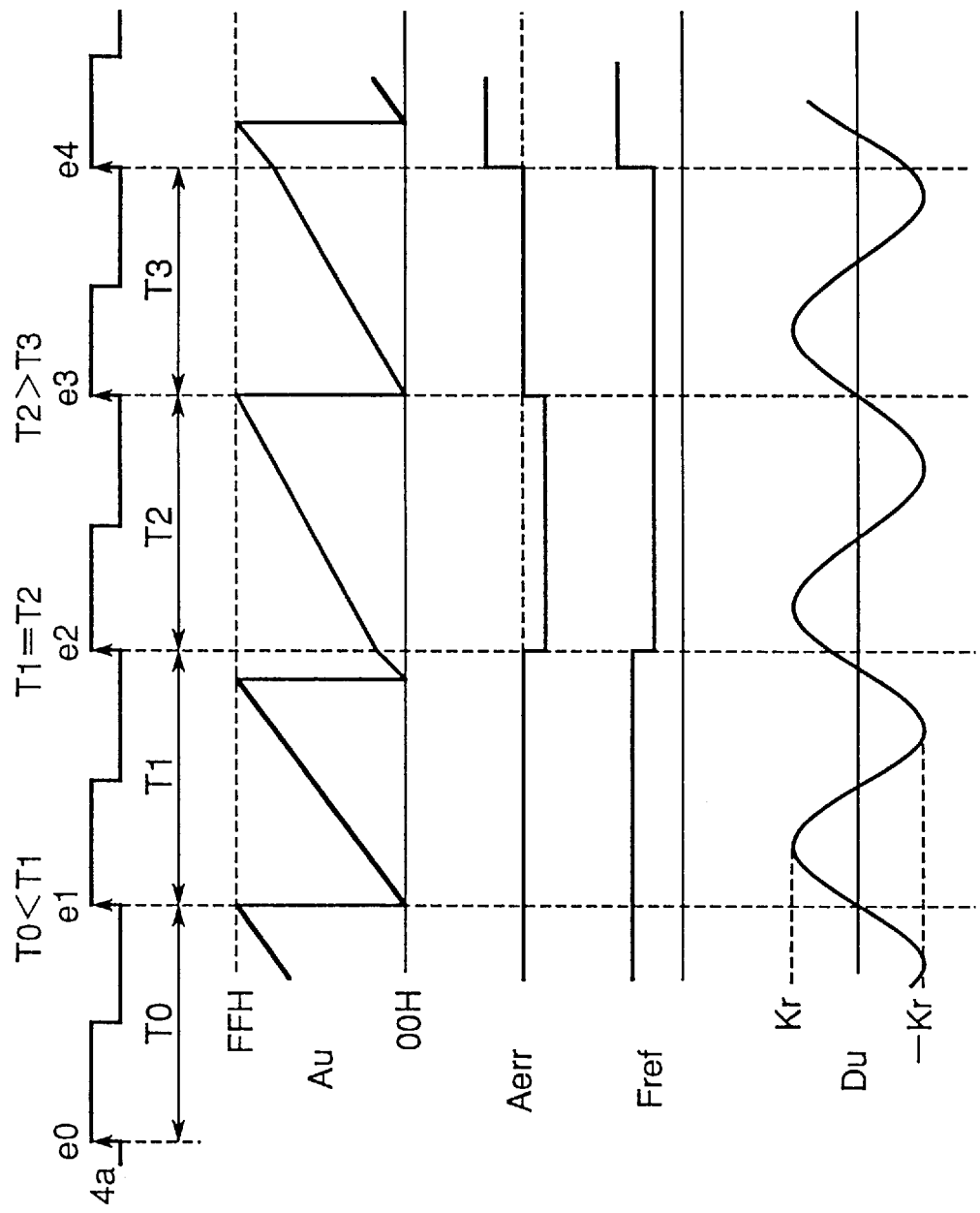
FIG. 8 is a time chart showing the operation of the third embodiment.

The operation of the parts in FIG. 7 is described below by referring also to FIG. 8. Same as in the second embodiment, the maximum value of address Au is FFH, the reference address Aref is 00H, and address Au at edge e1 is 00H. In the subtraction for creating the address error Aerr, if overflow or underflow occurs, carry or borrow at such time is ignored and the address error Aerr is calculated, and the address error Aerr obtained as a result is handled as a numerical value having positive and negative polarity expressed by a complement of 2.

First, at the timing of edge e1, the address Au is 00H, being equal to the reference address value Aref, and the address error Aerr is zero. Hence, in the interval from edge e1 to edge e2, the frequency command Fref is same as the frequency Frefz, that is, the frequency command Fref is the same value as in the previous interval from edge e0 to edge e1. Since the edge period T1 is greater than the edge period T0, at edge e2, the address Au exceeds 00H, and a negative address error Aerr is caused. Accordingly, in the interval from edge e2 to edge e3, the frequency command Fref is a smaller value than the frequency Frefz, that is, the frequency command Fref in the interval from edge e1 to e2, and moreover since the control gain Ka for determining the difference is set at a proper value, at edge e3, the address Au is 00H and the address error Aerr is zero. The address error Aerr is positive, as noted at edge e4, only when the polarity for increasing or decreasing the frequency command Fref is changed, and the operation is similar, and the frequency command Fref is set at a larger value than the present value, and the address error Aerr is eliminated.

In this way, if the address error Aerr is not zero, by increasing or decreasing the frequency command Fref to be issued to the address counter 9, the operation proceeds in the direction to eliminate the address error Aerr, and the error is corrected so that the address Au may indicate the correct rotor magnetic pole position. Same as in the second embodiment, there is no point of sudden change of address Au in a series of actions, and hence discontinuous point does not occur in the phase output waveform data Du. Hence, the phase output command values Vu, Vv and Vw are smooth and continuous, fluctuations of output torque are decreased, and the noise is further reduced.

Thus, according to this embodiment, since the second frequency adjusting means 19 issues the result of adding the present frequency Frefz to the product of address error Aerr obtained by subtracting the present address value Au from the reference address value Aref and control gain Ka as the frequency command Fref, and the address counter 9 operates at a counting speed corresponding to this frequency command Fref, so that it is possible to correct to indicate the correct rotor magnetic pole position without sudden change of address Au. Accordingly, phase output command values Vu, Vv and Vw are smooth, and disturbance of output torque is less, so that the noise and vibration may be reduced. Besides, since rotating frequency detecting means 8 is not required in the constituent elements, the structure is simple, and therefore the control does not become unstable due to detection error at the time of detection of rotating frequency. Further, as the pulse generator 4A, a simple structure using Hall element or the like may be enough, and the majority of the constitution is easily realized by the software, so that it can be presented at low cost.

In this embodiment, the operation is processed by the frequency, but it may be also done by the period, and in this case, therefore, the second output frequency adjusting means 19 subtracts the product of the address error Aerr and control gain Ka from the output data of the second data latch 18, and transmits to the address counter 9 as period command, so that the address counter 9 counts in the count period proportional to this period command.

The pulse generator may be also provided in a plurality, same as in the second embodiment, and further, by up/down operation of the address counter 9, it is applicable to both normal and reverse rotations of the motor 3, the data of the waveform data memory 12 is not limited to sinusoidal wave, and when a higher frequency wave of integer multiple of third order is superposed on the sinusoidal wave, the voltage utility can be enhanced, the inverter circuit 15 nay be also constituted to use the power transistor in the active region, instead of PWM control, the current control may be applied instead of voltage control, others than Hall elements can be also used as the pulse generator 4A, and it is also possible to control on the basis of the mechanical angle of the rotor, which are same as explained in the first embodiment.
(Embodiment 4)

Figure 9:
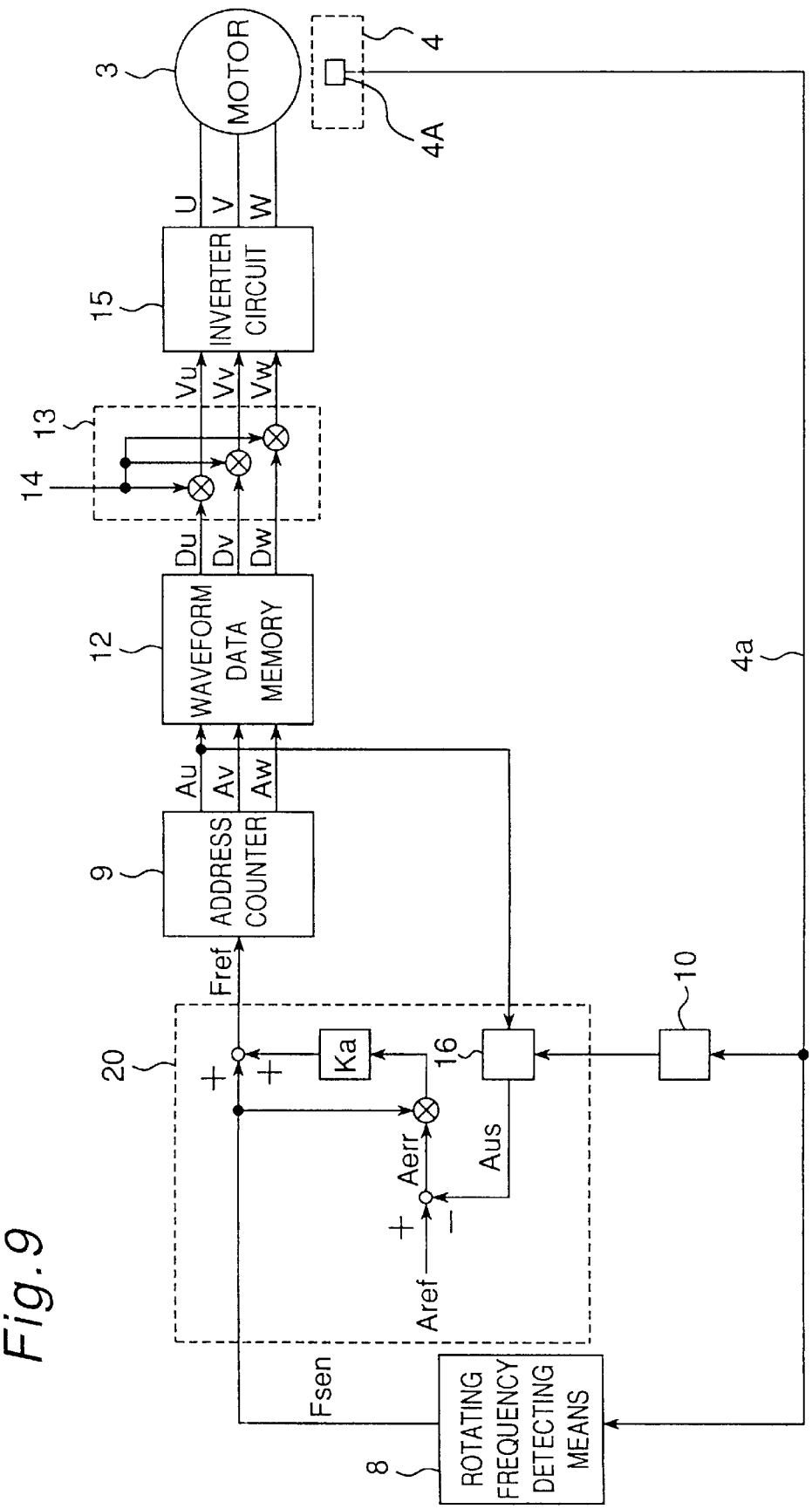
FIG. 9 is a block diagram of a fourth embodiment.

FIG. 9 is a block diagram showing a fourth embodiment of the present invention. The constitution shown in FIG. 9 is close to the constitution in FIG. 5 showing the second embodiment, and what differs from FIG. 5 is to comprise, in place of the first frequency adjusting means 17, a first data latch 16 for holding-the value of address Au at the output signal timing of the first edge detecting means 10 and issuing as address value Aus, and third frequency adjusting means 20, including it, for issuing the result of adding the rotating frequency Fsen to the product of address error Aerr obtained by subtracting the address value Aus held by the first data latch 16 from the reference address value Aref, rotating frequency Fsen, and control gain Ka to the address counter 9 as the frequency command Fref.

The operation of the fourth embodiment is described below in comparison with the operation of the second embodiment.

According to the third frequency adjusting means 20, when the first edge detecting means 10 detects the leading edge of the pulse signal 4a, the first data latch 16 holds the present output address Au at this timing, and the held data is issued as address value Aus. Consequently, the address value Aus is subtracted from the reference address value Aref corresponding to the rotor magnetic pole position of the motor 3 indicated by the leading edge of the pulse signal 4a to obtain address error Aerr, and the product of this address error Aerr, rotating frequency Fsen and the control gain Ka is added to the rotating frequency Fsen, and the obtained frequency command Fref is issued to the address counter 9. Therefore, the frequency command Fref is Fref=Fsen+Ka·Aerr·Fsen.

What differs from the operation in the second embodiment is that the rotating frequency Fsen is further multiplied to the product of the address error Aerr and control gain Ka, and the rotating frequency Fsen is added thereto to create newly the frequency command Fref.

FIG. 10 shows the operation of the foregoing second embodiment, in which the top shows the lower rotating frequency of the motor 3 than in the bottom. In both top and bottom, the edge period T7 and T8, and T10 and T11 are equal, and the value of the address Au at edge e8 and the value of the address at edge e11 are both A1, and the values of address error Aerr are equal. At edge e9 shown in the top, however, the address Au is 00H due to the actin mentioned above, whereas at edge e12 shown in the bottom, the address Au is over 00H, and there is a difference in the phase follow-up performance of the address Au following up the correct rotor magnetic pole position of the motor 3. This is because, as mentioned above, the frequency command Fref is expressed in the relational formula of Fref=Fsen+Ka·Aerr, but it is the same value when the second term of the right side thereof is same value in both control gain Ka and address error Aerr, that is, the operating amount for increasing or decreasing the rotating frequency Fsen depending on the address error Aerr is a constant value regardless of the rotating speed of the motor 3. Although not shown in the drawing, to the contrary, if the rotating speed of the motor 3 is lower than in the top, the operating amount of the frequency becomes too large, and the frequency command Fref becomes smaller, and the address Au does not reach 00H at next edge, so that the address error Aerr becomes a positive value. That is, the operation for eliminating the address error Aerr produces an address error Aerr in the reverse polarity, and this operation is repeated depending on the condition, and only the polarity of the address error Aerr is changed, but the value does not become zero forever, thereby causing so-called hunting. It is the fourth embodiment that is the constitution for solving this problem.

Figure 11:
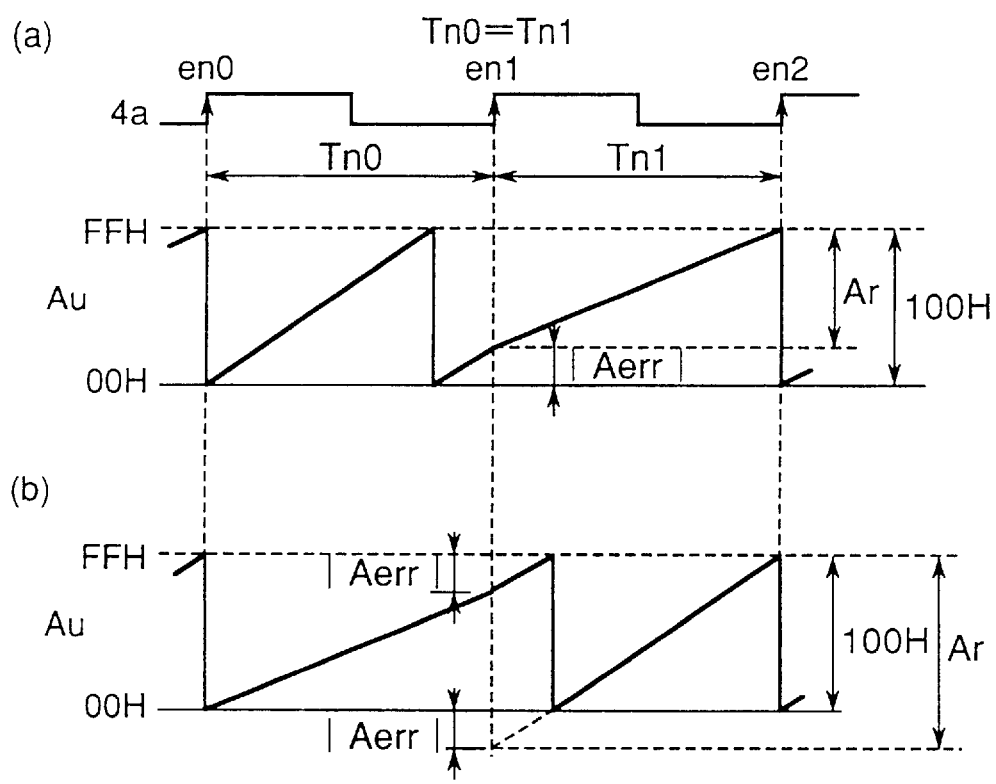
FIG. 11 is a time chart showing the operation of the fourth embodiment.

FIG. 11 shows the operation of the fourth embodiment, in which, for example, supposing the value of the control gain Ka to be 1/100H as inverse number of data length of the address Au, the frequency command Fref is expressed in the relational formula of Fref=Fsen+Aerr·Fsen/100H. Herein, 1/100H of control gain is handled as a positive number. Same as in the second embodiment, meanwhile, the maximum value of the address Au is FFH, the reference address value Aref is 00H, and calculation of address error Aerr is also the same. The edge period Tn0 and Tn1 are equal. The top diagram (a) shows the state of negative address error Aerr occurring as the value of the address Au exceeds 00H of the reference address value at edge en1, and the bottom diagram (b) shows the state of positive address error Aerr occurring as the value of the address Au does not reach 00H of the reference address value at edge en1.

In FIG. 11(a), the frequency command Fref in the interval from edge en1 to edge en2 is Fref=Fsen+Aerr·Fsen/100H, and this formula may be modified into Fref=Fsen·(100E+Aerr)/100H. Herein, the polarity of Aerr is negative, and (100H+Aerr) in the formula is the value of subtracting the absolute value of Aerr from 100H, and it shows the address difference Ar in FIG. 11(a). Therefore, by replacing with it, it yields Fref=Fsen·Ar/100H. In FIG. 11, meanwhile, in order to avoid complication, it is shown as if the address difference Ar were based on FFH which is the maximum value of the address Au, but actually the reference is the virtual value 100H of one count higher than FFH.

As already mentioned, since edge period Tn0 and Tn1 are equal to each other, if the address error Aerr at edge en1 is zero, supposing the frequency command Fref to be Fref Fsen, the address error Aerr is zero also at the next edge en2. The frequency indicates the inclination of the address Au in the diagram, and the inclination when the frequency command Fref is Fref=Fsen is expressed as 100H/Tn1. Hence, when the frequency command Fref is Fref=Fsen·Ar/100H, the inclination is (Ar/100H) times that of Fref Fsen, being expressed as (100H/Tn1)·(Ar/100H), which is summed up to be Ar/Tn1. This inclination shows that the address Au is advanced by Ar when the time Tn1 passes, and hence at next edge en2, the address error Aerr is zero.

As shown in FIG. 11(b), when a positive address error Aerr occurs at edge en1, the value of (100H+Aerr) shows the address amount Ar in FIG. 11(b), and same as in the case of negative address error Aerr, by defining the frequency command Fref as Fref=Fsen+Aerr·Fsen/100H as indicated by inclination Ar/Tn1, the address error Aerr is nullified to zero at next edge en2.

What is common between FIGS. 11(a) and (b) is that the edge period Tn1 expresses an arbitrary periods showing it operates in the same phase follow-up performance, not depending on the magnitude of the edge interval, that is, the rotating speed of the motor 3.

Thus, according to the embodiment, in addition to the effect of the second embodiment, by creating the frequency command Fref by operation of Fref=Fsen+Ka·Aerr·Fsen by using the rotating frequency Fsen, address error Aerr and control gain Ka, the operating amount for increasing or decreasing the rotating frequency Fsen depending on the address error Aerr is proportional to the rotating frequency Fsen, and therefore stable control showing the same phase follow-up performance regardless of the rotating speed of the motor 3 is realized.

In this embodiment, the operation is processed by the frequency, but it may be also done by the period, and the rotating frequency detecting means 8 may detect only the edge period Tsen of the pulse signal 4a, and the address counter 9 operates in the count period proportional to the period command Tref, so that the third frequency adjusting means 20 may operate according to the formula Tref=Tsen/(1+Ka·Aerr). It is only the in the processing manner, and nothing is different essentially.

The pulse generator may be also provided in a plurality, same as in the second embodiment, and further, by up/down operation of the address counter 9, it is applicable to both normal and reverse rotations of the motor 3, the data of the waveform data memory 12 is not limited to sinusoidal wave, and when a higher frequency wave of integer multiple of third order is superposed on the sinusoidal wave, the voltage utility can be enhanced, the inverter circuit 15 may be also constituted to use the power transistor in the active region, instead of PWM control, the current control may be applied instead of voltage control, others than Hall elements can be also used as the pulse generator 4A, and it is also possible to control on the basis of the mechanical angle of the rotor, which are same as explained in the first embodiment.

(Embodiment 5)

Figure 12:
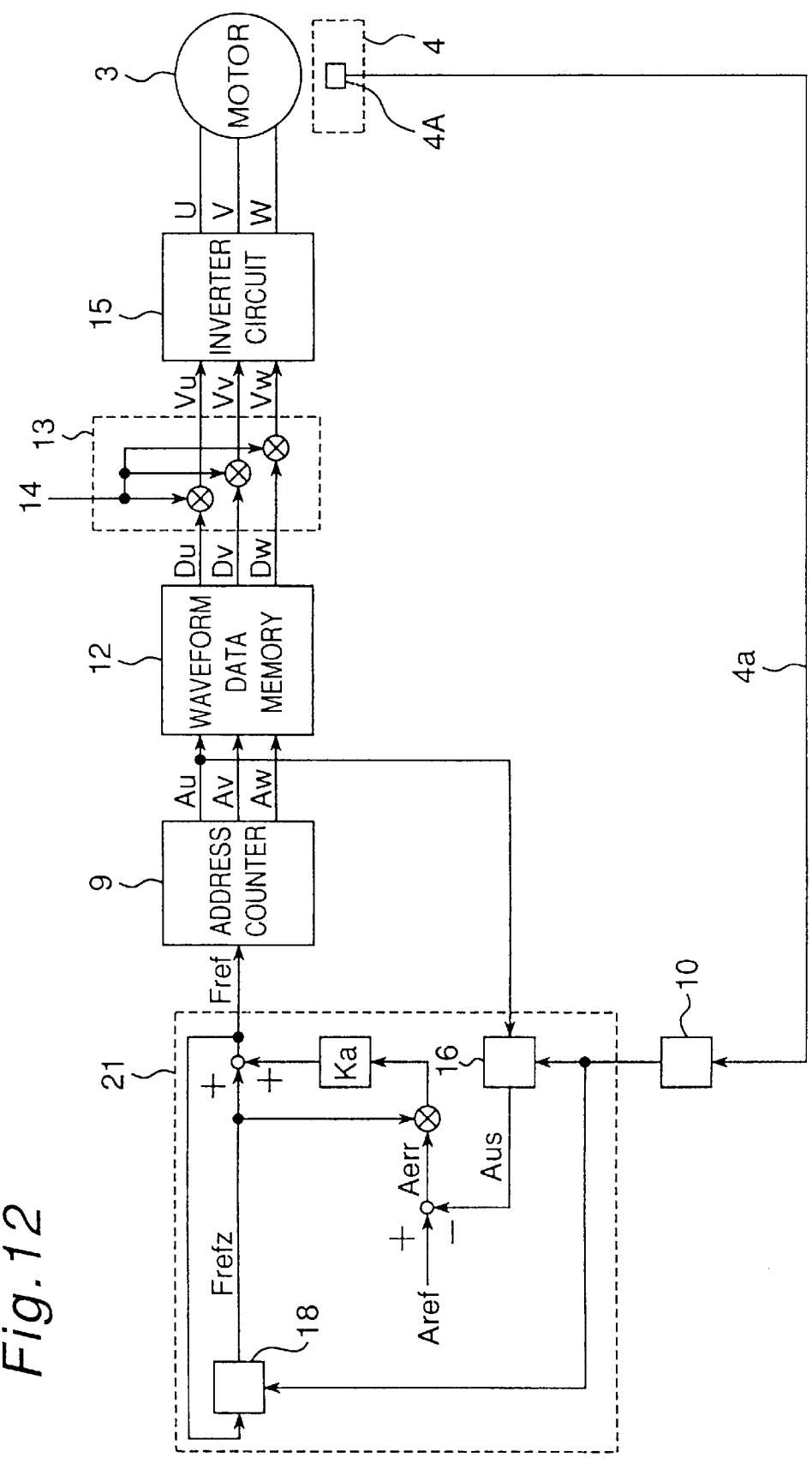
FIG. 12 is a block diagram of a fifth embodiment.

FIG. 12 is a block diagram showing a fifth embodiment of the present invention. The constitution shown in FIG. 12 is close to the constitution in FIG. 7 showing the third embodiment, and what differs from FIG. 7 is to comprise, in place of the second frequency adjusting means 19, a first data latch 16 for holding the value of address Au at the output signal timing of the first edge detecting means 10 and issuing as address value Aus, a second data latch 18 for holding the value of the present frequency command Fref at the same timing and issuing as frequency Frefz, and fourth frequency adjusting means 21, including them, for issuing the result of adding the rotating frequency Frefz to the product of address error Aerr obtained by subtracting the address value Aus held by the first data latch 16 from the reference address value Aref, frequency Frefz, and control gain Ka to the address counter 9 as the frequency command Fref.

The operation of the fifth embodiment is described below in comparison with the operation of the third embodiment.

According to the fourth frequency adjusting means 21, when the first edge detecting means 10 detects the leading edge of the pulse signal 4a, the first data latch 16 holds the present output address Au at this timing, and the held data is issued as address value Aus. At the same timing, the second data latch 18 holds the present frequency command Fref, and issues the held data as frequency Frefz. Consequently, the address value Aus is subtracted from the reference address value Aref corresponding to the rotor magnetic pole position of the motor 3 indicated by the leading edge of the pulse signal 4a to obtain address error Aerr, and the product of this address error Aerr, frequency Frefz and the control gain Ka is added to the frequency Frefz, and the obtained frequency command Fref is issued to the address counter 9. Therefore, the frequency command Fref is Fref=Frefz+Ka·Aerr·Frefz.

What differs from the operation in the third embodiment is that the frequency Frefz is further multiplied to the product of the address error Aerr and control gain Ka, and the frequency Frefz is added thereto to create newly the frequency command Fref.

In the third embodiment, depending on the rotating speed of the motor 3, there is a difference in the phase follow-up performance of the address Au following up the correct rotor magnetic pole position, which is the same problem as explained in the second embodiment. This is because, as mentioned above, the frequency command Fref is expressed in the relational formula of Fref=Frefz+Ka·Aerr, but it is the same value when the second term of the right side thereof is same value in both control gain Ka and address error Aerr, that is, the operating amount for increasing or decreasing the rotating frequency Fsen depending on the address error Aerr is a constant value regardless of the rotating speed of the motor 3. Therefore, depending on the condition, hunting or other unstable operation may occur. It is the fifth embodiment that is the constitution for solving this problem. In the fifth embodiment, since the frequency command Fref is created by the operation of Fref=Frefz+Ka·Aerr·Frefz, the operating amount for increasing or decreasing the frequency Frefz depending on the address error Aerr indicated by the second term of the right side of the formula is proportional to the frequency Frefz. The frequency Frefz is the presently issued frequency command Fref being held by the second data latch 18, and usually the address error Aerr is a small value and the frequency command is nearly equal to the rotating frequency of the motor 3, and therefore the operating amount for increasing or decreasing the frequency Frefz depending on the address error Aerr is nearly proportional to the rotating frequency of the motor 3. Therefore, regardless of the rotating speed of the motor 3, the same phase follow-up performance is obtained.

Thus, according to the embodiment, in addition to the effect of the third embodiment, by creating the frequency command Fref by operation of Fref=Frefz+Ka·Aerr·Frefz by using the frequency Frefz, address error Aerr and control gain Ka, the operating amount for increasing or decreasing the frequency Frefz depending on the address error Aerr is proportional to the frequency Frefz, and therefore stable control showing the same phase follow-up performance regardless of the rotating speed of the motor 3 is realized.

In this embodiment, the operation is processed by the frequency, but it may be also done by the period, and it is only the difference in the processing manner, and nothing is different essentially.

The pulse generator may be also provided in a plurality, same as in the second embodiment, and further, by up/down operation of the address counter 9, it is applicable to both normal and reverse rotations of the motor 3, the data of the waveform data memory 12 is not limited to sinusoidal wave, and when a higher frequency wave of integer multiple of third order is superposed on the sinusoidal wave, the voltage utility can be enhanced, the inverter circuit 15 may be also constituted to use the power transistor in the active region, instead of PWM control, the current control may be applied instead of voltage control, others than Hall elements can be also used as the pulse generator 4A, and it is also possible to control on the basis of the mechanical angle of the rotor, which are same as explained in the first embodiment.
(Embodiment 6)

Figure 13A:
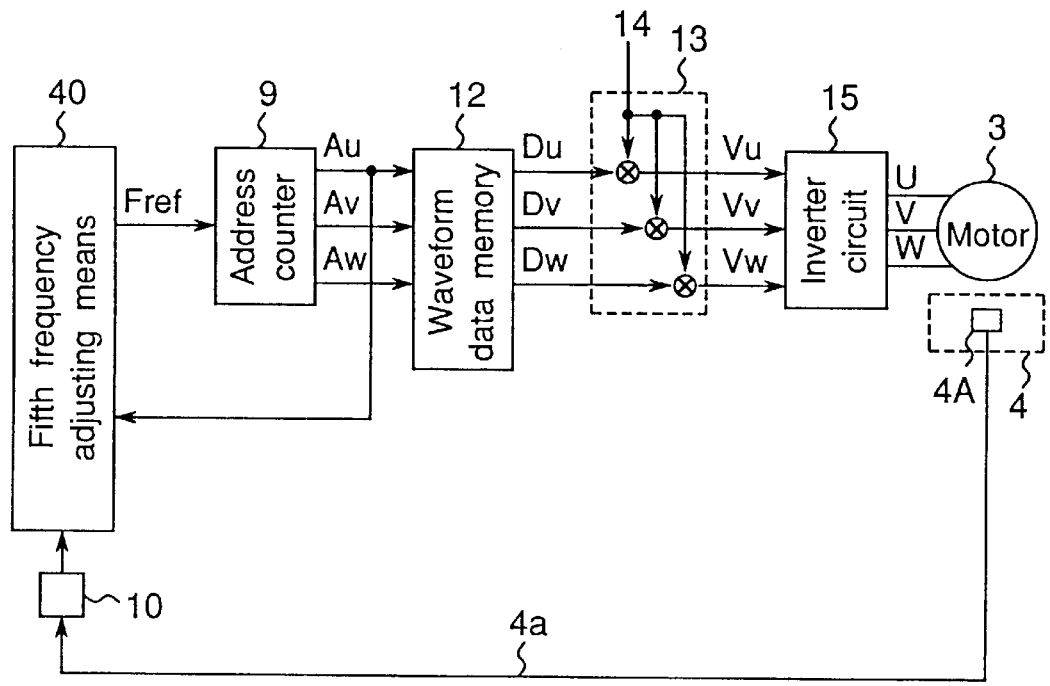
FIGS. 13A and 13B are a block diagram of a sixth embodiment.
Figure 13B:
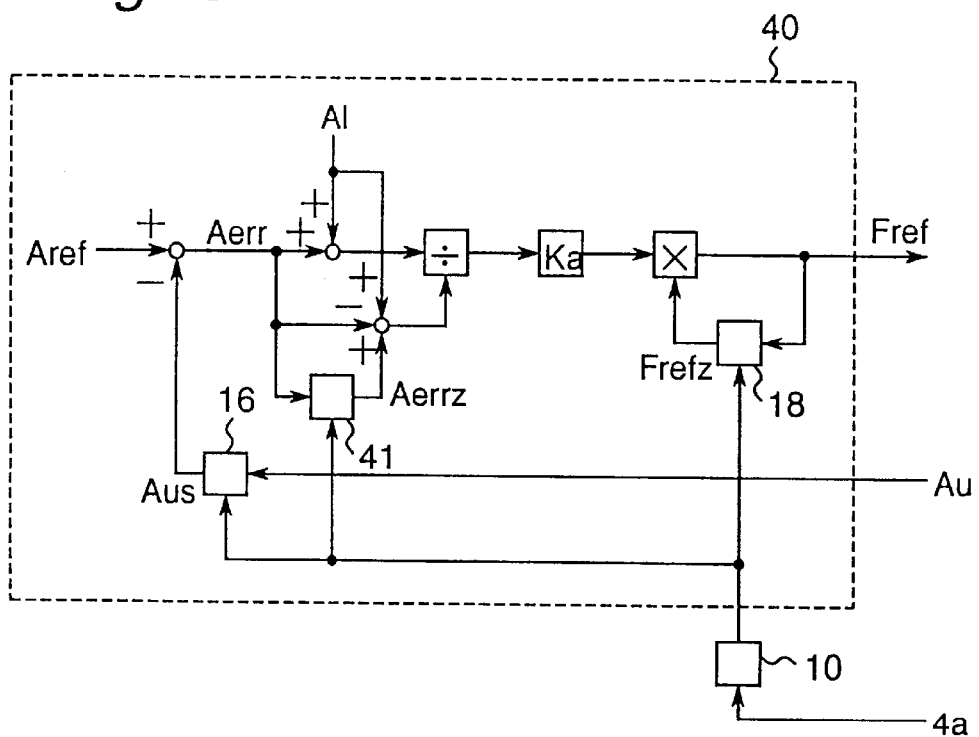

FIG. 13 is a block diagram showing a sixth embodiment of the present invention. What differs from the foregoing fifth embodiment shown in FIG. 12 is to comprise fifth frequency adjusting means 40 in place of the fourth frequency adjusting means 21, and its internal block diagram is shown in FIG. 13B.

In FIG. 13B, the fifth frequency adjusting means 40 comprises, in addition to the above-mentioned first data latch 16 for holding the value of address Au at the output signal timing of the first edge detecting means 10 and issuing as address value Aus and the second data latch 18 for holding the value of the present frequency command Fref at the same timing and issuing as frequency Frefz, a third data latch 41 for holding the address error Aerr obtained by subtracting the address value Aus held by the first data latch 16 from the reference address value Aref at the same timing, and issuing an address error Aerrz at the previous edge timing of the pulse signal 4a, and using these outputs, further, it is designed to create and issue the value of multiplying a fractional value consisting of a numerator which is the sum of address error Aerr and the unit address length Al corresponding to the unit period of driving waveform, and a denominator which is the sum of the value subtracting the address error Aerr from the unit address length Al and the previous address error Aerrz, control gain Ka, and frequency Frefz, as a new frequency command Fref.

In this constitution, the fifth frequency adjusting means 40 issues the frequency command Fref as the operation result of Fref=((Al+Aerr)/(Al−Aerr+Aerrz))·Xa·Frefz, and the address counter 9 operates at the counting speed depending on this frequency command Fref. The other operation is same as in the foregoing embodiments.

Figure 14:
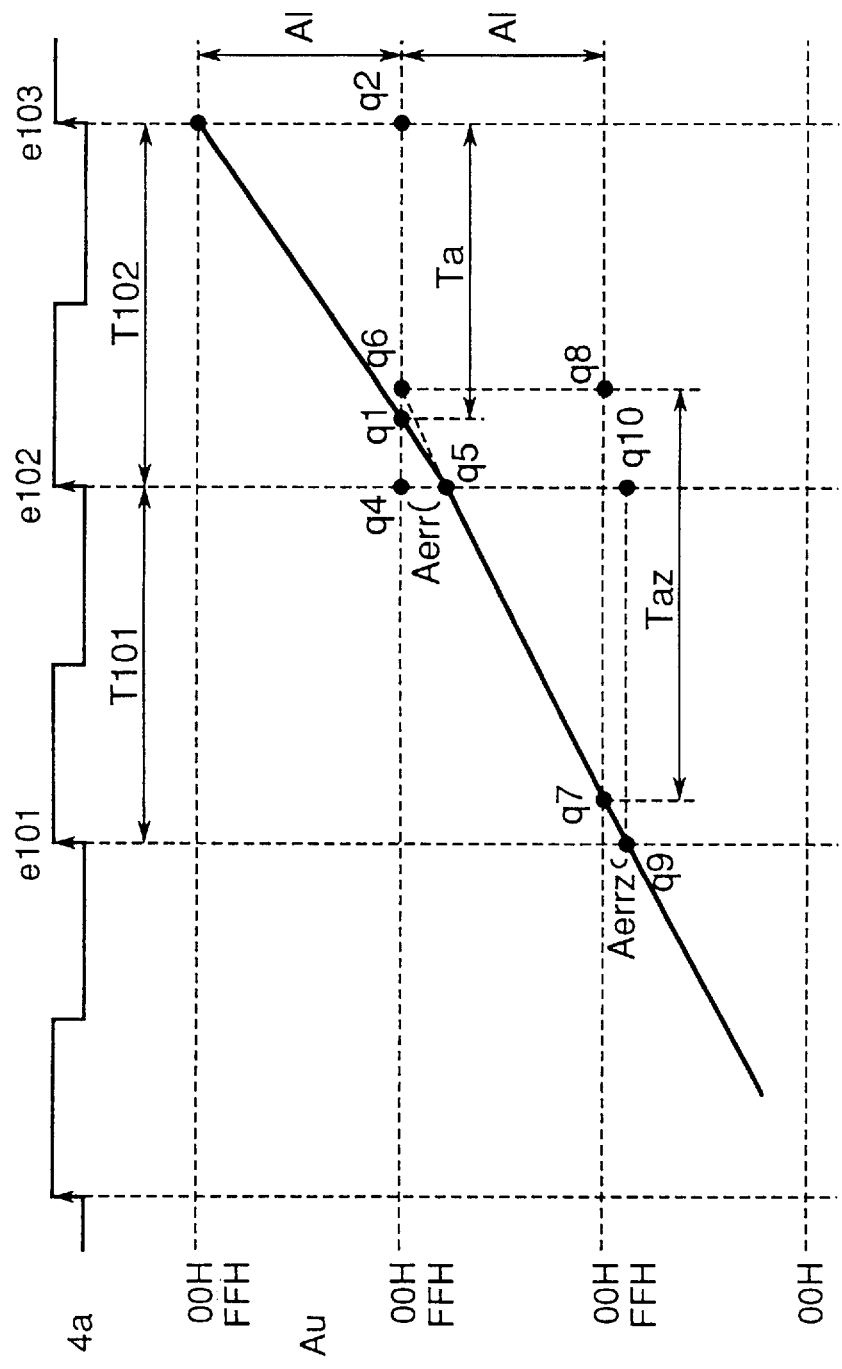
FIG. 14 is a time chart showing the operation of the sixth embodiment.

FIG. 14 is a time chart showing the operation of the sixth embodiment, in which, for example, the value of control gain Ka is 1, and the unit address length Al is set at 100H same as the data length of the address Au. Also same as in the foregoing embodiments, the address is supposed to be indicating the correct rotor position when the address value is 00H at the edge timing of the pulse signal 4a, that is, reference address value Aref=00H. Incidentally, the next value of the address value FFH overflows to be 00H and therefore, usually, the address Au is drawn as a rectangular wave in a diagram showing the operation of address Au, but for the ease of understanding, herein, it is shown as if counting value continued to increase without overflowing when the address Au changes from FFH to 00H.

At the onset timing of edge e101 of pulse signal 4a, the address Au does not indicate correct rotor position, and the count value is delayed, and there is an address error in positive polarity. At the onset timing of next edge e102, although the value is different, there is also an address error of positive polarity. At the timing of further next edge e103, there is no address error, and the address Au is 00H. Herein, on the basis of the timing at edge e102, supposing the address error occurring at this time to be Aerr, the address error at the timing of edge e101 is a previous address error, and hence it is expressed as Aerrz.

Herein, since the shown triangle q1q2q3 and triangle q1q4q5 are similar, the relation of q1q2:q2q3=q1q4:q4q5 is established. In this relation, q2q3 is the unit address length Al, and q1q2 is the address period Ta showing the time required for counting the portion of the unit address Al by the address Au in the interval from edge e102 to edge e103. Besides, q1q4 is the remainder of subtracting the address period Ta from the period T102 from edge e102 to edge e103, and is expressed as (T102−Ta). Moreover, q4q5 shows an address error Aerr. Therefore, this relational formula is expressed as Ta:Al=(T102−Ta):Aerr, which leads to T102= Ta·(Al+Aerr)/Al.

Further, since the shown triangle q6q7q8 and triangle q5q9q10 are similar, the relation of q7q8:q8q6= q9q10:q10q5 is established. In this relation, q8q6 is the unit address length Al, and q7q8 is the address period Taz showing the time required for counting the portion of the unit address Al by the address Au in the interval from edge e101 to edge e102. Besides, q9q10 is the period T101 from edge e101 to edge e102, and q10q5 is expressed as (Al− Aerr+Aerrz). Therefore, this relational formula is expressed as Taz:Al=T101:(Al−Aerr+Aerrz), which leads to T101= Taz·(Al−Aerr+Aerrz))/Al.

Supposing the rotation of the motor 3 is free from fluctuation, since T101=T102, and the two formulas above can be combined into Taz·(Al−Aerr+Aerrz)/Al=Ta·(Al+ Aerr)/Al, which is summed up into Ta=((Al−Aerr+Aerrz)/ (Al+Aerr))·Taz. Herein, the address period Ta is proportional to the inverse number of frequency command Fref, and the address period Taz is proportional to the inverse number of frequency command Frefz, and the both proportional coefficients are equal, so that the relation of Fref=( (Al+Aerr)/(Al−Aerr+Aerrz))·Frefz is established.

Therefore, this relational formula is the formula for expressing the condition in which the address Au indicates the correct rotor position without causing address error at the onset timing of edge e103. In other words, at the onset timing of edge e102, using the address error Aerr at this timing, the address error Aerrz at the onset timing of the previous edge e101, and the frequency command Frefz, when the new frequency command Fref is the value obtained in the operation of Fref=((Al+Aerr)/(Al−Aerr+Aerrz))

·Frefz, the address error can be nullified to zero at the onset timing of next edge e103. Instead of correcting the address error to zero at once at the timing of edge e103, to correct the address error to a certain value, and set to zero at the onset timing of subsequent edge by gradually decreasing the address error, the control gain Ka is multiplied by the right side of the above formula to product Fref=((Al+Aerr)/(Al−Aerr+Aerrz))·Ka·Frefz, and the value of this control gain Ka is adjusted. Thus, the address error can be converged into zero more smoothly. The fifth frequency adjusting means 40 is an example of creating the frequency command Fref according to this formula, and by the operation of the fifth frequency adjusting means 40, the address error is eliminated, so that the address Au follows up the correct rotor position. In this example, it is explained that the previous address error Aerrz and present address error Aerr are both positive values, but the operation is the same if the polarity is negative, and when each term of formula is handled as including the polarity, the operation formula for calculating the frequency command Fref is the same.

In the above explanation of operation, the edge period of the pulse signal 4a is an arbitrary size, and it does not cause the problem of change of the degree of the address Au following up the correct rotor position due to the rotating speed of the motor. Moreover, same as in embodiment 5, the rotating frequency detecting means is not needed in the constituent elements, but since the previous address error Aerrz is taken into consideration when creasing the frequency command Fref, if the previous address error Aerrz is not zero, it is superior because the address Au stably follows up the correct rotor position.

Thus, according to the embodiment, by creating the frequency command Fref in the formula of Fref=((Al+Aerr)/(Al−Aerr+Aerrz))·Ka·Frefz, by using the frequency Frefz, address error Aerr, previous address error Aerrz, unit address length Al, and control gain Ka, in addition to the effects of the fifth embodiment, the address Au can stably follow up the correct rotor position if the previous address error Aerrz is not zero.

In this embodiment, the operation is processed by the frequency, but it may be also done by the period. For example, by multiplying the control gain Ka and the right side of the relational formula of the address period Ta shown in the explanation of operation, the address period Ta may e calculated from the operation of Ta=((Al−Aerr+Aerrz)/(Al+Aerr))·Ka·Taz, and the address counter 9 may be designed to operate in the count period on the basis of this address period Ta. It is only the difference in the processing manner, and nothing is different essentially.

The pulse generator may be also provided in a plurality, same as in the second embodiment, and further, by up/down operation of the address counter 9, it is applicable to both normal and reverse rotations of the motor 3, the data of the waveform data memory 12 is not limited to sinusoidal wave, and when a higher frequency wave of integer multiple of third order is superposed on the sinusoidal wave, the voltage utility can be enhanced, the inverter circuit 15 may be also constituted to use the power transistor in the active region, instead of PWM control, the current control may be applied instead of voltage control, others than Hall elements can be also used as the pulse generator 4A, and it is also possible to control on the basis of the mechanical angle of the rotor, which are same as explained in the first embodiment.

(Embodiment 7)

Figure 15:
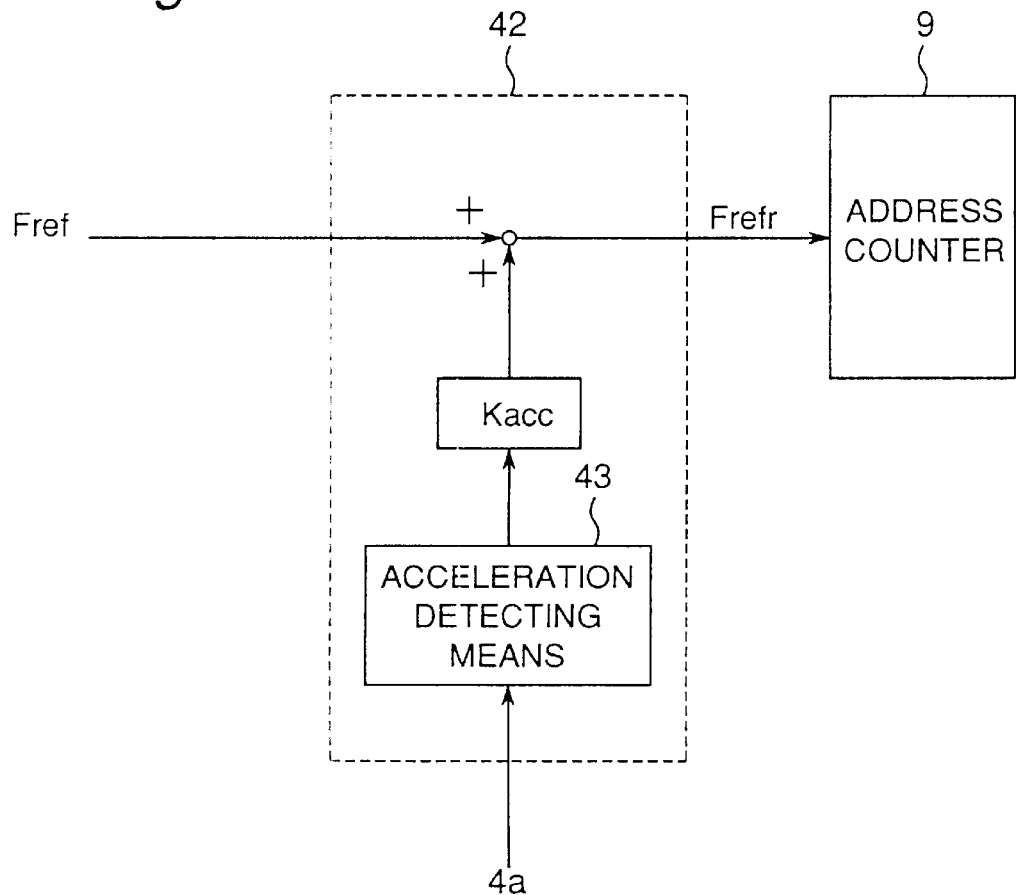
FIG. 15 is a block diagram of a seventh embodiment.

FIG. 15 is a block diagram showing a seventh embodiment of the present invention. In FIG. 15, frequency command correcting means 42 includes acceleration detecting means 43 for detecting the acceleration of the motor 3 from the pulse signal 4a, and is designed to issue the result of adding the product of acceleration and coefficient Kacc to the frequency command Fref to the address counter 9 as frequency command Frefr. The other constitution is same as in the foregoing embodiments and is omitted in the drawing. The frequency command Fref is, in the foregoing embodiments, the command for determining the counting speed of the address counter 9, and in the second embodiments and later, the same symbol is used, but in the first embodiment, it corresponds to the rotating frequency Fsen. Hereinafter, for the simplicity of description, the term is standardized as the frequency command Fref.

In this constitution, the proportional to the acceleration of the motor 3 is added to the frequency command Fref to be frequency command Frefr, which is given to the address counter 9. That is, at the time of acceleration of the motor 3, the frequency command Fref is corrected to the plus side, and at the time of deceleration, to the contrary, the frequency command Fref is corrected to the minus direction to be frequency command Frefr, which is given to the address counter 9. The address counter 9 counts at the speed depending on this value of frequency command Frefr. The degree of correction in this operation is determined by the value of the coefficient Kacc, and it is set so that the address Au may follow up the rotor position correctly also during acceleration of the motor 3.

In the foregoing embodiments, when the speed of the motor 3 is constant and the edge period of the pulse signal 4a is a constant period, it is designed so that the address Au may follow up the correct rotor position. Therefore, if the address error Aerr is zero at a certain edge onset timing of the pulse signal 4a, when the motor is accelerated at a next edge onset timing, the address Au does not reach the correct value, and a positive address error Aerr occurs, or when the motor is decelerated, to the contrary, the address Au exceeds the correct value, and a negative address error Aerr occurs The embodiment is intended to solve this problem, and during acceleration of the motor 3, the frequency command Fref is corrected to the plus side, and during deceleration, the frequency command Fref is corrected to the minus side to be Frefr, which is given to the address counter 9, and therefore if the speed of the motor 3 varies, the address Au can follow up the correct rotor position.

The acceleration detecting means 43, in a simple constitution, determines the speed from the edge period every time the edge of the pulse signal 4a is detected, and issues the result by subtracting the speed of the previous edge detection from this speed, or issues merely the result of subtracting the edge period detected presently from the edge period detected previously. The theoretically strict acceleration is not obtained and the control characteristic slightly deteriorates, but the approximate value of the acceleration can be obtained easily, and therefore the constitution may be simplified. It is also possible to constitute to operate the address counter 9 by using the period, instead of the frequency, as the command, and in this case, during acceleration of the motor 3, the period command is corrected to the minus side, and during deceleration, the period command is corrected to the plus side, and the result is entered in the address counter 9, and the address counter 9 operates in the count period corresponding to this result of correction. This is a mere difference in operating processing, and nothing is different essentially. Moreover, in the constitution for freely varying the coefficient Kacc during operation, control of a higher degree of freedom may be realized.

(Embodiment 8)

In the embodiments described so far, while the motor 3 is stopped, edge of the output pulse signal 4$a$ of the pulse generator 4A is not detected, and the output address Au of the address counter 9 cannot indicate the correct rotor magnetic pole position, so that it cannot start up by itself. Or if the rotating speed of the motor 3 is low, the number of times of correction of the address Au per unit time is small and stable phase follow-up performance cannot be obtained. It is an eighth embodiment that solves such problems.

Figure 16:
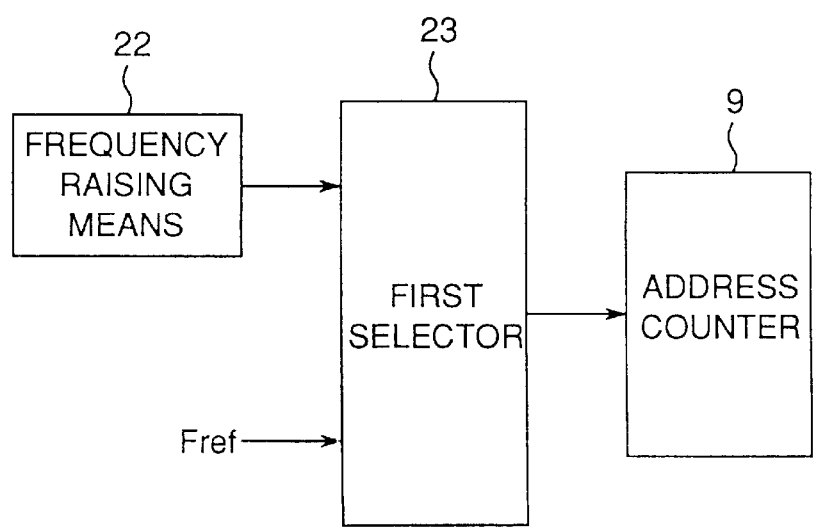
FIG. 16 is a block diagram of an eighth embodiment.

FIG. 16 is a block diagram showing the eighth embodiment of the present invention. In FIG. 16, frequency raising means 22 gradually raises and issues the frequency with the lapse of time, and a first selector 23 selects and issues either the frequency issued by the frequency raising means 22 or the frequency command Fref, and transmits to the address counter 9 as the frequency command. Herein, the frequency command Fref corresponds to the frequency command Fref in the second and subsequent embodiment, but in the first embodiment, rotating frequency Fsen issued by the rotating frequency detecting means 8 corresponds to it. The other constitution is same as in the foregoing embodiments.

Figure 17:
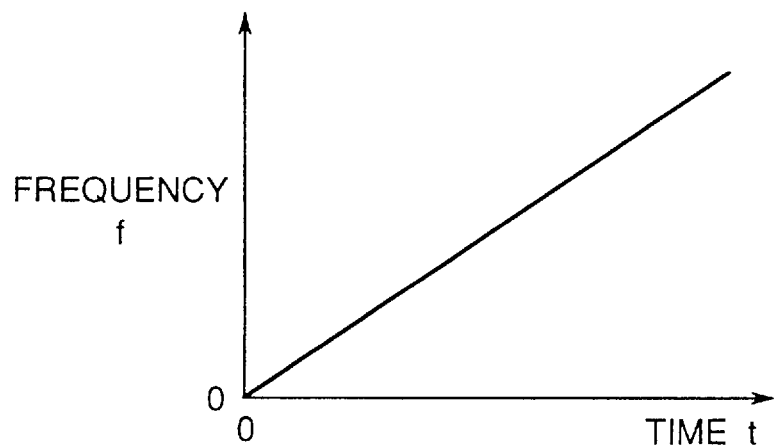
FIG. 17 is an operation explanatory diagram of the eighth embodiment.

The operation of the eighth embodiment is described below. First, when starting up the motor 3, the first selector 23 selects the output of the frequency raising means 22, and transmits to the address counter 9. The operation of the frequency raising means 22 is, as shown in FIG. 17, to raise the frequency f linearly with the lapse of time t, and accordingly, an AC voltage gradually elevating in frequency is applied to the motor 3, so that a rotary magnetic field is generated. The rotor is attracted by this rotary magnetic field and is rotated and accelerated gradually. When the rotating speed of the motor 3 exceeds a preset value, or when the value of the frequency issued by the frequency raising means 22 exceeds a preset value, the first selector 23 changes over the frequency to be applied to the address counter 9 from the frequency issued by the frequency raising means 22 to the frequency command Fref. Afterwards, following the operation of the foregoing embodiments, the starting is complete. When this embodiment is applied in the third, fifth or sixth embodiment, after the first selector 23 changes over from the frequency issued by the frequency raising means 22 to the frequency command Fref, unstable operation may occur due to unstable value of the frequency command Fref, but this problem can be avoided by using the output data of the first selector 23 as the data to be held by the second data latch 18.

According to the embodiment, when starting up the motor, the frequency raising means 22 commands the frequency value gradually elevating along with the lapse of time to the address counter 9, so that stable starting is realized.

The motion of the frequency raising means 22 is required only to rotate the motor 3 together, and the frequency may be raised either linearly or in curvature.

(Embodiment 9)

The eighth embodiment is constituted to command the frequency value gradually elevating along with the lapse of time to the address counter 9 when starting up the motor 3, regardless of the magnetic pole position of the rotor, but depending on the magnetic pole position of the rotor when stopped or the initial direction of magnetic field when starting to feed power, generated torque may be unstable and starting may be unsuccessful. It is a ninth embodiment that solves this problem.

Figure 18:
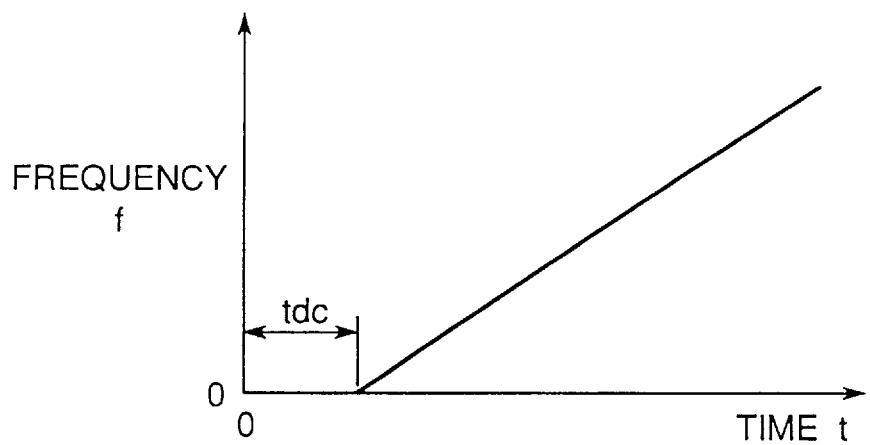
FIG. 18 is an operation explanatory diagram of a ninth embodiment.

A block diagram of the ninth embodiment is same as FIG. 16 showing the block diagram of the eighth embodiment, and only the internal constitution of the frequency raising means 22 is different, and when starting up the motor 3, the operation shown in FIG. 18 is carried out. That is, in the time preset at the beginning of starting, there is a DC feeding time tdc of zero frequency f, and afterwards the frequency f is gradually raised with the lapse of time. The other constitution is same as in the foregoing eighth embodiment.

In the ninth embodiment, in the power feed starting time when starting up the motor 3, since there is the DC feeding time tdc of zero frequency f, the direction of the generated magnetic field remains in a fixed state for a specific time. This time is, for example, about several seconds. As a result, the magnetic pole position of the rotor is fixed at a position along the direction of the magnetic field. Later, the frequency is raised gradually along with the lapse of time, and the motor 3 is attracted by the rotary magnetic fields and rotates and accelerates gradually. The subsequent operation is same as in the eighth embodiment. During this operation, since the magnetic pole position of the rotor when starting power feed is fixed at a specific position, the rotor can be smoothly rotated together afterwards when raising the frequency, so that stable starting is realized.

Thus, according to the embodiment, when starting power feed upon start of motor, by setting the DC feeding period tdc of zero frequency f, the magnetic pole position of the rotor is determined at a specific position, and the frequency gradually increasing later with the lapse of time is commanded to the address counter 9, so that stable starting is realized.

(Embodiment 10)

Figure 19:
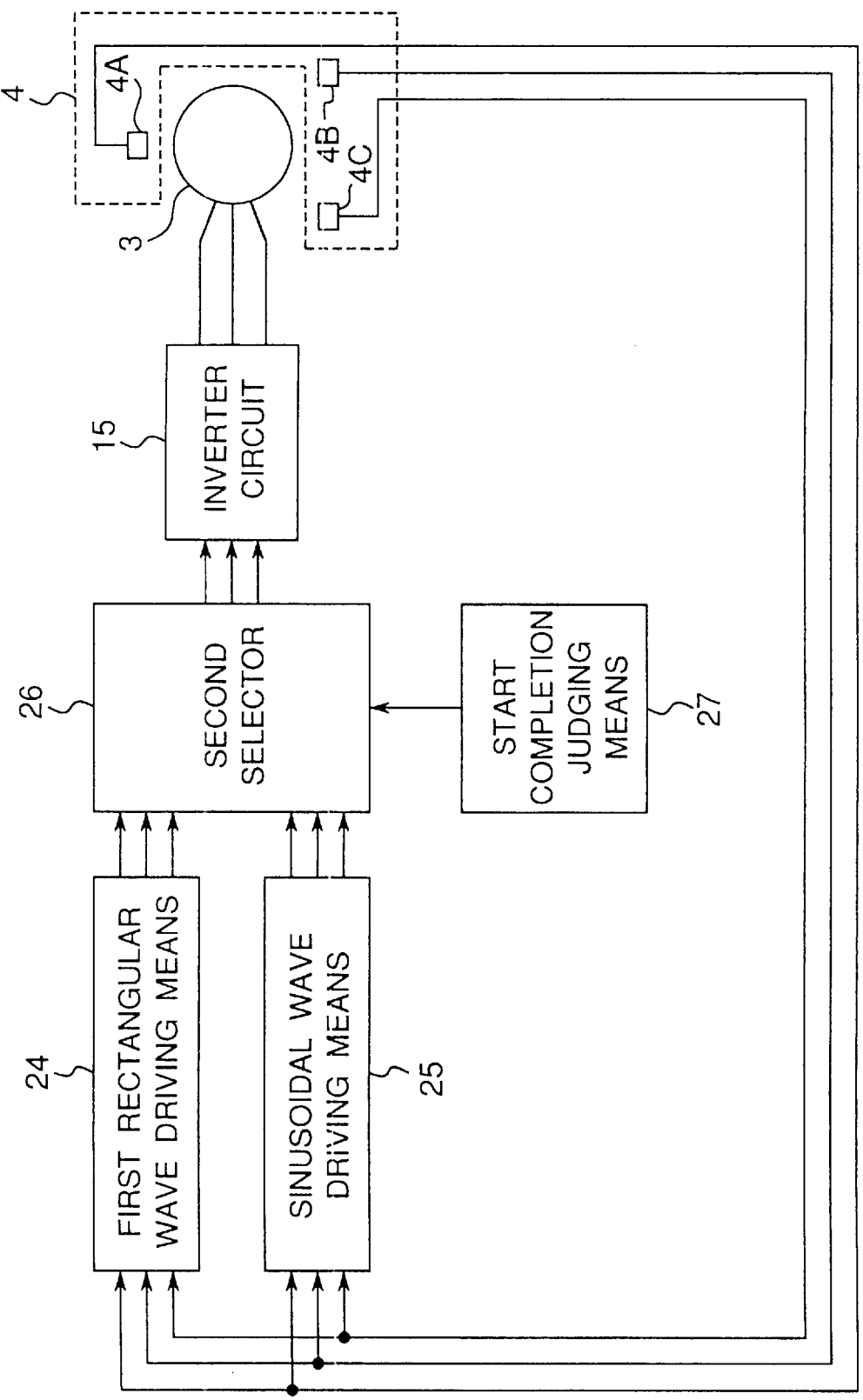
FIG. 19 is a block diagram of a tenth embodiment.

FIG. 19 is a block diagram showing a tenth embodiment of the present invention. In FIG. 19, there are three pulse generators 4A, 4B and 4C, as many as the number of phases of the motor 3, and first rectangular wave driving means 24 logically processes the output signals of these pulse generators 4A, 4B and 4C, and creates and issues a voltage command for rectangular wave feeding. Sinusoidal wave driving means 25 corresponds to the portion excluding the inverter circuit 15 in the first to sixth embodiments. A second selector 26 selects either the voltage command issued by the first rectangular wave driving means 24 or the voltage command issued by the sinusoidal wave driving means 25, depending on the output of starting completion judging means 27, and transmits to the inverter circuit 15. The other constitution is same as in the foregoing first to sixth embodiments.

In this constitution, when starting up the motor 3, first, the second selector 26 selects the voltage command from the first rectangular wave driving means 24, and transmits to the inverter circuit 15. Accordingly, the first rectangular wave driving means 24 transmits the voltage command created on the basis of the three rotor magnetic pole position detection signals issued by the pulse generators 4A, 4B and 4C to the inverter circuit 15, and the usual brushless motor operation of rectangular wave driving is performed. As the motor 3 is put in rotation in this way, the starting completion judging means 27 judges completion of starting when the rotating speed of the motor 3 exceeds a preset value, or when the number of times of detection of edges of the output signals of the pulse generators 4A, 4B and 4C exceeds a preset value, and transmits a changeover signal to the second selector 26. When receiving this changeover signal, the second selector 26 changes over the voltage command to be applied to the inverter circuit 15, from the output of the first rectangular wave driving means 24 to the voltage command issued from the sinusoidal wave driving means 25. Afterwards, in the same operation as in the foregoing embodiments, the starting procedure is complete. Therefore, operating as an ordinary brushless motor of rectangular wave drive when starting, a stable starting characteristic is obtained.

Thus, the embodiment comprises the first rectangular wave driving means 24 for driving by rectangular wave feeding on the basis of the output signals from the three pulse generators 4A, 4B and 4C, and when starting up the motor 3, the inverter circuit 15 processes rectangular wave feeding by the first rectangular wave driving means 24, so that a stable starting characteristic is obtained.

Not limited to the starting process, moreover, by setting a threshold value in the rotating speed of the motor 3, it may be constituted to perform rectangular wave feeding when lower than this threshold value, and perform sinusoidal wave driving when higher than the threshold value. Generally, while the motor 3 is rotating at low speed, it is likely to have effects of disturbance torque and be unstable in rotation. Therefore, the sinusoidal wave driving may cause error in address at low speed, and the output torque may fluctuate to be unstable in operation. By changing over to rectangular wave driving by force at low speed, a stable operation is realized in a wide range of rotating speed. Further, in this case, the rotating speed for changing over rectangular wave and sinusoidal wave may be provided with hysteresis characteristic, so that fluctuations of changeover near the changeover rotating speed may be prevented.

(Embodiment 11)

When the address Au does not indicate correct rotor magnetic pole position due to, for example, sudden application of disturbance torque to the motor 3, the output torque decreases, or sometimes stops. It is an eleventh embodiment that solves this problem.

Figure 20:
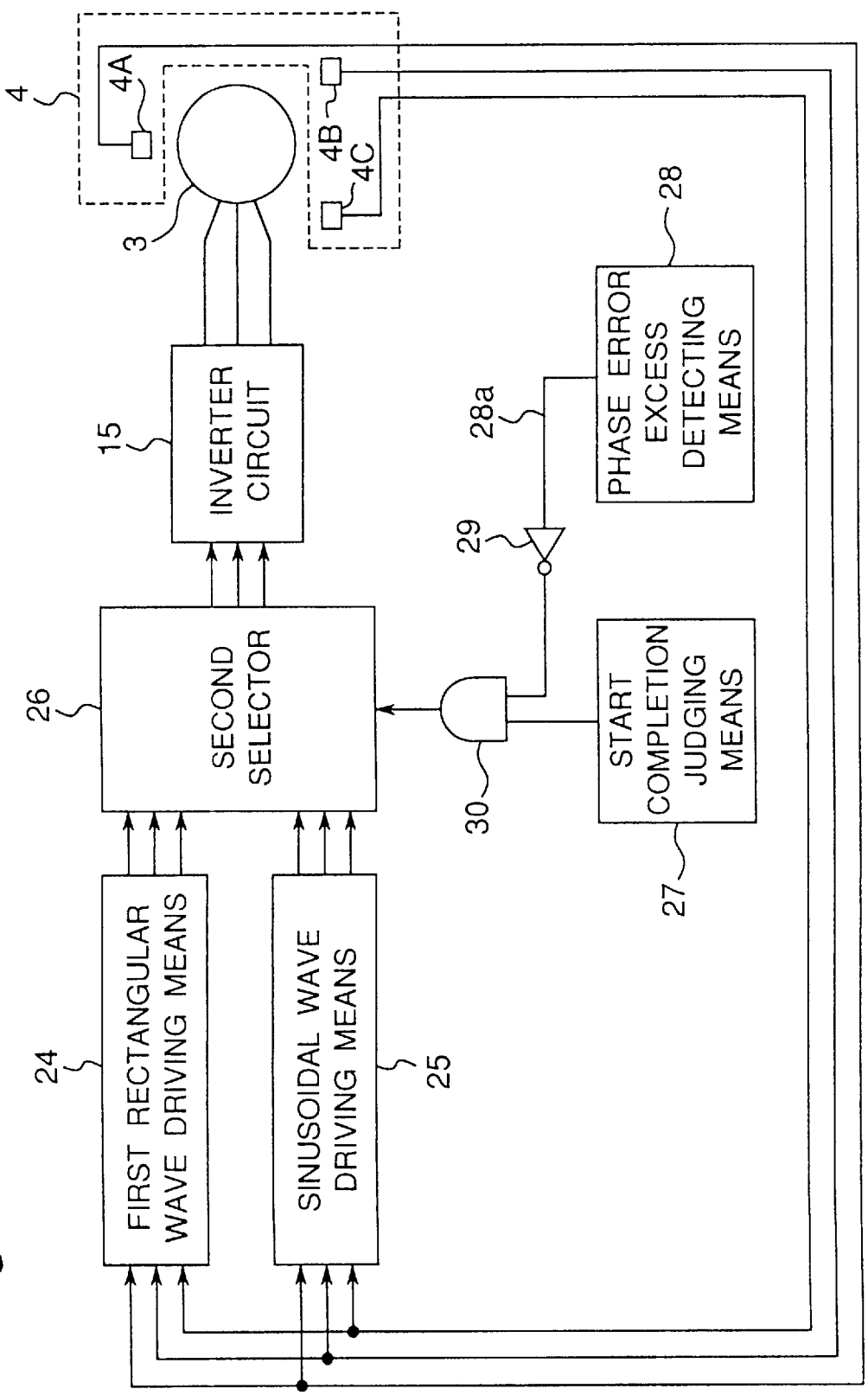
FIG. 20 is a block diagram of an eleventh embodiment.

FIG. 20 is a block diagram showing the eleventh embodiment of the present invention. In FIG. 20, phase error excess detecting means 28 detects when the absolute value of address error Aerr has exceeded a preset value, and issues a phase error excess signal 28a as 'H' at this time. Logic inverting means 29 inverts logically and issues the phase error excess signal 28a, and AND means 30 calculates AND of the output signal of the starting completion judging means 27 and the output signal of the logic inverting means 29, and issues to the second selector 26. The other constitution is same as in the tenth embodiment.

The operation of this constitution is described below while referring also to the time chart in FIG. 21. Since this embodiment comprises three pulse generators 4A, 4B and 4C, it is preferred to update the address error Aerr at every edge of their output pulses 4a, 4b and 4c, but for the ease of explanation, it is herein explained to update the address error Aerr only when detecting the leading edge of the pulse signal 4a.

Figure 21:
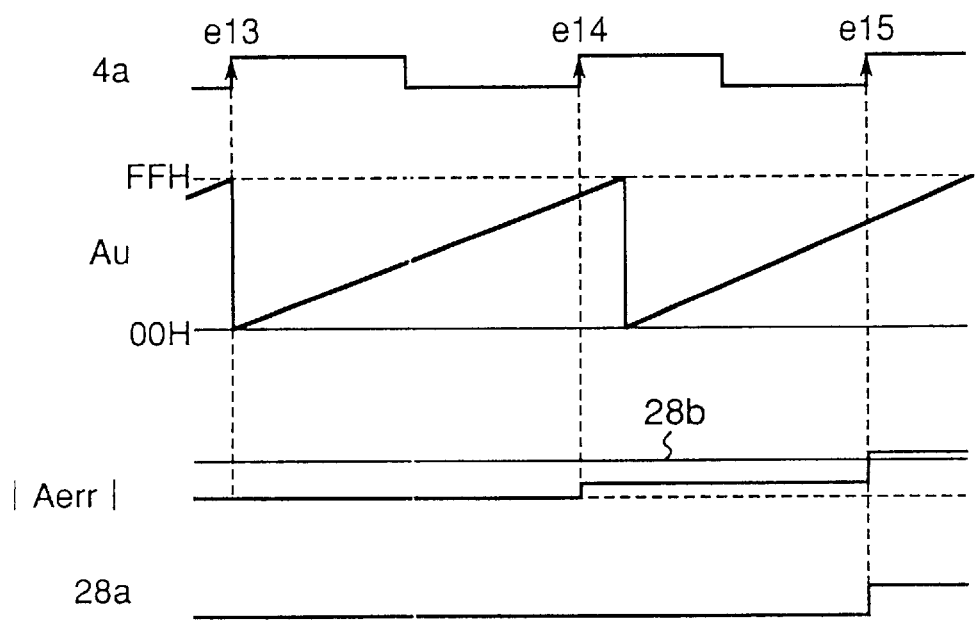
FIG. 21 is a time chart showing the operation of the eleventh embodiment.

In FIG. 21, at edge e13 of pulse signal 4a, the address error Aerr is zero, but as further advancing to edge e14, e15, the address error Aerr is increasing. At edge e14, the absolute value of the address error Aerr is smaller than a preset threshold value 28b, but at edge e15, it has exceeded the threshold value 28b, and the phase error excess signal 28a is changed to 'H'. When the phase error excess signal 28a becomes 'H', the output signal of the logic converting means 29 becomes 'L', and the output signal of the AND means 30 also becomes 'L'. Moreover, when starting up, the start completion judging means 27 issues an 'L' output, and the output signal of the AND means 30 is 'L'. When the output signal of the AND means 30 is 'L', the second selector 26 changes over the voltage command to be given to the inverter circuit 15, from the voltage command issued by the sinusoidal wave driving means 25 to the output of the first rectangular wave driving means 24. That is, upon start and upon completion of start, when the absolute value of the address error Aerr exceeds the threshold value 28b, the second selector 26 selects the voltage command issued by the first rectangular wave driving means as the voltage command to be given to the inverter circuit 15. Therefore, when the address Au fails to indicate the correct rotor magnetic pole position, the motor works as brushless motor of ordinary rectangular wave driving, so that the rotation can be maintained. When the phase error excess signal 28a becomes 'H' and the operation is changed-over to rectangular wave driving, after a specific time, the phase error excess detecting means 28 returns the phase error excess signal 28a to 'L' to return to sinusoidal wave driving.

Thus, according to the embodiment, the phase error excess detecting means 28 detects when the absolute value of the address error Aerr exceeds a preset value 28b, and issues a phase error excess signal 28a, and the inverter circuit 15 processes rectangular wave feeding, and therefore the rotation can be maintained if the address Au fails to indicate the correct rotor magnetic pole position due to application of sudden disturbance torque to the motor 3 or the like.

(Embodiment 12)

When the rotor 3 and its driving circuit are disposed separately, as the number of pulse generators is smaller the number of output signal wires of the pulse generators is smaller, so that the cost may be reduced. It is a twelfth embodiment that achieves the same object as in the eleventh embodiment by a small number of pulse generators.

Figure 22:
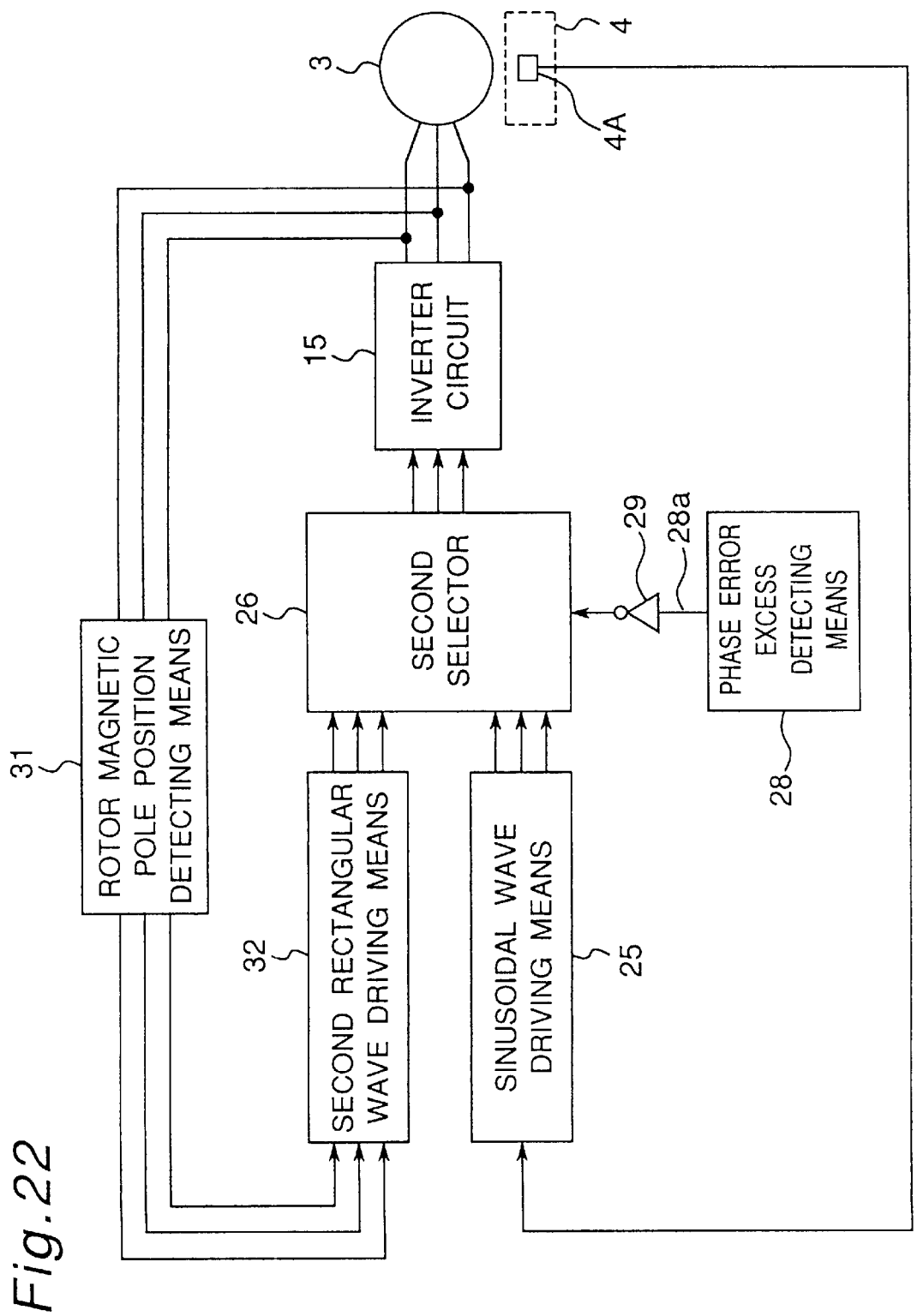
FIG. 22 is a block diagram of a twelfth embodiment.

FIG. 22 is a block diagram showing the twelfth embodiment of the present invention. In FIG. 22, a rotor magnetic pole position detecting circuit 31 detects the induced voltage of the motor 3, and detects the magnetic pole position of the rotor accordingly. Second rectangular wave driving means 32 creates and issues a voltage command for rectangular wave driving on the basis of the output signal of the rotor magnetic pole position detecting circuit 31. Sinusoidal wave driving means 25 corresponds to the portion excluding the inverter circuit 15 in the foregoing first to sixth embodiments, and creates and issues a voltage command for sinusoidal wave driving on the basis of output pulse signal 4a of one pulse generator 4A. A second selector 26 and phase error excess detecting means 28 are same as explained in the eleventh embodiment. The other constitution is same as in the sixth and ninth embodiments.

The operation of this constitution is described below. Usually, the second selector 26 selects the voltage command issued by the sinusoidal wave driving means 25, and transmits to the inverter circuit 15 for sinusoidal wave driving. Herein, as explained in the eleventh embodiment, if the absolute value of the address error Aerr exceeds a threshold value 28b due to application of sudden disturbance to the motor 3 or the like, the phase error excess detecting means 28 turns the phase error excess signal 28a to 'H', and the second selector 26 changes over, and the voltage command issued by the second rectangular wave driving means 32 is given to the inverter circuit 15. The second rectangular wave driving circuit 32 conducts 120-degree feeding rectangular wave driving on the basis of the input signal from the rotor magnetic pole position detecting circuit 31. The rotor magnetic pole position detecting circuit 31 receives the output of the inverter circuit 15, that is, the output of the winding of the motor 3, and detects the induced voltage of the motor 3. In the 120-degree rectangular wave feeding conducted by the second rectangular wave driving means 32, both upper and lower arms of the power transistor of the inverter circuit 15 of an electric angle of 60 degrees become OFF twice per period (an electric angle of 360 degrees), and the induced voltage of the motor 3 can be detected on these occasions. By making use of this phenomenon, the rotor magnetic pole position detecting circuit 31 integrates, for example, three input signals by filter, and one signal after integrating process is compared with partial voltages of the other two signals, and the rotor magnetic pole position detection signal is created. Therefore, when the address Au fails to indicate the correct rotor magnetic pole position, the motor operates as brushless motor of rectangular wave driving by detection of rotor magnetic pole position by making use of induced voltage of the motor 3, so that the rotation may be maintained. When the phase error excess signal 28a becomes 'H' to change over to rectangular wave driving, after a specific time, the phase error excess detecting means 28 returns the phase error excess signal 28a to 'L', thereby returning to sinusoidal wave driving.

Thus, according to the embodiment, the phase error excess detecting means 28 detects and issues a phase error excess signal 28a when the absolute value of the address error Aerr exceeds a preset threshold value 28b, the inverter 15 processes rectangular wave feeding according to the signal of detection of magnetic pole position of the rotor from the induced voltage of the motor 3 by the rotor magnetic pole position detecting circuit 31, and therefore if the address Au fails to indicate the correct rotor magnetic pole position due to application of sudden disturbance torque to the motor 3 or the like, the rotation can be maintained. Moreover, it is composed of one pulse generator, and the number of output signal wires of the pulse generator is decreased, so that the cost is reduced.

Incidentally, when changing over from the sinusoidal wave driving to the rectangular wave driving, all transistors of the inverter circuit 15 may be turned OFF temporarily, that is, an interval of so-called free-run state may be also provided. As a result, the rotor magnetic pole position driving circuit 31 can detect the induced voltage of the motor 3 securely, so that it is possible to transfer to rectangular wave driving smoothly.

(Embodiment 13)

In the ninth and twelfth embodiments, since the address error Aerr is updated only at every edge of the output pulse signal 4a of the pulse generator 4A, if the rotating speed of the motor 3 drops suddenly and the time until the next edge is detected is longer, although the error occurring in the address Au increases, the operation cannot be changed over to rectangular wave until the next edge is detected, and an unstable operation occurs temporarily. It is a thirteenth embodiment that solves this problem.

Figure 23:
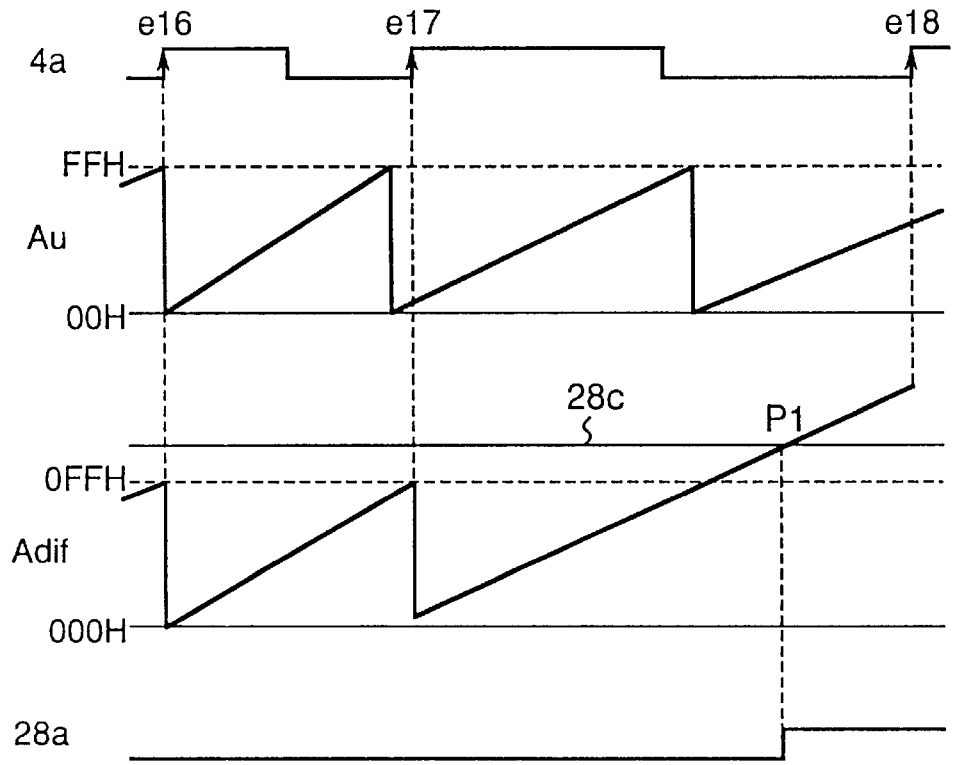
FIG. 23 is a time chart showing the operation of a thirteenth embodiment.

A block diagram of the thirteenth embodiment is same as FIG. 20 showing a block diagram of the eleventh embodiment or FIG. 22 showing a block diagram of the twelfth embodiment, except that the internal constitution of the phase error excess detecting mans 28 is different, and its operation is as shown in the time chart in FIG. 23.

In FIG. 23, an address differential Adif is a value of subtracting 00H which is the reference address value Aref indicated by the leading edge of the pulse signal 4a from the present address Au. However, in order to count the value exceeding the address amount 100H corresponding to the edge period of the pulse signal 4a when the address Au is indicating the correct rotor magnetic pole position, the count bit width is held more than the address Au.

The operation is sequentially described below. First, at edge e16 of the pulse signal 4a, there is no error in address Au, but the counting speed of the address counter 9 is fast, and the address Au overflows before detecting next edge e17. Since the reference address value Aref is 00H, the address differential Adif is same value as the address Au, but if the address Au overflows, the address Au is regarded to carry, and the address differential Adif is calculated, and counting continues as the address differential Adif exceeds FFH that is the maximum value of the address Au. When a next edge e17 is detected, the processing returns to the beginning, and the reference address value 00H is subtracted from the present address Au to obtain address differential Adif. Successively, the same operation is repeated, but since the timing of the next edge e18 is late, the error occurring in the address Au increases, but at timing p1 before edge e18, the value of the address differential Adif exceeds a preset threshold value 28c. When the address differential Adif exceeds the threshold value 28c, the phase error excess detecting means 28 sets the phase error excess signal 28a to 'H', and the second selector 26 changes over, so that the sinusoidal wave driving is changed to rectangular wave driving. Therefore, without waiting for detection of next edge e18, it is detected that the error occurring in the address Au has exceeded a specific value, thereby changing over to rectangular wave driving.

In this operation, the address differential Adif is used for detecting that the address Au has advanced too much. Hence, if the counting of the address Au is delayed, and the address differential Adif is somewhere between 80H and FFH at edge point, to cancel this delay portion, the address differential Adif is reset to 000H when the address differential Adif becomes 100H. Besides, when the motor 3 is also driven reversely, the value of the address Au decreases along with the lapse of time, and the phase error excess is judged by comparison between the absolute value of the address differential Adif and the threshold value 28c.

Thus, according to the embodiment, when the address differential Adif of subtracting the reference address value Aref from the address Au has exceeded the preset value 28c, the phase error excess detecting means 28 detects it and issues a phase error excess signal 28a, and the inverter circuit 15 changes over to the rectangular wave feeding process, so that a stable rotation may be maintained if disturbance torque or the like is suddenly applied to the motor 3.

This explanation on the basis of output pulse signal 4a of one pulse generator 4A is for the ease of understanding, and if plural pulse generators are provided as in the eleventh embodiment, by performing a series of actions at every one of plural edge timings obtained from the plural pulse generators, the bit width for counting the address differential Adif may be smaller, so that the constitution and operation may be simple.

(Embodiment 14)

Figure 24:
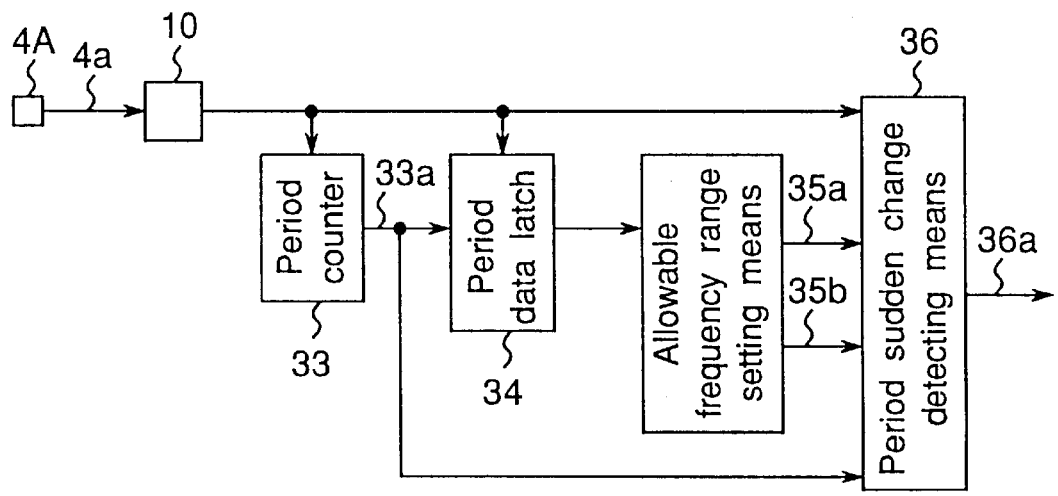
FIG. 24 is a block diagram of a fourteenth embodiment.

FIG. 24 is a block diagram showing a fourteenth embodiment of the present invention. In FIG. 24, the pulse generator 4A and first edge detecting means 10 are same as explained above. A period counter 33 is a counter for measuring the period between leading edges of output signal 4a issued by the pulse generator 4A, and a period data latch 34 is to read and hold the period count data 33a of the period counter 33 at every output timing of the first edge detecting means 10. Allowable period range setting means 35 is to set an allowable range of period measured by the period counter 33 on the basis of the output of the period data latch 34, and issues a period upper limit value 35a and a period lower limit value 35b. Period sudden change detecting means 36 issues a period sudden change signal 36a when the period count data 33a of the period counter 33 has exceeded the period upper limit value 35a, or when the leading edge of pulse signal 4a is detected before reaching the period lower limit value 35b. The other constitution is same as in the eighth, ninth, tenth and thirteenth embodiments, and the period sudden change signal 36a is transmitted to the second selector 26, and when the period sudden change signal 36a is changed from 'L' to 'H', sinusoidal wave driving is changed over to the rectangular wave driving.

Figure 25:
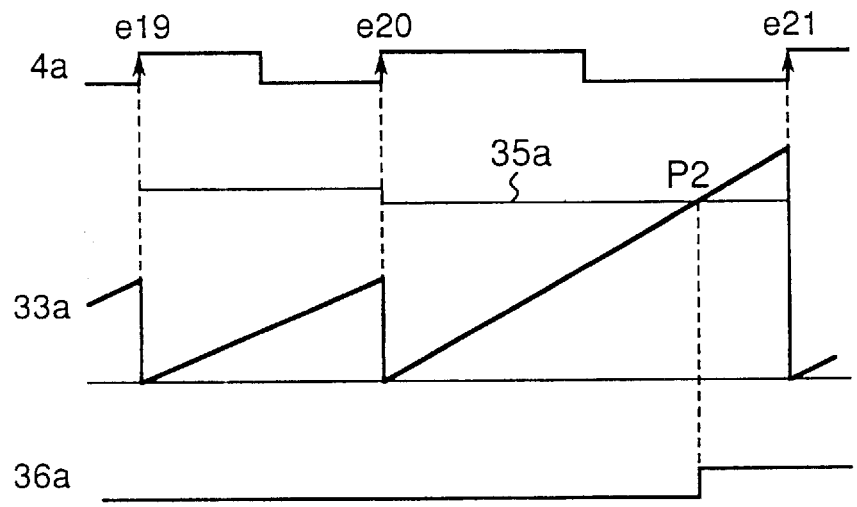
FIG. 25 is a time chart showing the operation of the fourteenth embodiment.

FIG. 25 shows the operation when the period of the pulse signal 4a suddenly becomes long due to sudden disturbance or the like applied to the motor 3. When the leading edge of the pulse signal 4a is detected, the period count data 33a issued by the period counter 33 is held in the period data latch 34, and the period counter 33 is reset. The allowable period range setting means 35 sets the period upper limit value 35a on the basis of the data held in this period data latch 34. For example, a preset value is added or multiplied to the data held in the period data latch 34 to set the period upper limit value 35a. This operation is repeated every time a new leading edge of pulse signal 4a is detected. In the interval from edge e19 to edge e20, the period count data 33a is a smaller value than the period upper limit value 35a, but since the period is suddenly extended in the interval from the next edge e20 to edge e21, the period count data 33a exceeds the period upper limit value 35a at the timing of p2, so that the period sudden change signal 36a is changed from 'L' to 'H'. The period sudden change signal 36a is transmitted to the second selector 26, and when the period sudden change signal 36a is changed from 'L' to 'H', the inverter circuit 15 changes over from sinusoidal wave driving to rectangular wave driving.

Figure 26:
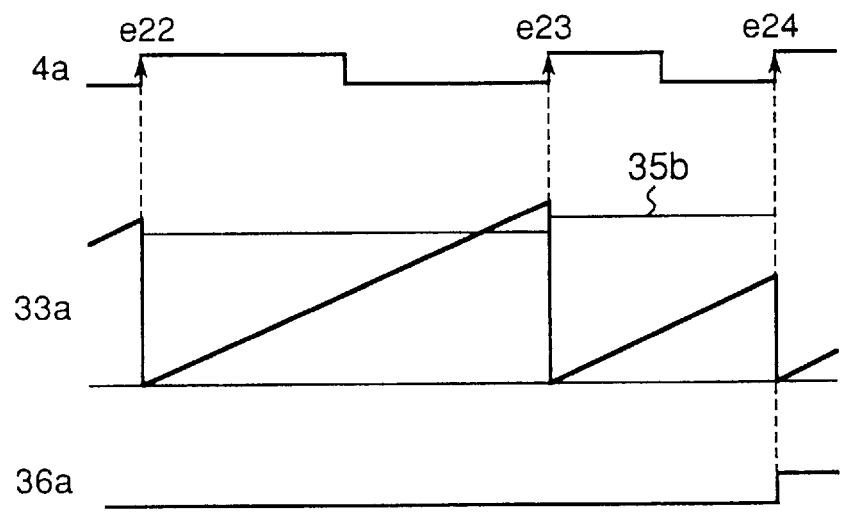
FIG. 26 is a time chart showing the operation of the fourteenth embodiment.

FIG. 26 shows the operation in which the period of the pulse signal 4a is suddenly shortened contrary to the case in FIG. 25. The allowable period range setting means 35 sets the period upper limit value 35a, and simultaneously sets the period lower limit value 35b on the basis of the data held in the period data latch 34. For example, a preset value is subtracted or divided from the data held in the period data latch 34, and the period upper limit value 35a is set. In the interval from edge e22 to edge e23, the period count data 33a exceeds the period lower limit value 35b before reaching edge e23, but in the interval from the next edge e23 to edge e24, the period is suddenly shortened, and the period count data 33a does not reach the period lower limit value 135b at the point of edge e24, so that the period sudden change signal 36a is changed from 'L' to 'H'. At this time, same as when the period of the pulse signal 4a is suddenly extended, the inverter circuit 15 is changed over from sinusoidal wave driving to rectangular wave driving.

As already explained in the embodiment, the counting speed of the address counter 9 is created on the basis of the edge period of the pulse signal 4a. Hence, if the period of the pulse signal 4a is suddenly changed largely, the error of the address Au is very large consequently. In the fourteenth embodiment, by detecting sudden and large change of the period of the pulse signal 4a, excess error in the address Au is predicted, and sinusoidal wave driving is changed to rectangular wave driving in order to maintain the rotation. When the period sudden change signal 36a becomes 'H' to change over to rectangular wave driving, after a specific time, the period sudden change detecting means 36 returns the period sudden change signal 36a to 'L', thereby returning to sinusoidal wave driving.

Thus, according to the embodiment, on the basis of the period data of the pulse signal 4a measured by the period counter 33, the allowable period range setting means 35 sets the period upper limit value 35a and period lower limit value 35b as the allowable range of the period data to be measured next time, and a period sudden change signal 36a is issued when the period count data 33a exceeds the period upper limit value 35a, or when the leading edge of the pulse signal 4a is detected before reaching the period lower limit value 35b, and the inverter circuit 15 changes over the operation to rectangular wave driving, so that a stable rotation may be maintained if a sudden disturbance torque or the like is applied to the motor 3.

(Embodiment 15)

Figure 27:
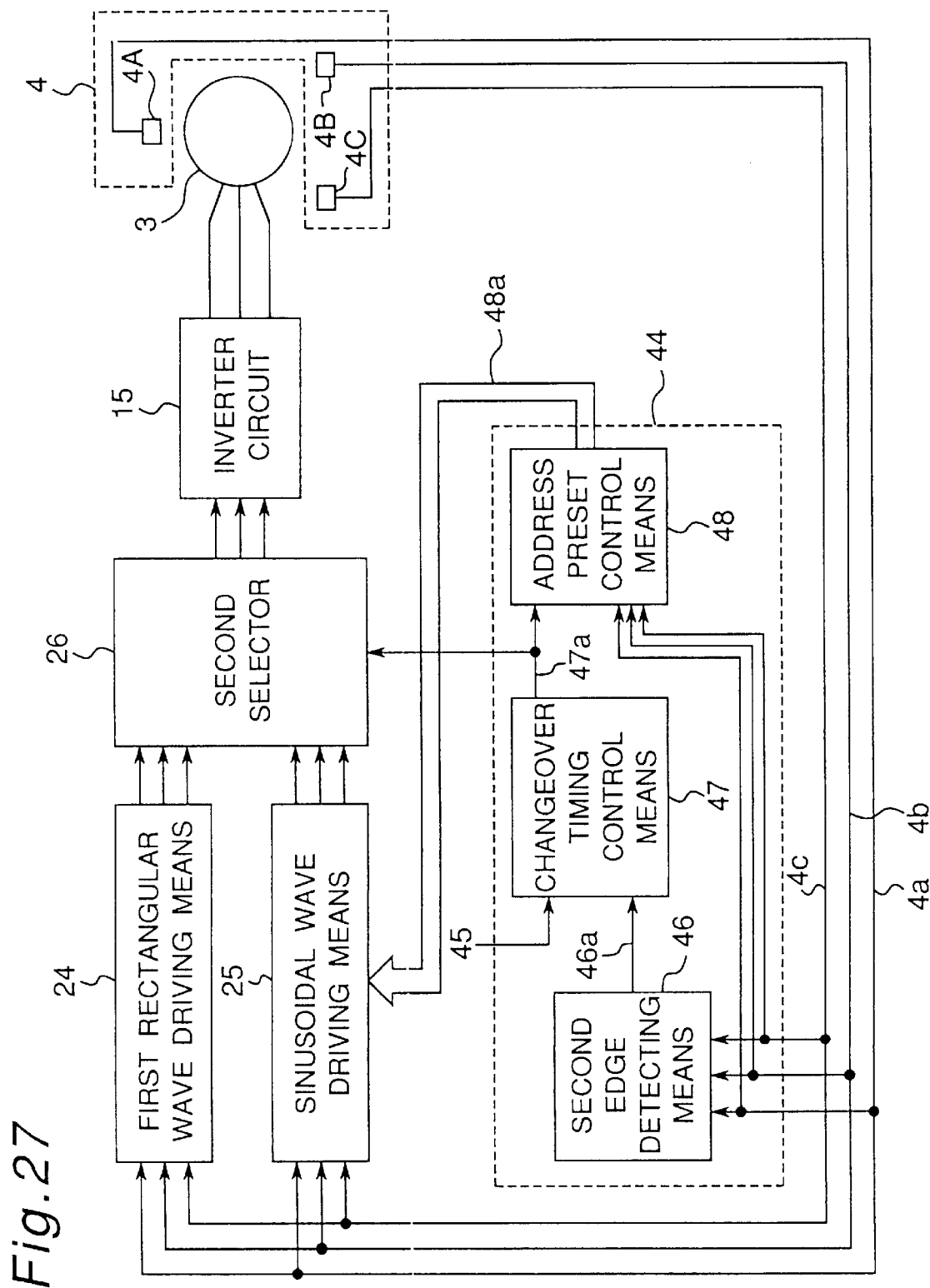
FIG. 27 is a block diagram of a fifteenth embodiment.

FIG. 27 is a block diagram showing a fifteenth embodiment of the present invention. In FIG. 27, driving mode changeover control means 44 processes by receiving a driving mode changeover signal 45 and output pulse signals 4a, 4b and 4c of the rotor position detecting means 4, and issues a driving mode changeover signal 47a to the second selector 26, or an address preset signal 48a to the sinusoidal wave driving means 25, and it includes, in its inside, second edge detecting means 46 for detecting the edges of the pulse signals 4a, 4b and 4c, changeover timing control means 47 for creating a driving mode changeover signal 47a, and address preset control means 48 for creating an address preset signal 48a. The other constitution is nearly same as in FIG. 20 showing the eleventh embodiment, and the output signal of the AND means 30 in FIG. 20 corresponds to the driving mode changeover signal 45 in this FIG. 27. The constituent element for creating this driving mode changeover signal 45 is omitted.

In this constitution, upon start or upon onset of phase error excess, to transfer from the executing state of rectangular wave feeding process to the ordinary sinusoidal wave driving process for feeding according to the content of the waveform data memory 12, the driving mode changeover signal 45 is changed, and the driving mode changeover control means 44 does not immediately transmit this signal to the second selector 26, but the internal changeover timing control means 47 delays until the edge detection signal 46a from the second edge detecting means 46 is obtained, and then it is transmitted to the second selector 26 at the edge timing of pulse signals 4a, 4b and 4c. At the same time, the address preset control means 48 issues the reference address value Aref corresponding to this edge to the sinusoidal wave driving means 25 as address preset signal 48a, and this reference address value Aref is preset in the address counter 9 inside the sinusoidal wave driving means 25. The second selector 26 changes over the driving mode to transfer from rectangular wave driving to sinusoidal wave driving. That is, when the driving mode changeover signal 45 commands sinusoidal wave driving, after waiting until detecting the edges of the pulse signals 4a, 4b and 4c, the reference address value Aref corresponding to the edge is preset in the address counter 9 in the sinusoidal wave driving means 25, thereby changing over to sinusoidal wave driving. The driving mode changeover control means 44 operates in such manner only when transferring from rectangular wave driving to sinusoidal wave driving, and to the contrary when transferring from sinusoidal wave driving to rectangular wave driving, the driving mode changeover signal 45 is transmitted to the second selector 26 at the same timing, and address preset signal 48a is not issued. Therefore, when the driving mode changeover signal 45 commands rectangular wave driving, it is immediately changed over to rectangular wave driving.

Figure 28:
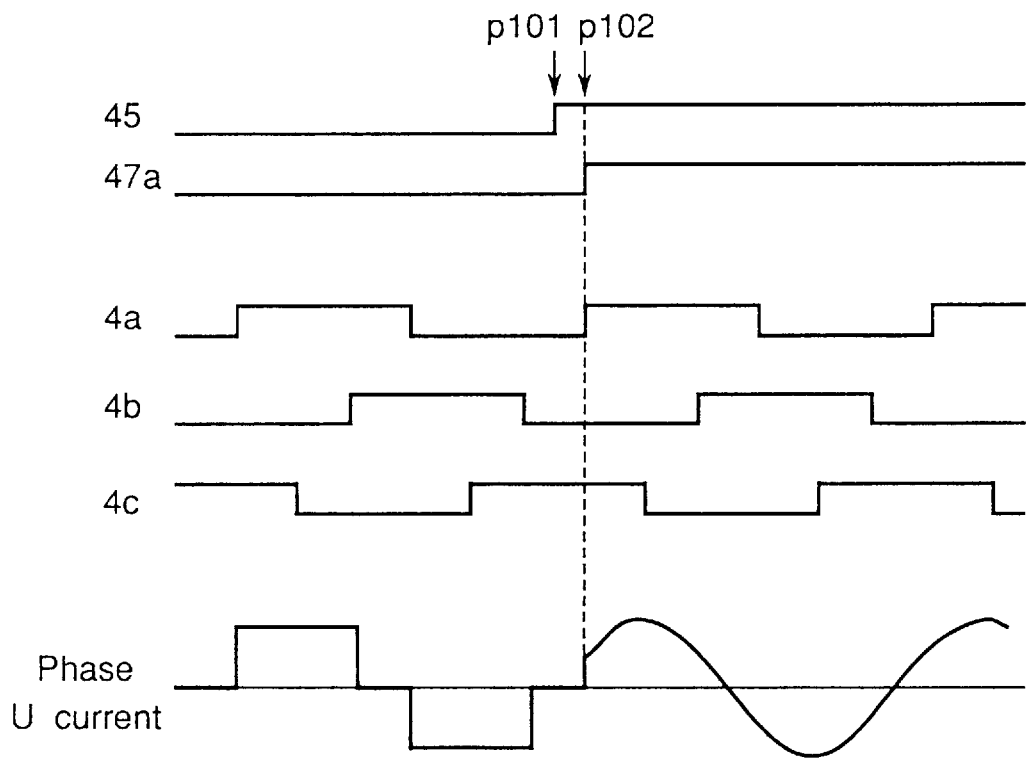
FIG. 28 is a time chart showing the operation of the fifteenth embodiment.

FIG. 28 is a time chart showing the operation when changing over from rectangular wave driving to sinusoidal wave driving. During rectangular wave driving on the basis of the state of pulse signals 4a, 4b and 4c, the driving mode changeover signal 45 is changed from 'L' to 'H' at the timing p101, and sinusoidal wave driving is commanded. As a result, by the operation of the starting mode changeover control means 44 mentioned above, at any edge of the pulse signals 4a, 4b and 4c, that is, at the timing p102 of obtaining the edge of pulse signal 4a in this diagram, the driving mode changeover signal 47a is changed from 'L' to 'H', thereby changing over to sinusoidal wave driving. At the same time, the reference address value Aref is preset in the address counter 9 in the sinusoidal wave driving means 25, and therefore at this point of changeover, there is no error in the address Au, and the address Au indicates the correct rotor position.

Instead of the constitution of the embodiment described herein, when changed over from rectangular wave to sinusoidal wave at an arbitrary timing, a large error may occur in the address Au at the changeover point. This is because the address Au issued by the address counter 9 is not always indicating the correct rotor position in the period from edge to edge of the pulse signals 4a, 4b and 4c, due to fluctuations of load torque, disturbance torque, or the like. In particular, when composed of software, for the purpose of curtailing the processing time or the like, only one of the first rectangular wave driving means 24 and sinusoidal wave driving means 25 may be put in operation. In such a case, in rectangular wave driving, the rectangular wave driving means 25 is stopped, and the address Au is not indicating the correct rotor position. Hence, when changing over to rectangular wave driving, an address value indicating a rough rotor position is determined from the state of the present pulse signals 4a, 4b and 4c, and it is preset in the address counter 9, and then driving is changed over. In such a case, the address error when changing over is a further larger value. When changed over from rectangular wave to sinusoidal wave in the state of a large error in the address Au, sufficient driving torque is not obtained at the point of changeover, and the rotating speed may fluctuate, so that stable changeover operation is not expected. By contrast, according to the constitution of the embodiment, since the reference address value Aref is preset at the time of changeover, no error occurs in the address Au. Therefore, a maximum torque is obtained, and smooth changeover is realized.

Not limited to the moment of starting or excessive phase error, the constitution of the embodiment is also effective when changing over from rectangular wave to sinusoidal wave, or from sinusoidal wave to rectangular wave, at an arbitrary timing when a high output is desired temporarily or owing to other reasons.

(Embodiment 16)

The pulse generator 4A is generally composed of, for example, a Hall element for detecting the magnetic pole position of rotor of the motor 3, but in such a case, due to mechanical mounting precision of the Hall element or element characteristic, fluctuation may occur in the rotor magnetic pole position indicated by the edge of the output pulse signal 4a of the pulse generator 4A, and an individual difference may occur in the output torque or efficiency of the motor 3. It is a sixteenth embodiment that solves this problem.

In the sixteenth embodiment, the reference address value Aref corresponding to the rotor magnetic pole position indicated by the edge of the output pulse signal 4a of the pulse generator 4A is composed by adding an arbitrarily changeable offset address value Aofs to an ideal reference address value Aref0 corresponding to the rotor magnetic pole position indicated by an ideal pulse signal 4a0. That is, the reference address value Aref is expressed by a relational formula of Aref=Aref0+Aofs. Since the offset address Aofs is arbitrarily changeable, the reference address Aref is also arbitrarily changeable.

Figure 29:
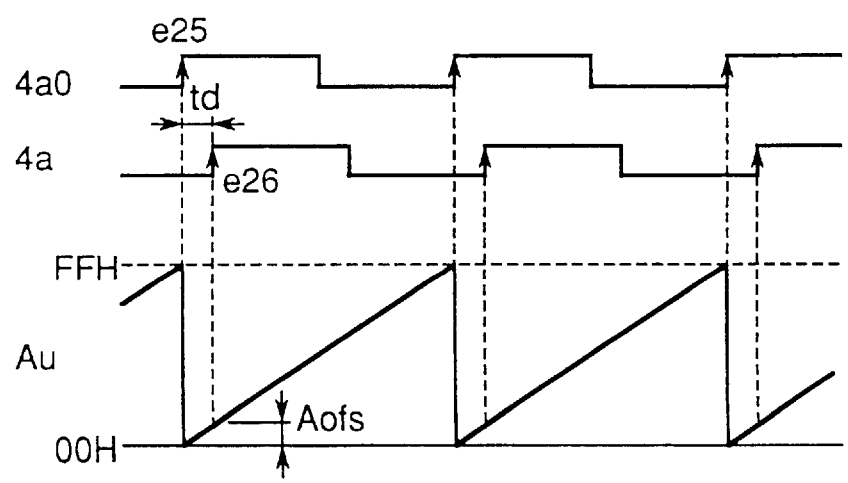
FIG. 29 is a time chart showing the operation of a sixteenth embodiment.

FIG. 29 is a time chart showing the operation of the sixteenth embodiment. It shows that the ideal reference address value Aref0 corresponding to the leading edge of the ideal pulse signal 4a0 is 00H. As compared with the ideal pulse signal 4a0, the actual pulse 4a has a delay of td. Accordingly, as the reference address value Aref corresponding to edge e26, by adding the offset address value Aofs to the ideal reference address value Aref0, that is, using the offset address value Aofs, the address Au indicates the rotor magnetic pole position correctly. The delay td of the edge e26 as compared with the edge e25 is due to mechanical mounting precision or the like of the pulse generator 4A, and hence fluctuation occurs. Therefore, by setting the offset address value Aofs at an appropriate value in every motor 3, the maximum output torque and efficiency will be obtained.

Thus, according to the embodiment, by creating the reference address value Aref in the relational formula of Aref=Aref0+Aofs, by using the ideal reference address value Aref0 and arbitrarily changeable offset address value Aofs, the reference address value Aref may be arbitrarily changed, and it is possible to cancel the edge timing error of pulse signal 4a due to mechanical mounting precision or the like of the pulse generator 4A, so that the motor 3 can be driven at maximum output torque and efficiency.

Meanwhile, the offset address value Aofs may be also composed to so as to be capable of rewriting and holding the memory content even when the power supply is stopped, such as EEPROM and flash memory. Moreover, once the offset address value Aofs is set an optimum value according to the motor 3, it is not necessary to set again when turning on the power source.

(Embodiment 17)

Since the motor 3 is an inductive load, when the inverter circuit 15 is composed not to effect current control, a phase delay occurs in the phase current of the motor 3 with respect to the phase output command values Vu, Vv and Vw. The higher the rotating speed of the motor 3, the higher becomes the frequency, and this phase delay is a large value, and sufficient output torque value is not obtained as the rotating speed increases. It is a seventeenth embodiment that solves this problem.

In the seventeenth embodiment, the reference address value Aref is composed by adding an arbitrarily changeable offset address value Aofs and a variable address value Avar determined on the basis of the rotating frequency signal Fsen issued by rotating frequency detecting means 8, to the ideal reference address value Aref0 corresponding to the edge of the ideal pulse signal 4a0. That is, the reference address value Aref is expressed in a relational formula of Aref= Aref0+Aofs+Avar. What differs from the preceding sixteenth embodiment is the presence of variable address value Avar in the third term of the right side of this relational formula.

Figure 30:
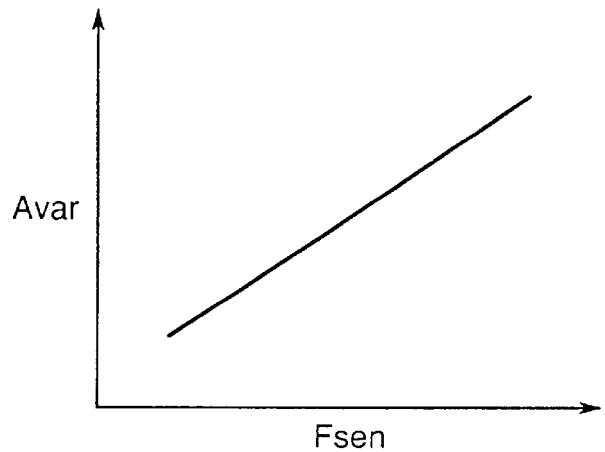
FIG. 30 is a graph for explaining the operation of a seventeenth embodiment.

The offset address value Aofs is, as mentioned in the sixteenth embodiment, to cancel the edge timing error of the pulse signal 4a due to mechanical mounting precision of the pulse generator 4A, and it is not changed during driving of the motor 3, but the variable address value Avar changes dynamically according to the rotating frequency signal Fsen. FIG. 30 is a graph showing an example of the relation of the rotating frequency signal Fsen and variable address value Avar. According to the relation indicated by the graph, when the rotating speed of the motor 3 increases, the reference address value Aref becomes a large value, and the phase of the phase output command value Vu, Vv and Vw as the voltage command value to the inverter circuit 15 is advanced. Therefore, the phase of the voltage applied to the motor 3 is advanced, but the phase of the current is delayed to establish an appropriate phase relation, so that a desired output torque is obtained.

When the induced voltage and current of the motor 3 are matched in phase, maximum values are obtained in both output torque and efficiency. In order to obtain this phase relation, the phase of the voltage applied to the motor 3 is set appropriately by changing the reference address value Aref, and the relation of the rotating frequency signal Fsen and variable address value Avar is not limited to the linear graph as shown in FIG. 30, but may be also defined in a curvature relation. Incidentally, the current phase delay amount of the motor 3 does not change depending only on the rotating speed, but also varies depending on, for example, the current. Therefore, it is more preferably to set the variable address value Avar by using a current detector and considering the current size.

Thus, according to the embodiment, by creating the reference address value Aref in the relational formula of Aref=Aref0+Aofs+Avar, by using the ideal reference address value Aref0, arbitrarily changeable offset address value Aofs, rotating frequency signal Fsen or variable address value Avar determined on the basis of the current value of the motor 3, in addition to the effects of the preceding sixteenth embodiment, the phase advancing process for canceling the delay of current phase of the motor 3 can be done easily, so that a desired output torque may be obtained.

In the constitution of the embodiment, by manipulating the reference address value Aref, the current phase can be freely changed during driving of the motor 3, and the output torque can be controlled very easily. Therefore, not limited to the purpose of enhancing the efficiency alone, for example, by varying the relation between the rotating frequency signal Fsen and variable address value Avar, generation of regenerative electric power can be prevented by shifting the phase and decreasing the output current in a region higher than a certain rotating speed. In the case of the motor 3 applied for driving the fan and installed outdoors, a strong external force in the same direction as the rotating speed of the motor 3 may act during power feed due to strong wind or the like, and a regenerative electric power is generated when the induced voltage is higher than the voltage applied to the motor 3 at this time. In the general constitution of capacitor input type for rectifying and smoothing the AC power source to produce DC power source for supplying electric power to the inverter circuit 15, when a regenerative electric power is returned from the motor 3, the energy is accumulated, and the voltage is raised to exceed the withstand voltage of the constituent parts. It was hence an important subject to prevent generation of regenerative electric power, and it can be easily avoided by the constitution of the embodiment. When the current phase is shifted, the motor 3 generates heat, but regenerative electric power is not generated. Such heat generation of the motor 3 is cooled sufficiently by strong wind, and it does not pose problem. Thus, in the embodiment, the current phase can be easily changed during driving of the motor 3, and the scope of application is wide, not limited by the purpose of enhancing the efficiency.

In the constitution without rotating frequency detecting means 8, it may be designed to determine the variable address value Avar on the basis of the frequency command Fref. In usual state, there is no significant difference between the rotating frequency Fsen and frequency command Fref, so that they may be used exchangeable.

(Embodiment 18)

Among the embodiments described so far, in those having rotating frequency detecting means 8 in the constituent elements, due to magnetization precision of rotor, characteristic of pulse generator 4A, or mechanical mounting precision, fluctuation may occur in the period of output pulse signal 4a or error may occur in the rotating frequency signal Fsen even if the motor 3 is rotating uniformly at a constant speed. It is an eighteenth embodiment that solves this problem.

Figure 31:
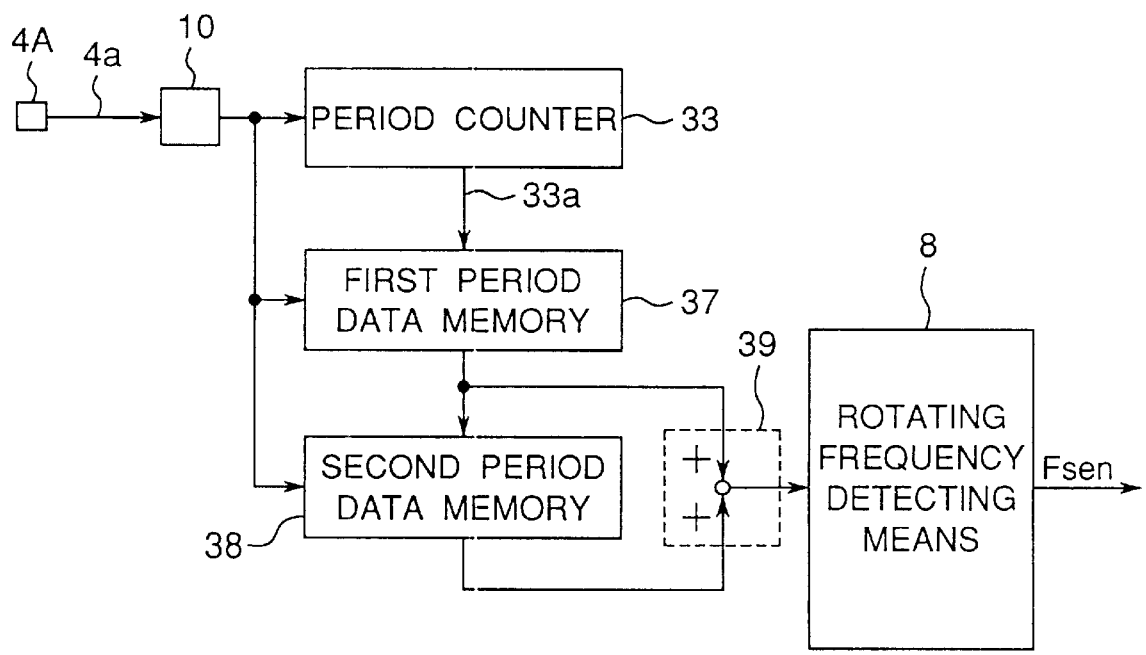
FIG. 31 is a block diagram of an eighteenth embodiment.

FIG. 31 is a block diagram showing the eighteenth embodiment of the present invention. In FIG. 31, the pulse generator 4A, first edge detecting means 10, and period counter 33 are same as explained already. A first period data memory 37 is to read and store the period count data 33a of the period counter 33 at every output timing of the first edge detecting means 10, and second period data memory 38 is to read and store the data stored in the first period data memory 37 at every output timing of the first edge detecting means 10. One-rotation period data operating means 39 is to sum up the data stored in the first period data memory 37 and the data stored in the second period data memory 38, and transmit the result to the rotating frequency detecting means 8. Although not shown, the number of poles of the motor 3 is, for example, four. The other constitution is same as in the foregoing embodiments.

When the first edge detecting means 10 detects the leading edge of the pulse signal 4a, the data in the first period data memory 37 is moved to the second period data memory 38, and at the same time the period data between edges of the pulse signal 4a measured by the period counter 33 is stored in the first period data memory 37. Accordingly, the first period data memory 37 stores the period data between edges of the latest pulse signal 4a, and the second period data memory 38 stores the period data one edge before. The one-rotation period data operating means 39 adds and issues the sum of the data in the first period data memory 37 and the data in the second period data memory 38. In the case of four-pole motor 3, when the motor 3 turns one rotation, pulse signals 4a are issued for two periods. Therefore, the data issued by the one-rotation period data operating means 39 shows the latest period data corresponding to one rotation of the motor 3. The rotating frequency detecting means 8 creates and issues the rotating frequency Fsen on the basis of the period data corresponding to one rotation of the motor 3.

Figure 32:
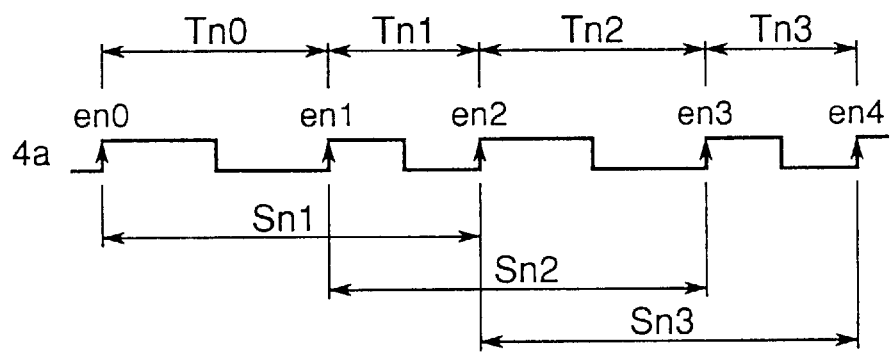
FIG. 32 is an operation explanatory diagram of the eighteenth embodiment.

FIG. 32 is a time chart for showing this operation. In FIG. 32, Sn1, Sn2, Sn3 are period data issued by the one-rotation period data operating circuit 39. The period data is the sum of the latest edge period data of pulse signal 4a at the moment and the period data of one edge before, and for example, Sn1 is expressed in a formula of Sn1=Tn0+Tn1.

If the motor 3 rotating uniformly at a constant speed, the edge period of the pulse signal 4a is not always constant due to magnetization precision of rotor, characteristic of pulse generator 4A, and mechanical mounting precision, among others. For example, the edge period Tn0 is not equal to Tn1. However, every other edges of pulse signal 4a, such as edge en0 and edge en2, or edge en1 and edge en3 are obtained when the pulse generator 4A detects the same magnetic pole change point of the rotor because the motor 3 has four poles, and therefore the period corresponding to one rotation of the motor 3, such as period Sn1 from edge en0 to edge en2, or period Sn2 from edge en1 to edge en3 is constant. On the basis of the period corresponding to one rotation, the rotating frequency Fsen is created and controlled, so that stable operation is realized regardless of magnetization precision of motor or characteristic of pulse generator 4A.

Thus, according to the embodiment, the latest period data and the immediately preceding period data stored in the first period data memory 37 and second period data memory 38 are summed up by the one-rotation period data operating means 39, and the rotating frequency Fsen is created to control on the basis of the period corresponding to one rotation of the motor 3 obtained by thus summing. Accordingly, regardless of the magnetization precision of the rotor, characteristic of pulse generator 4A, or mechanical mounting precision, rotating frequency Fsen of high precision is obtained, and stable sinusoidal wave driving is realized.

For the ease of understanding, the output pulse signal 4a of one pulse generator is explained, but, of course, a plurality thereof may be used, and similarly, having the period data memories as many as the number of edges obtained in the period of one rotation of the motor 3, it may be constituted to create the period corresponding to one rotation by summing the contents of the period data memories. As the number of edges to be detected increases, the updating period of the rotating frequency Fsen is shorter, and the change of rotating speed is detected more earlier, so that the control characteristic may be enhanced.

(Embodiment 19)

The foregoing embodiments relate to the constitution of driving apparatus for the brushless motor, and since the output address Au of the address counter 9 shows the present rotor position, the principal unit of the constitution of the driving apparatus of the brushless motor in the foregoing embodiments may be regarded as the rotor position detecting device, and it can be used widely for other applications than driving. Alternatively, when the pulse generator 4A is used for detecting a certain specific position of the rotor, not detecting the magnetic pole position of the rotor, it can be used widely, not only to brushless motor, but also to reluctance motor not having magnet in the rotor, induction motor, and others. That is, it can be widely applied as the rotor position detecting device for ordinary motors.

Figure 33A:
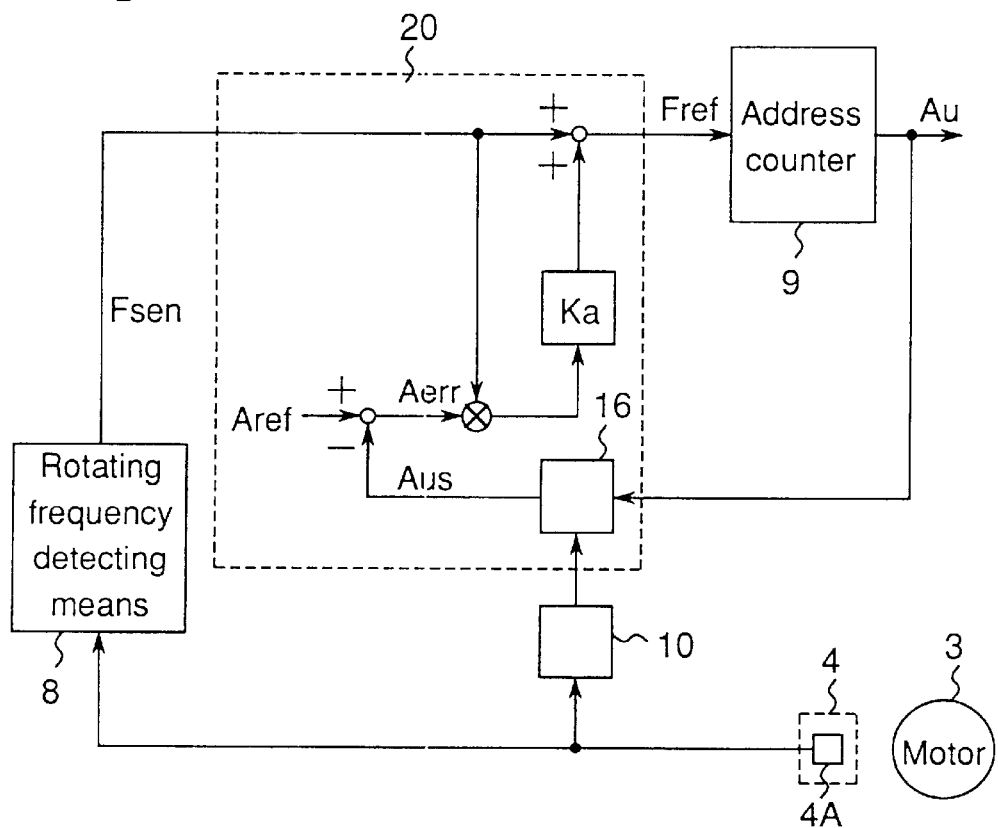
FIG. 33A is a block diagram of a nineteenth embodiment and FIG. 33B is a flowchart showing the operation of the nineteenth embodiment.
Figure 33B:
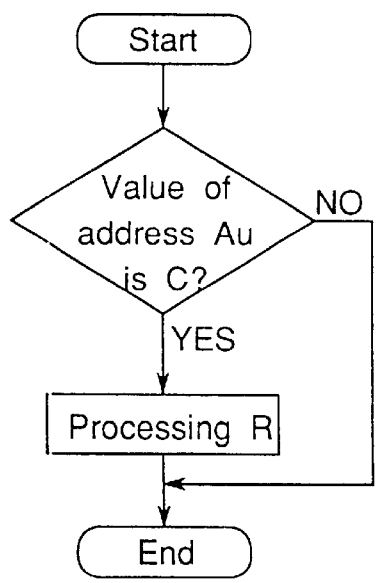
Figure 34:
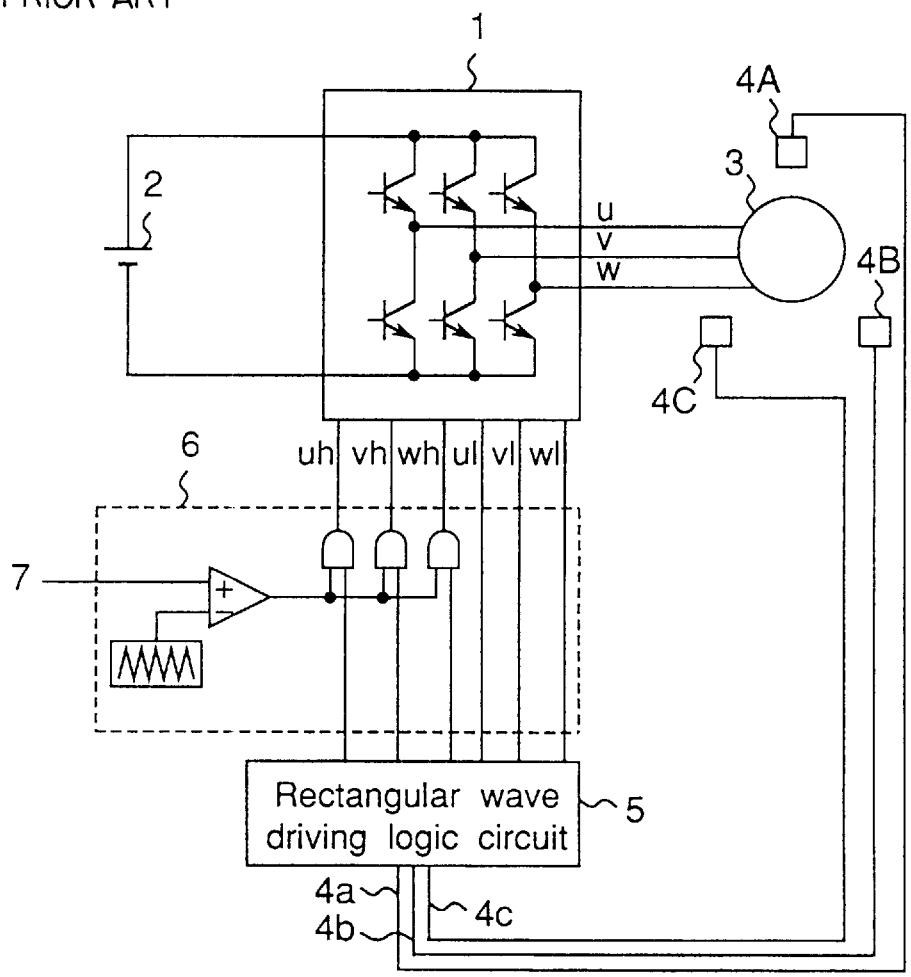
FIG. 34 is a block diagram of a conventional driving apparatus for the brushless motor.
Figure 35:
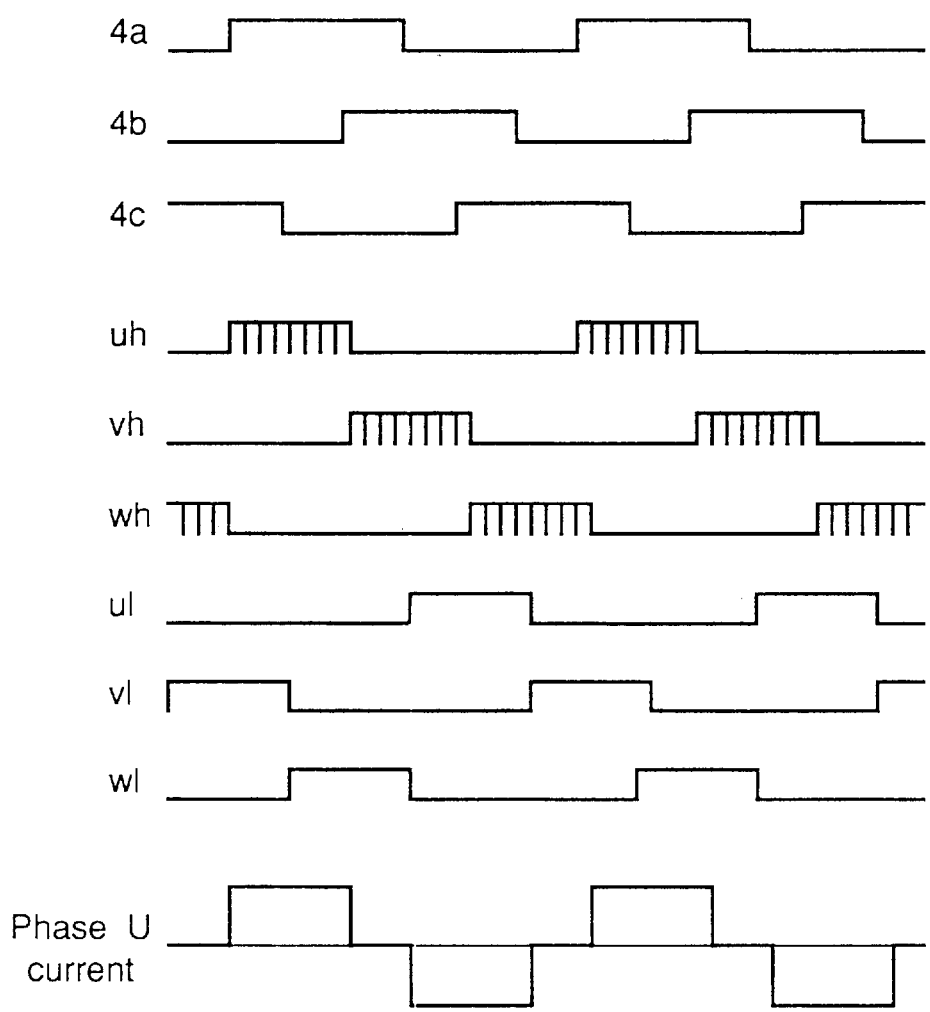
FIG. 35 is a time chart showing the operation of the conventional driving apparatus for the brushless motor.

FIGS. 33A and 33B show an embodiment as rotor position detecting apparatus of such motor, relating to an example of using in a specific control process when the rotor is at a specified position. FIG. 33A shows an example of constitution using part of the constitution of the fourth embodiment, and the constituent elements are same as explained already in the fourth embodiment. However, the pulse generator 4A detects a specific position of the rotor. For example, when the motor 3 is a brushless motor, same as explained in the foregoing embodiments, the Hall element for detecting the magnetic pole position of rotor can be used, or in the case of the motor 3 being a reluctance motor, it may be applied in detection by making use of the change of magnetic resistance of the rotor. It may be also composed by attaching an encoder to the motor 3.

In this constitution, the output address Au of the address counter 9 moves to indicate the rotor position same as in the preceding embodiments. By repeating the operation flow in the flowchart in FIG. 33B cyclically, the operation is effected to process R when the value of the address Au is C, that is, when the rotor position is at the position corresponding to this address value C. This processing R is arbitrary. That is, the rotor position can be detected from the output address Au of the address counter 9, and by making use of this, not only the driving process of the motor 3, but also arbitrary process can be done. The rotor position detecting apparatus of the embodiment is realized by the software in the majority of the constitution while using the pulse generator 4A of simple constitution, and hence the cost is low and precision is high, and almost the same effects as in the driving apparatus for the brushless motor in the foregoing embodiments are brought about.

In FIG. 33A, part of the fourth constitution is employed, but it is also possible to compose to take out the output address Au of the address counter 9 by using part of the first, second, third, fifth, or sixth embodiment. The characteristic effects of the constitution of each driving apparatus for the brushless motor directly appear also in the constitution of the rotor position detecting apparatus.

Further, by using the frequency command correcting mans 42 explained in the seventh embodiment, the rotor position can be also detected correctly while the speed of the motor 3 is changing, so that detection stability can be enhanced.

By using the phase error excess detecting means 28 explained in the eleventh embodiment or thirteenth embodiment, and the period sudden change detecting means 36 explained in the fourteenth embodiment, when the flag is set, for example, at their outputs, it can be confirmed whether the present address Au is indicating the correct rotor position or not by referring to the flag. Hence, when constituted to change the processing content when the flag is set, unstable processing due to detection error can be prevented.

As explained in the sixteenth embodiment or seventeenth embodiment, when the reference address value Aref is an arbitrarily changeable value, or is the sum of an arbitrarily changeable value, and a dynamically changing value during rotation depending on the rotating speed or current of the motor 3, the edge timing error of the pulse signal 4a due to mechanical mounting precision or the like of the pulse generator 4A can be canceled, so that the position detecting precision may be enhanced. Or, when the rotor position detection value is used in motor driving process, the phase adjustment process can be done easily.

Also as described in the eighteenth embodiment, in the constitution having the rotating frequency detecting means 8, the one-rotation period data operating means 39 is provided, and the rotating frequency detecting means 8 is composed to create the rotating frequency Fsen on the basis of the one-rotation period data, so that the rotating frequency Fsen of high precision is obtained regardless of the characteristic of the pulse generator 4A or mechanical mounting precision, so that the rotor position detecting precision may be enhanced.

As is clear from the embodiments described, according to the present invention, by the adjustment of counting speed of the address counter depending on the output signal of the rotor position detecting means, or presetting of address, or combined operation of adjustment of counting speed and presetting of address, the address issued by the address counter follows up the rotor position, and by using the address issued by this address counter having a high resolution, the motor can be driven by an arbitrary waveform written into the waveform data memory, so that the noise and vibration can be decreased. In particularly, in the present invention as set forth in claim 2, when the address counter is operated at the counting speed depending on the rotating frequency of the motor and the address is preset at the edge timing of the output signal of the rotor position detecting means, the same effects can be realized in a simple constitution.

Also according to the present invention, the first output frequency adjusting means issues the result of adding the rotating frequency to the product of the difference of subtracting the present address value from the reference address value and the control gain, as the frequency command, and the address counter counts according to this frequency command, and therefore the rotor magnetic pole position can be corrected correctly without sudden change of address. Hence, the phase output control value is smooth, the disturbance of output torque is less, and the noise and vibration can be reduced.

Also according to the present invention, the second output frequency adjusting means issues the result of adding the present frequency command to the product of the difference of subtracting the present address value from the reference address value and the control gain, as a new frequency command, and the address counter counts according to this frequency command, and therefore the rotor magnetic pole position can be corrected correctly without sudden change of address. Hence, the phase output control value is smooth, the disturbance of output torque is less, and the noise and vibration can be reduced. Moreover, since rotating frequency detecting means is not required in the constituent elements, the constitution is simple, and moreover it is possible to eliminate the instability element in control due to detection error when detecting the rotating frequency.

Also according to the present invention, the third frequency adjusting means issues the result of adding the rotating frequency to the product of the difference of subtracting the present address value from the reference address value and the control gain, as the frequency command, and the address counter counts according to this frequency command, and therefore the operating amount for increasing or decreasing the rotating frequency depending on the difference of subtracting the present address value from the reference address value is proportional to the rotating frequency, so that stable control showing the same phase follow-up performance regardless of the rotating speed of the motor is realized.

Also according to the present invention, the fourth frequency adjusting means issues the result of adding the present frequency command value to the product of the difference of subtracting the present address value from the reference address value, the present frequency command value and the control gain, as a new frequency command, and the address counter counts according to this frequency command, and therefore the operating amount for increasing or decreasing the present frequency command value depending on the difference of subtracting the present address value from the reference address value is proportional to the present frequency command value, so that stable control showing the same phase follow-up performance regardless of the rotating speed of the motor is realized.

Also according to the present invention, every time the fifth frequency adjusting means detects the edge of output signal of the pulse generators the value of multiplying a fractional value consisting of a numerator which is the sum of an address error and the unit address length corresponding to the unit period of waveform, and a denominator which is the sum of the value subtracting the address error from the unit address length and the address error at the previous time, a control gain, and the present frequency command is issued as a new frequency command, and the address counter counts at the speed proportional to this frequency command value, by considering also the previous address error when adjusting the frequency, the constituent elements do not require rotating frequency detecting means, and a stable address error correction is realized regardless of the magnitude of rotating frequency or previous address error amount.

Also according to the present invention, further comprising frequency command correcting means for correcting the frequency command value by adding a value based on the motor acceleration to the frequency command value, if the motor speed changes, by correcting the frequency command value according to such change, a stable address error correction is realized.

Also according to the present invention, being designed to start by commanding the rotating frequency gradually elevating with the passing of the time to the address counter, it is possible to operate stably, and in addition, as set forth in claim 10 of the present invention, by setting a DC feeding period of zero frequency upon start of power feed when starting the motor, the magnetic pole position of the rotor stays at a specific position, and stable starting is realized regardless of the rotor magnetic pole position when stopping.

Also according to the present invention, further comprising the first rectangular wave driving means for driving by feeding rectangular wave on the basis of the output signal of the pulse generators in the number as the number of phases of the motor, rectangular wave feeding by the first rectangular wave driving means is effected when starting the motor, and therefore extremely stable starting of high output torque is realized when starting.

Also according to the present invention, the phase error excess detecting means detects when the absolute value of the difference of subtracting the present address value from the reference address value exceeds a preset value, and issues a phase error excess signal, and rectangular wave feeding is processed, and therefore the rotation can be maintained if the address fails to indicate the correct rotor magnetic pole position due to sudden application of disturbance torque or the like to the motor.

Also according to the present invention, the phase error excess detecting means detects when the absolute value of the difference of subtracting the present address value from the reference address value exceeds a preset value, and issues a phase error excess signal, the rotor magnetic pole position detecting circuit processes rectangular wave feeding according to the signal of detecting the magnetic pole position of the rotor from the induced voltage of the motor, and therefore the rotation can be maintained if the address fails to indicate the correct rotor magnetic pole position due to sudden application of disturbance torque or the like to the motor. Still more, only one pulse generator is used, and the number of output signal wires of the pulse generator is decreased, and the cost is lowered.

Also according to the present invention, the phase error excess detecting means detects when the address differential of subtracting the reference address value from the address exceeds a preset value, and issues a phase error excess signal to change over to rectangular wave feeding, and therefore a stable rotation can be maintained if disturbance torque or the like is suddenly applied to the motor.

Also according to the present invention, the allowable period range setting means sets the allowable range of period data to be measured next time on the basis of the period data measured by the period counter, and when the counting value of the frequency counter exceeds the allowable range, or when the edge of output signal of the pulse generator is detected before reaching the allowable range, a period sudden change signal is issued to change over operation to rectangular wave feeding process, and therefore a stable rotation can be maintained if disturbance torque or the like is suddenly applied to the motor.

Also according to the present invention, the reference address value can be arbitrarily set or changed, and therefore the edge timing error of the output signal of the pulse generator due to mechanical mounting precision or the like can be canceled, and the motor can be driven at maximum output torque and efficiency. In addition, as set forth in claim 18 of the present invention, by calculating the sum of the value for arbitrarily setting and changing the reference address value, and the rotating speed of the motor, or the value dynamically changing during driving on the basis of the current value, the phase advancing process for canceling the delay of the current phase of the motor can be done easily, and desired output torque can be obtained in a wide speed range and load range.

Also according to the present invention, the contents of plural period data memories for storing the past period data measured by the frequency counter are read out, period data is created by adding the period data in the quantity corresponding to one rotation of the motor in the chronological order, and the rotating frequency is created to control on the basis of the period data corresponding to one rotation, and therefore, the rotating frequency is obtained at high frequency without effects of the magnetization precision of the rotor, characteristic of the pulse generator, and mechanical mounting precision, so that stable driving is realized.

Also according to the present invention, using the principal components of the constitution in the driving apparatus for the brushless motor as set forth in claim 1 through claim 19, the rotor position detecting apparatus of motor is composed, and therefore the rotor position can be detected at low cost and high resolution, in spite of using the rotor position detecting means of low resolution, and not limited to brushless motor, it can be applied in an extremely wide range including the reluctance motor and induction motor.

In the present invention, the pulse generator can be designed in a simple structure using Hall elements or the like, and the majority of the hardware constituent elements can be easily composed of the software, so that it can be presented at low cost. Moreover, the motor can be driven by controlling very finely including the phase, in arbitrary driving waveform, not limited to sinusoidal waveform, being written in the waveform data memory, so that it can be used for the purpose of not only lowering the noise level, but also for enhancing the efficiency, and the scope of application is wide.

For the ease of understanding of the description of the embodiments, the leading edge of the pulse signal 4a, 00H of address Au, and zero crossing point timing of phase output data Du are matched, but, of course, the mutual phase relation is arbitrary. The motor is explained to have three phases and four poles, but not limited to this, it can be applied to motors of an arbitrary number of phases and poles.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A driving apparatus for a brushless motor comprising: rotor position detecting means for detecting the rotor position, and issuing a position signal; an address counter for counting the address corresponding to the rotor position at a higher resolution than the position signal of the rotor position detecting means; a waveform data memory for storing waveform data and issuing data on an address issued by the address counter; phase output command creating means for creating an AC command value of each phase of the motor on the basis of the data issued by the waveform data memory; and an inverter circuit for issuing and controlling a motor driving electric power by using the AC command value issued by the phase output command creating means as phase voltage command value or phase current command value; wherein adjustment of count speed of the address counter, presetting of the address, or combined operation of adjustment of count speed and presetting of the address is conducted depending on the position signal of the rotor position detecting means, so that the address issued by the address counter may follow up the rotor position.

2. A driving apparatus for a brushless motor comprising: at least one pulse generator for issuing an output signal showing magnetic pole position of a rotor; rotating frequency detecting means for detecting the frequency of the output signal of the pulse generator; an address counter for counting an address corresponding to the rotor magnetic pole position at a speed proportional to the value of rotating frequency issued by the rotating frequency detecting means; address correcting means for presetting, when detecting the edge of the output signal of the pulse generator, a reference address value corresponding to the rotor magnetic pole position indicated by this edge in the address counter; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

3. A driving apparatus for a brushless motor comprising: at least one pulse generator for issuing an output signal showing the magnetic pole position of a rotor; rotating frequency detecting means for detecting the frequency of the output signal of the pulse generator; frequency adjusting means for issuing, when detecting an edge of the output signal of the pulse generator, the result of adding the rotating frequency issued by the rotating frequency detecting means, to the product of the difference of subtracting the present address value from the reference address value corresponding to the rotor magnetic pole position indicated by this edge and a control gain, as a frequency command; an address counter for counting an address corresponding to the rotor magnetic pole position at a speed proportional to the frequency command value issued by the frequency adjusting means; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

4. A driving apparatus for a brushless motor comprising: at least one pulse generator for issuing an output signal showing the magnetic pole position of a rotor; frequency adjusting means for issuing, when detecting an edge of the output signal of the pulse generator, the result of adding the present frequency command, to the product of the difference of subtracting the present address value from the reference address value corresponding to the rotor magnetic pole position indicated by this edge and a control gain, as a new frequency command, an address counter for counting an address corresponding to the rotor magnetic pole position at a speed proportional to the frequency command value issued by the frequency adjusting means; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

5. A driving apparatus for a brushless motor comprising: at least one pulse generator for issuing an output signal showing the magnetic pole position of a rotor; rotating frequency detecting means for detecting the frequency of the output signal of the pulse generator; frequency adjusting means for issuing, when detecting an edge of the output signal of the pulse generator, the result of adding the rotating frequency, to the product of the difference of subtracting the present address value from the reference address value corresponding to the rotor magnetic pole position indicated by this edge, the rotating frequency issued by the rotating frequency detecting means and a control gain, as a frequency command; an address counter for counting an address corresponding to the rotor magnetic pole position at a speed proportional to the frequency command value issued by the frequency adjusting means; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

6. A driving apparatus for a brushless motor comprising: at least one pulse generator for issuing an output signal showing the magnetic pole position of a rotor; frequency adjusting means for issuing, when detecting an edge of the output signal of the pulse generator, the result of adding the present frequency command, to the product of the difference of subtracting the present address value from the reference address value corresponding to the rotor magnetic pole position indicated by this edge, the present frequency command and a control gain, as a new frequency command; an address counter for counting an address corresponding to the rotor magnetic pole position at a speed proportional to the frequency command value issued by the frequency adjusting means; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

7. A driving apparatus for a brushless motor comprising: at least one pulse generator for issuing an output signal showing the magnetic pole position of a motor; frequency adjusting means for issuing, when detecting an edge of the output signal of the pulse generator, the value of multiplying a fractional value consisting of a numerator which is the sum of an address error, being the difference of subtracting the present address value from the reference address value corresponding to the rotor magnetic pole position indicated by this edge and the unit address length corresponding to the unit period of waveform, and a denominator which is the sum of the value subtracting the address error from the unit address length and the address error at the previous time of detecting the edge, a control gain, and the present frequency command, as a new frequency command; an address counter for counting an address corresponding to the rotor magnetic pole position at a speed proportional to the frequency command value issued by the frequency adjusting means; a waveform data memory for storing waveform data and issuing data on an address issued by the address counter; phase output command creating means for multiplying the data issued by the waveform data memory and a DC command value, and creating an AC command value of each phase of the motor; and an inverter circuit for issuing and controlling a motor driving electric power by using the AC command value issued by the phase output command creating means as phase voltage command value or phase current command value.

8. A driving apparatus for a brushless motor of any one of claims 1 to 7, further comprising frequency command correcting means for correcting a frequency command value by adding a value on the basis of the motor acceleration to the frequency command value.

9. A driving apparatus for a brushless motor of any one of claims 2 to 7, wherein the frequency value gradually rising along with the passing of the time is commanded to the address counter when starting up the motor.

10. A driving apparatus for a brushless motor of any one of claims 1 to 7, wherein the frequency value gradually rising along with the passing of the time is commanded to the address counter, after DC current is applied to the inverter circuit for a specific time, when starting up the motor.

11. A driving apparatus for a brushless motor of any one of claims 2 to 7, wherein the number of pulse generators is the same as the number of phases of the motor, and first rectangular wave driving means is provided for driving by feeding a rectangular wave on the basis of the output signal of the pulse generator, and the inverter circuit processes rectangular wave feeding by the first rectangular wave driving means.

12. A driving apparatus for a brushless motor of claim 11, further comprising phase error excess detecting means for issuing, when detecting an edge of the output signal of the pulse generator, a phase error excess signal by detecting that the absolute value of the difference of subtracting the present address value from the reference address value corresponding to the rotor magnetic pole position indicated by this edge has exceeded a preset value, wherein the inverter circuit temporarily processes rectangular wave feeding at the time of output of the phase error excess signal.

13. A driving apparatus for a brushless motor of claim 9, further comprising: phase error excess detecting means for issuing, when detecting the edge of an output signal of the pulse generator, a phase error excess signal by detecting that the absolute value of the difference of subtracting the present address value from the reference address value corresponding to the rotor magnetic pole position indicated by this edge has exceeded a preset value; a rotor magnetic pole position detecting circuit for detecting the magnetic pole position of rotor from induced voltage of motor; and rectangular wave driving means for driving by feeding a rectangular wave on the basis of the output signal of the rotor magnetic pole position detecting circuit; wherein the inverter circuit temporarily processes rectangular wave feeding at the time of output of the phase error excess signal.

14. A driving apparatus for a brushless motor of claim 11, further comprising phase error excess detecting means for issuing a phase error excess signal by detecting that the absolute value of the difference of subtracting the reference address value corresponding to the rotor magnetic pole position indicated by the latest edge of the output signal of the pulse generator from the present output address value of the address counter has exceeded a preset value, wherein the inverter circuit temporarily processes rectangular wave feeding at the time of output of the phase error excess signal.

15. A driving apparatus for a brushless motor of claim 11, further comprising: a period counter for measuring the edge detection period of the output signal of the pulse generator; allowable period range setting means for setting an allowable range of periodic data to be measured next on the basis of the periodic data measured by the period counter; and period sudden change detecting means for issuing a period sudden change signal when the present counting value of the period counter has exceeded the allowable range set by the allowable period range setting means, or when the edge of the output signal of the pulse generator is detected before reaching the allowable range; wherein the inverter circuit temporarily processes rectangular wave feeding at the time of output of the period sudden change signal.

16. A driving apparatus for a brushless motor of claim 11, wherein changeover from rectangular wave feeding process to feeding process according to the content of the waveform data memory is effected at the edge detection timing of the output signal of the pulse generator, and simultaneously with this changeover, and, the reference address value corresponding to the rotor magnetic pole position indicated by the edge or its vicinity value is preset in the address counter.

17. A driving apparatus for a brushless motor of any one of claims 2 to 7, wherein the reference address value is a value that can be freely changed and set.

18. A driving apparatus for a brushless motor of any one of claims 2 to 7, wherein the reference address value is the sum of a value that can be freely changed and set, and a dynamically changing value during driving on the basis of the rotating speed of the motor or the current.

19. A driving apparatus for a brushless motor of any one of claims 2, 3, and 5, further comprising: a period counter for measuring the edge detection period of the output signal of the pulse generator; plural period data memories for storing the past period data measured by the period counter; and a one rotation period data operating means for reading out the period data memories, and adding and issuing the period data in the quantity corresponding to one rotation of the motor in the chronological sequence; wherein the rotating frequency detecting means creates the rotating frequency on the basis of the one-rotation period data obtained from the one-rotation period data operating means.

20. A rotor position detecting apparatus of a motor comprising: rotor position detecting means for detecting the rotor position and issuing a position signal; and an address counter for counting the address corresponding to the rotor position at a higher resolution than the position signal of the rotor position detecting means; wherein adjustment of count speed of the address counter, presetting of the address, or combined operation of adjustment of count speed and presetting of the address is conducted depending on the position signal of the rotor position detecting means, so that the address issued by the address counter may follow up the rotor position, and the rotor position is identified on the basis of the output address value of the address counter.

21. A rotor position detecting apparatus of a motor comprising: at least one pulse generator for issuing an output signal indicating the rotor position; rotating frequency detecting means for detecting the frequency of the output signal of the pulse generator; an address counter for counting the address corresponding to the rotor position at a speed proportional to the rotating frequency value issued by the rotating frequency detecting means; and address correcting means for presetting, when detecting an edge of the output signal of the pulse generator, the reference address value corresponding to the rotor position indicated by this edge in the address counter; wherein the rotor position is identified on the basis of the output address value of the address counter.

22. A rotor position detecting apparatus of a motor comprising: at least one pulse generator for issuing an output signal indicating the rotor position; rotating frequency detecting means for detecting the frequency of the output signal of the pulse generator; frequency adjusting means for issuing, when detecting an edge of the output signal of the pulse generator, the result of adding the rotating frequency issued by the rotating frequency detecting means, to the product of the difference of subtracting the present address value from the reference address value corresponding to the rotor position indicated by this edge and a control gain, as a frequency command; and an address counter for counting the address corresponding to the rotor magnetic pole position at a speed proportional to the frequency command value issued by the frequency adjusting means; wherein the rotor position is identified on the basis of the output address value of the address counter.

23. A rotor position detecting apparatus of a motor comprising: at least one pulse generator for issuing an output signal indicating the rotor position; frequency adjusting means for issuing, when detecting an edge of the output signal of the pulse generator, the result of adding the present frequency command, to the product of the difference of subtracting the present address value from the reference address value corresponding to the rotor position indicated by this edge and a control gain, as a new frequency command; and an address counter for counting the address corresponding to the rotor position at a speed proportional to the frequency command value issued by the frequency adjusting means; wherein the rotor position is identified on the basis of the output address value of the address counter.

24. A rotor position detecting apparatus of a motor comprising: at least one pulse generator for issuing an output signal indicating the rotor position; rotating frequency detecting means for detecting the frequency of the output signal of the pulse generator; frequency adjusting means for issuing, when detecting an edge of the output signal of the pulse generator, the result of adding the rotating frequency, to the product of the difference of subtracting the present address value from the reference address value corresponding to the rotor position indicated by this edge, the rotating frequency issued by the rotating frequency detecting means, and a control gain, as a frequency command; and an address counter for counting the address corresponding to the rotor position at a speed proportional to the frequency command value issued by the frequency adjusting means; wherein the rotor position is identified on the basis of the output address value of the address counter.

25. A rotor position detecting apparatus of a motor comprising: at least one pulse generator for issuing an output signal indicating the rotor position; frequency adjusting means for issuing, when detecting an edge of the output signal of the pulse generator, the result of adding the present frequency command, to the product of the difference of subtracting the present address value from the reference address value corresponding to the rotor position indicated by this edge, the present frequency command, and a control gain, as a new frequency command; and an address counter for counting the address corresponding to the rotor position at a speed proportional to the frequency command value issued by the frequency adjusting means; wherein the rotor position is identified on the basis of the output address value of the address counter.

26. A rotor position detecting apparatus of a motor comprising: at least one pulse generator for issuing an output signal indicating the rotor position; frequency adjusting means for issuing, when detecting an edge of the output signal of the pulse generator, the value of multiplying a fractional value consisting of a numerator which is the sum of an address error, being the difference of subtracting the present address value from the reference address value corresponding to the rotor magnetic pole position indicated by this edge and the unit address length corresponding to the unit period of waveform, and a denominator which is the sum of the value subtracting the address error from the unit address length and the address error at the previous time of detecting the edge, a control gain, and the present frequency command, as a new frequency command; and an address counter for counting the address corresponding to the rotor position at a speed proportional to the frequency command value issued by the frequency adjusting means; wherein the rotor position is identified on the basis of the output address value of the address counter.

27. A rotor position detecting apparatus of a motor of any one of claims 20 to 26, further comprising: frequency command correcting means for correcting a frequency command value by adding a value on the basis of the motor acceleration to the frequency command value.

28. A rotor position detecting apparatus of a motor of any one of claims 21 to 26, further comprising phase error excess detecting means for issuing, when detecting an edge of the output signal of the pulse generator, a phase error excess signal by detecting that the absolute value of the difference of subtracting the present address value from the reference address value corresponding to the rotor magnetic pole position indicated by this edge has exceeded a preset value.

29. A rotor position detecting apparatus of a motor of any one of claims 21 to 26, further comprising phase error excess detecting means for issuing a phase error excess signal by detecting that the absolute value of the difference of subtracting the reference address value corresponding to the rotor position indicated by the latest edge of the output signal of the pulse generator from the present output address value of the address counter has exceeded a preset value.

30. A rotor position detecting apparatus of a motor of any one of claims 21 to 26, further comprising: a period counter for measuring the edge detection period of the output signal of the pulse generator; allowable period range setting means for setting an allowable range of periodic data to be measured next on the basis of the periodic data measured by the period counter; and period sudden change detecting means for issuing a period sudden change signal when the present counting value of the period counter has exceeded the allowable range set by the allowable period range setting means, or when the edge of the output signal of the pulse generator is detected before reaching the allowable range.

31. A rotor position detecting apparatus of a motor of any one of claims 21 to 26, wherein the reference address value is a value that can be freely changed and set.

32. A rotor position detecting apparatus of a motor of any one of claims 21 to 26, wherein the reference address value is the sum of a value that can be freely changed and set, and a dynamically changing value during driving on the basis of the rotating speed of the motor or the current.

33. A rotor position detecting apparatus of a motor of any one of claims 21, 22, and 24, further comprising: a period counter for measuring the edge detection period of the output signal of the pulse generator; plural period data memories for storing the past period data measured by the period counter; and a one rotation period data operating means for reading out the period data memories, and adding and issuing the period data in the quantity corresponding to one rotation of the motor in the chronological sequence; wherein the rotating frequency detecting means creates the rotating frequency on the basis of the one rotation period data obtained from the one rotation period data operating means.

* * * * *